United States Patent Office 3,850,945
Patented Nov. 26, 1974

3,850,945
3-THIAZOL-2'-OXY-AMINOPROPANOL CARDIOVASCULAR AGENTS
John A. Edwards, Los Altos, Calif., assignor to Syntex (U.S.A.) Inc.
No Drawing. Continuation-in-part of abandoned application Ser. No. 193,172, Oct. 27, 1971. This application Sept. 15, 1972, Ser. No. 289,730
Int. Cl. C07d 91/30
U.S. Cl. 260—302 R    40 Claims

ABSTRACT OF THE DISCLOSURE 1-amino-3-[2 - thiazoloxy]-2-propanol and 3-[4- or 5-substituted-2-thiazolozy)]- and/or substituted 1-amino derivatives thereof; 3 - [2-thiazoloxy]-1,2-epoxypropane and 3-[4- or 5-substituted-2-thiazoloxy] derivatives thereof; 5-[thiazol-2-oxymethylene]-oxazolidine and 5-[4- or 5-substituted-thiazol-2-oxymethylene] and/or N - substituted and/or 2-substituted oxazolidine, derivatives thereof and methods of preparing such compounds. The above 1-amino-3-[2-thiazoloxy]-2 - propanol and derivatives exhibit cardiovascular activity and are useful for the treatment of abnormal heart conditions in mammals. The above 3-[2-thiazoloxy]-1,2-epoxypropane and derivatives are useful as intermediates for the aforementioned cardiovascular agents. The 5-[thiazol-2-oxymethylene]-oxazolidine and derivatives are also intermediates for aforementioned cardiovascular agents and also exhibit cardiovascular activity and thus are useful in the treatment of abnormal heart conditions in mammals. The 1-amino-3-[2-thiazoloxy]-2-propanol and derivatives can be prepared by base or acid hydrolysis of the corresponding 5-[thiazol-2-oxymethylene]-oxazolidine or derivatives; or by treatment of the corresponding 3-[thiazoloxy]-2,3-epoxypropane or derivatives with the desired amine or aminoderivative.

This application is a continuation-in-part of U.S. Ser. No. 193,172, filed Oct. 27, 1917, now abandoned.

BACKGROUND OF THE INVENTION (1) Field of the Invention

This invention relates to 3-(thiazol-2-oxy)-propane derivatives and thiazol-2'-oxy-methylene-oxazolidine derivatives and to methods of preparing such compounds. In a further aspect this invention relates to 1-amino-3-(thiazol-2-oxy)-2-propanol and 2-amino and/or 4'- or 5'-thiazole derivatives thereof, and to methods of preparing and using such compounds. In a still further aspect this invention relates to 3-(thiazol-2-oxy)-1,2-epoxypropane and to 4'- or 5'-substituted thiazole derivatives thereof and to methods of preparing and using such compounds. In another aspect this invention relates to thiazol-2'-oxy-methylene-oxazolidine and/or 4- or 5-substituted derivatives thereof and to methods of preparing and using such compounds.

This invention also relates to pharmaceutical compositions comprising the 1-amino-3-(thiazol-2-oxy)-2-propanol and derivatives, of the invention, and/or the thiazol-2'-oxy-methylene-oxazolidine and derivatives, of the invention, and to methods of applying such compositions for the treatment of mammals.

(2) The Prior Art

At the present time the compound generaly relied on for the treatment of heart failure and especially acute heart failure is 3,4-dihydroxy-α-[(isopropylamino)methyl]-benzyl alcohol (note U.S. Pats. 2,308,237 and 2,715,-141). This compound produces a marked increase in heart rate and contractile force but regrettably is short acting and decreases blood pressure. Further, this compound has, as an undesirable side effect, a propensity to induce arrhythmia. Accordingly the present invention relates to the discovery of compounds which are useful in the treatment of abnormal cardiovascular conditions, including heart failure, and which are long acting and exhibit only minimal effects on blood pressure and possess a very low arrhythmogenic potential.

SUMMARY

In summary the compounds of the invention can be represented by the following generic formula:

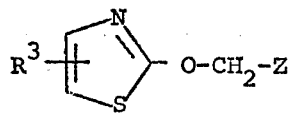

wherein $R^3$ is a substituent on the thiazole ring at either the 4- or 5-position selected from the group of hydrogen, lower alkyl, lower cycloalkyl, lower alkoxy, halo, trifluoromethyl, acyl groups having from 1 through 12 carbon atoms, carboxy, alkoxycarbonyl, arylcarbonyl, arylalkylcarbonyl, phenyl substituted phenyl having one or two substituents and wherein said substituents are independently selected from the group of lower alkyl, hydroxy-(lower alkyl), and halo or $R^3$ is a substituent structurally derived from nitrogen and/or sulfur; and Z is selected from the group having the formulas:

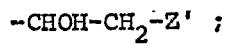

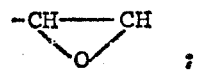

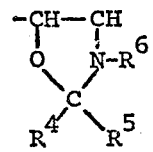

wherein Z' is amino or amino derivative or nitrogen heterocycle; $R^6$ is hydrogen, lower alkyl, aryl or arylalkyl; $R^4$ and $R^5$ are independently selected from the group of hydrogen, lower alkyl, arylalkyl or together with the carbon atom to which they are joined form a cycloalkyl having from 5 through 7 carbon atoms.

Also encompassed within the invention are pharmaceutically acceptable salts of the above compounds.

In summary the process of the invention of preparing the compounds, of the invention, wherein Z is

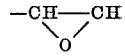

comprises epoxidizing the corresponding 3-(thiazol-2-oxy)-1-alkylsulfonyl or phenylsulfonyl-2-propanol derivative at the 2,3-position, typically via treatment with a strong base.

In summary the process of the invention for preparing the compaunds, of the invention, wherein Z is the group —CHOH—CH₂—Z' comprises treating the compounds of the invention wherein Z is

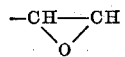

with ammonia or amine having the desired $R^1$ and/or $R^2$ substituent. Alternatively these compounds can be prepared, according to the invention, by hydrolysis of the corresponding Z is oxazolidine compounds of the invention.

In summary the process of the invention of preparing the compounds of the invention wherein Z is an -oxazolidine group comprises condensation of a 2-bromo or -chloro-thiazole having the desired $R^3$ (i.e., 4- or 5-position) substituent with a 5 - hydroxymethyl-oxazolidine having the desired $N_3$-substituent. Alternatively the oxazolidine compounds can be prepared by treatment of the corresponding compounds of the invention where Z is a propanol derivative.

In summary the pharmaceutical compositions of the invention include both solutions and solids or powders comprising one or more of the compounds, of the invention, wherein Z is a propanol derivative and/or one or more compounds, of the invention, wherein Z is an oxazolidine derivative in combination with a suitable pharmaceutical solution (e.g., sterile water) or pharmaceutical solid excipients.

The invention will be further described herein below.

FURTHER DESCRIPTION OF THE INVENTION AND PREFERRED EMBODIMENTS

The compounds of the invention can be represented by the following sub-generic formulas:

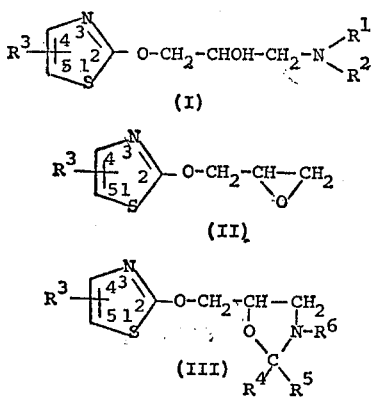

wherein $R^1$ and $R^2$ are independently selected from the group of hydrogen, lower alkyl, cycloalkyl having from 3 through 7 ring atoms, lower alkenyl, aryl, arylalkyl, lower alkylaryl, hydroxy lower alkyl (lower alkoxy), lower alkyl, lower alkyl(N-heterocyclic having from 5 through 7 ring atoms including one or two heteroatoms selected from the group of nitrogen, oxygen and sulfur and wherein at least one of said heteroatoms is nitrogen) and the group

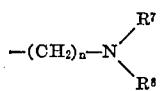

wherein $R^7$ and $R^8$ are independently hydrogen or lower alkyl, and $n$ is a whole integer of from 1 through 4; or $R^1$ and $R^2$ together with the nitrogen atom to which they are joined form a nitrogen heterocycle having from 5 through 7 ring atoms having 1 or 2 hetero atoms selected from the group consisting of nitrogen, oxygen and sulfur and wherein at least one of said hetero atoms is nitrogen or $R^1$ and $R^2$ form a substituted nitrogen heterocycle having from 5 through 7 ring atoms including one or two heteroatoms selected from the group of nitrogen, oxygen and sulfur and wherein at least one of said heteroatoms is nitrogen and having one or two substituents independently selected from the group of lower alkyl, and hydroxy(lower alkyl);

$R^3$ is a substituent on the thiazole ring at either the 4- or 5-position selected from the group of hydrogen, lower alkyl, lower cycloalkyl, lower alkoxy, hydroxy (lower alkyl), acyloxy(lower alkyl), halo, trifluoromethyl, acyl groups having from 1 through 12 carbon atoms, carboxy, cyano, amino, lower alkylamino, lower dialkyl amino, formamide; and groups having the formulas:

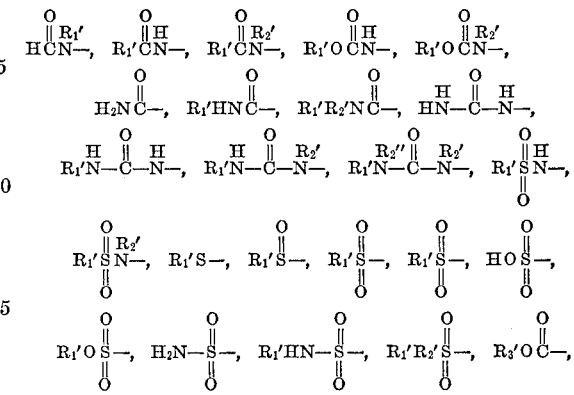

and

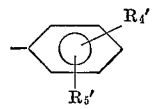

wherein $R_1'$, $R_1''$ and $R_2'$ are independently selected from the group of lower alkyl, aryl and arylalkyl; $R_3'$ is alkyl having from 1 through 11 carbon atoms, cycloalkyl having from 5 through 7 carbon atoms, aryl or arylalkyl; $R_4'$ and $R_5'$ are independently selected from the group of hydrogen, lower alkyl, hydroxy(lower alkyl) and halo;

$R^4$ and $R^5$ are independently selected from the group of hydrogen, lower alkyl, arylalkyl or together with the carbon atom to which they are joined form a cycloalkyl having from 5 through 7 carbon atoms;

$R^6$ is hydrogen, lower alkyl, aryl or arylalkyl.

Also encompassed within the invention are pharmaceutically acceptable salts of the above compound of formulas I and III.

The compounds of the invention have an asymmetric carbon atom in the propane side chain and thus exist as optical isomers. Correspondingly the above formulas are intended to represent the respective individual (+) and (—) optical isomers as well as mixtures of such isomers and the individual isomers as well as mixtures thereof are encompassed within the invention. Where the compounds of the invention have 1-positioned substituents, on the propane chain, which have asymmetric atoms, the compounds exhibit further optical activity with respect to such asymmetric atoms. Correspondingly, formulas I and III are intended to represent the individual respective optical isomers as well as mixtures of such isomers and the individual isomers as well as mixtures thereof are encompassed within the invention.

The term lower alkyl refers to both straight and branched chain alkyl groups having a total of from 1 through 6 carbon atoms and thus includes primary, secondary and tertiary alkyl groups. Typical lower alkyls include, for example, methyl, ethyl, n-propyl, isopropyl, n-butyl, t-butyl, n-hexyl and the like. The term cycloalkyl refers to cyclic hydrocarbon groups having from 3 through 7 carbon atoms such as, for example, cyclopropyl, cyclopentyl, cycloheptyl, and the like. The term lower alkenyl refers to monoethylenically unsaturated aliphatic groups having from 2 through 6 carbon atoms and wherein the double bond can be between any two adjacent carbon atoms. Typical lower alkenyl groups include, for example, vinyl, propenyl, and the like. The term lower alkoxy refers to the group having the formula R'O— wherein R' is lower alkyl. Typical alkoxy groups include, for example, methoxy, ethoxy, t-butoxy and the like. The term (lower alkoxy) lower alkyl refers to the group —R'—OR' wherein R' is lower alkyl and OR' is lower alkoxy. The term hydroxy lower alkyl refers to groups having the formula HOR'— wherein R' is lower alkyl. Typical hydroxyalkyl groups include, for example, hydroxymethyl, α-hydroxyethyl, β-hydroxypropyl, hydroxyisopropyl, hydroxy-t-butyl and the like. The term carboxy refers to the group —COOH. The term "halo" refers to iodo, bromo, chloro and fluoro groups. The term "acyl" refers to acyl groups derived from carboxylic acids having from 1 through 12 carbon atoms such as acetyl, propionyl, butyryl, valeryl, isovaleryl, hexanoyl, heptanoyl, octanoyl, nonanoyl, undecanoyl, lauroyl, benzoyl, phenylacetyl, phenylpropionyl, o-, m-, p-toluoyl, β-cyclopentylpropionyl, formyl and the like.

The term "alkoxycarbonyl" refers to groups having the formula

wherein $R_3'$ is an alkyl group having from 1 through 11 carbon atoms. Typical alkoxycarbonyl groups thus include, for example, methoxycarbonyl, propoxycarbonyl, isopropoxycarbonyl, undecanoxycarbonyl, and the like. The term acyloxy refers to groups derived from carboxylic acids having from 2 through 12 carbon atoms such as acetyloxy, propionyloxy, butyryloxy, valeryloxy, isovaleryloxy, hexanoyloxy, heptanoyloxy, octanoyloxy, nonanoyloxy, undecanoyloxy, lauroyloxy, benzoyloxy, phenylacetyloxy, phenylpropionyloxy, o-, m-, p-toluoyloxy, β-cyclopentylpropionyloxy, and the like.

By the term "aryl" is meant a group containing one aromatic ring having up to 10 carbons and preferably is phenyl. By the term "alkylaryl" is meant at substituted phenyl group having one or more alkyl substituents and having up to 10 carbon atoms such as o-tolyl, m-tolyl, p-isopropylphenyl, 2,3-dimethylphenyl, 3,5-dimethylphenyl, and the like. By the term "arylakyl" is meant a phenyl (or substituted phenyl) substituted alkyl group such as benzyl, phenylethyl, β-(p-hydroxyphenyl)ethyl, and the like preferably having up to 12 carbons. The term "substituted phenyl" refers to phenyl groups substituted at one or more of the ortho, meta or para positions with a hydroxy, lower alkyl, acyloxy, lower alkoxy or halo groups. Typical substituted phenyl groups include, for example, p-hydroxyphenyl, p-tolyl, p-acetoxyphenyl, p-nitrophenyl, p-fluorophenyl, p-chlorophenyl and the corresponding ortho and meta isomers.

The term lower alkylamino refers to the group having the formula R'HN— wherein R' is lower alkyl. The term dialkylamino refers to the group having the formula $R_1'R_2'N$ wherein $R_1'$ and $R_2'$ are independently lower alkyl. Typical dialkylamino groups include, for example, dimethylamino, N-methyl-N-ethylamino, diethylamino, N-t-butyl-N-isopropylamino, and the like.

The term formamido refers to the group having the formula $$\underset{H}{\overset{O}{\underset{\|}{HCN}}}$$

The term N-(lower alkyl)formamido refers to the groups having the formula $$\underset{H}{\overset{O}{\underset{\|}{HCN}}}\!\!\!\overset{R}{\phantom{N}}\!\!\!-$$

wherein R' is lower alkyl. The term alkylamido or alkylcarbonylamino refer to the group having the formula $$\underset{H}{\overset{O}{\underset{\|}{R'CN}}}-$$

wherein R' is lower alkyl, aryl, or arylalkyl. Similarly the term N-(lower alkyl)alkylamido or N-(lower alkyl)alkylcarbonylamino refer to groups having the formula $$\underset{R_1'CN}{\overset{O}{\underset{\|}{\phantom{R_1'CN}}}}\!\!\overset{R_2'}{\phantom{N}}-$$

wherein $R_1'$ is lower alkyl, aryl, or arylalkyl and $R_2'$ is lower alkyl. Typical N-(lower alkyl)acylamido or N-(lower alkyl)acylamino groups include, for example, N-(methyl)acetylamido-N - (methyl) - propionylamido, N-(t-butyl) acetylamido and the like.

The term alkoxycarbonylamino refers to the group having the formula

wherein R' is lower alkyl. The term N-(lower alkyl)alkoxycarbonylamino refers to groups having the formulas

wherein $R_1'$ and $R_2'$ are independently lower alkyl. Typical N-(lower alkyl)alkoxycarbonylamino include, for example, N-methyl-methoxycarbonylamino, N - isopropyl-t-butoxycarbonylamino and the like. The term ureido refers to groups having the formulas

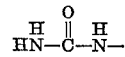

The term N'-lower alkyl ureido refers to groups having the formula

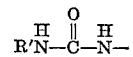

wherein R' is lower alkyl. The term N,N'-lower dialkyl ureido refers to groups having the formula

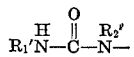

wherein $R_1'$ and $R_2'$ are independently lower alkyl. Typical N,N'-lower dialkylureido groups include, for example, N,N'-dimethylureido, N-methyl-N'-propylureido, N-isopropyl-N'-methylureido, N'-t-butoxy-N-isopropyl - ureido and the like.

The term sulfonamido refers to the group having the formula

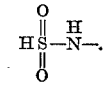

The term S-alkylsulfonamido refers to groups having the formula

wherein R' is lower alkyl. The term S-alkyl-N-alkyl sulfonamido refers to groups having the formula

wherein $R_1'$ and $R_2'$ are independently lower alkyl such as, for example, S-methyl-N-methyl, sulfonamido, S-propyl-N-pentylsulfonamido, S-t-butyl - N - isopropylsulfonamido and the like.

The term thioalkyl refers to groups having the formula R'S— wherein R is lower alkyl. The term alkylsulfinyl refers to groups having the formula

wherein R' is lower alkyl. The term alkylsulfonyl refers to groups having the formula

wherein R' is lower alkyl. The term sulfo refers to the group having the formula

The term alkylsulfonate refers to groups having the formula

wherein R' is lower alkyl. The term sulfamoyl refers to the group having the formula

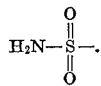

The term alkylsulfamoyl refers to groups having the formula

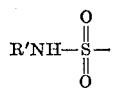

wherein R' is lower alkyl. The term dialkylsulfamoyl refers to groups having the formula

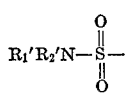

wherein $R_1'$ and $R_2'$ are lower alkyl. Typical dialkylsulfamoyls include, for example, dimethylsulfamoyl, N-isopropyl-N-methylsulfamoyl, N-t-butyl-N - propylsulfamoyl and the like.

The term N-heterocycle or nitrogenheterocycle refer to both saturated and unsaturated heterocyclics having from 5 through 7 ring atoms, one of which is nitrogen and which can optionally also contain a second heterocycle ring atom selected from the group of nitrogen, sulfur and oxygen. Also encompassed within the term are substituted N-heterocyclics having one or two substituents independently selected from the group of lower alkyl, hydroxylower alkyl, and halo. Typical N-heterocycles are, for example, shown by way of formula illustration on page 12 of the parent application, U.S. Ser. No. 193,172, filed Oct. 27, 1971, hereby incorporated by reference.

The term N-heterocycle alkyl refers to a lower alkyl group having a N-heterocyclic substituent as defined herein above. Such groups can be represented by the formula XR'— wherein X is N-heterocyclic and R' is lower alkyl.

The term pharmaceutically acceptable salts refers to pharmaceutically acceptable hydrogen-anion addition salts and pharmaceutically acceptable salts of the $R^3$-carboxy group or the $R^3$-sulfonyl group, inclusively, which do not adversely affect the pharmaceutical properties of the parent compounds. With respect to the addition salts, suitable inorganic anions include, for example, chloride, bromide, iodide, sulfate, phosphate, carbonate, nitrate, hydrocarbonate, sulfite, sulfate and the like. Suitable organic anions include, for example, acetate, benzoate, lactate, picrate, propionate, butyrate, valerate, tartrate, maleate, fumarate, citrate, succinate, tosylate, ascorbate, pamoate, nicotinate, adipate, glyconate, and the like. With respect to the salts of the $R^3$-carboxy and $R^3$-sulfonyl groups (i.e. carbonate and sulfate salts) suitable cations include, for example, sodium, potassium, aluminum, calcium, iron, magnesium, and the like.

Typical illustrations of the compounds of formula I can be had, for example herein below, by reference to Examples 4–10. The preferred $R^3$-substituents in the compounds of formula I, are hydrogen, chloro, phenyl, cyano, aminocarbonyl, methylaminocarbonyl and dimethylaminocarbonyl, acetamido, phenylcarbonylamino, benzylcarbonylamino and especially hydrogen, aminocarbonyl, methylaminocarbonyl and dimethylaminocarbonyl. The preferred $R^1$ and $R^2$ substituents are those wherein one of $R^1$ or $R^2$ is hydrogen and the other is selected from the group of isopropyl; sec-butyl; cyclopropyl; cyclopentyl; α-phenylethyl; γ - phenylpropyl; β - (3,4-dimethoxyphenyl) - ethyl; β-(p-hydroxyphenyl)-ethyl; α - methyl - β - (p - hydroxyphenyl)-ethyl; γ-(p-hydroxyphenyl)-propyl; and α-methyl-γ-(p-hydroxyphenyl)-propyl; and especially isopropyl. The particularly preferred compounds of formula I wherein $R^3$ is hydrogen are:

1-isopropylamino-3-(thiazol-2-oxy)-2-propanol;
1-[β-(3,4-dimethoxyphenyl) - ethylamino] - 3 - (thiazol-2-oxy)-2-propanol;
1-sec-butylamino-3-(thiazol-2-oxy)-2-propanol;
1-cyclopropylamino-3-(thiazol-2-oxy)-2-propanol;
1-cyclopentylamino-3-(thiazol-2-oxy)-2-propanol;
(+)-1-α-phenylethylamino - 3 - (thiazol - 2 - oxy)-2-propanol;
1-γ-phenylpropylamino - 3 - (thiazol-2-oxy)-2-propanol;
1-[β-(p-hydroxyphenyl)-ethylamino] - 3 - (thiazol-2-oxy)-2-propanol;
1-[α-methyl - β - (p-hydroxyphenyl)-ethylamino]-3-(thiazol-2-oxy)-2-propanol;
1-[γ-(p-hydroxyphenyl) - propylamino] - 3 - (thiazol-2-oxy)-2-propanol; and
1-[α-methyl - γ - (p-hydroxyphenyl)-propylamino]-3-(thiazol-2-oxy)-2-propanol.

With respect to the thiazole substituted compounds of formula I (i.e. $R^3$ is other than hydrogen), the 5-position is typically the preferred substituent position. The following 5-position substituted thiazole compounds, and their corresponding 4-position thiazole substituted counterparts, are particularly preferred:

3-(5-hydroxymethylthiazol - 2 - oxy)-1-isopropylamino-2-propanol;
1 - isopropylamino-3-(5-methoxycarbonylthiazol-2-oxy)-2-propanol;
1 - isopropylamino-3-(5-phenylthiazol-2-oxy)-2-propanol;
3-(5-aminocarbonylthiazol - 2 - oxy) - 1 - isopropylamino-2-propanol;
3-(5-methylaminocarbonylthiazol - 2 - oxy)-1-isopropylamino-2-propanol;
3-(5-dimethylaminocarbonylthiazol - 2 - oxy)-1-isopropylamino-2-propanol;
3-(5-acetamidothiazol - 2 - oxy)-1-isopropylamino-2-propanol;
1-isopropylamino - 3 - (5-phenylcarbonylaminothiazol-2-oxy)-2-propanol;
3-(5-benzylcarbonylaminothiazol - 2 - oxy)-1-isopropylamino-2-propanol;
1-isopropylamino - 3 - (5-methoxycarbonylaminothiazol-2-oxy)-2-propanol;
1 - isopropylamino-3-(5-ureidothiazol-2-oxy)-2-propanol;
1-isopropylamino - 3 - (5-sulfamoylthiazol-2-oxy)-2-propanol;
1-isopropylamino - 3 - (5-methylsulfonylthiazol-2-oxy)-2-propanol;
1-isopropylamino - 3 - (5-methylsulfonylaminothiazol-2-oxy)-2-propanol; and
1-isopropylamino - 3 - (5-methylsulfinylthiazol-2-oxy)-2-propanol.

Typical illustrations of the compounds of formula II can be had, for example, herein below, by reference to Example 3. Since the primary use of compounds of formula II is as intermediate for the compounds of formula I, the preferred $R^3$ substituents are the same as listed above for formula I and the particularly preferred compounds of formula II are the precursors corresponding to the particularly preferred compounds of formula I set forth herein above.

Typical illustrations of the compounds of formula III can be had, herein below, by reference to Examples 12, 13 and 17.

The preferred and especially preferred $R^3$ substituents in the compounds of formula III are selected from the group consisting of hydrogen, hydroxymethyl, methoxycarbonyl, phenyl, aminocarbonyl, methylaminocarbonyl, dimethylaminocarbonyl, acetamido, phenylcarbonylamino, benzylcarbonylamino, methoxycarbonylamino, ureido, sulfamoyl, methylsulfamoyl, methylsulfonylamino, methylsulfonyl, methylsulfinyl, methylsulfonamido and cyano. The preferred $R^4$- and $R^5$-substituents are those wherein $R^4$ and $R^5$ are each hydrogen or are each methyl. The preferred $R^6$ groups are isopropyl, sec-butyl, cyclopropyl, cyclopentyl, α-phenylethyl, γ-phenylpropyl, β - (3,4-dimethoxyphenyl) - ethyl, β-(p-hydroxyphenyl)-ethyl, α-methyl - β - (p-hydroxyphenyl)-ethyl, γ-(p-hydroxyphenyl)-propyl and α-methyl-γ-(p-hydroxyphenyl)-propyl and especially isopropyl.

The particularly preferred compounds of formula III wherein $R^3$ is hydrogen are:

thiazol-2'-oxy-5-methylene-N-isopropyloxazolidine;
thiazol-2'-oxy-5-methylene-N-[β-(3,4-dimethoxyphenyl) ethyl]-oxazolidine;
thiazol-2'-oxy-5-methylene-N-sec-butyloxazolidine;
thiazol-2'-oxy-5-methylene-N-cyclopropyloxazolidine;
thiazol-2'-oxy-5-methylene-N-cyclopentyloxazolidine;
(+)-thiazol-2'-oxy-5-methylene-N-α-phenylethyloxazolidine;
thiazol-2'-oxy-5-methylene-N-γ-phenylpropyloxazolidine;
thiazol-2'-oxy-5-methylene-N-β-(p-hydroxyphenyl)-ethyloxazolidine;
thiazol-2'-oxy-5-methylene-N-[α-methyl-β-(p-hydroxyphenyl)ethyl]-oxazolidine;
thiazol-2'-oxy-5-methylene-N-γ-(p-hydroxyphenyl)-propyl-oxazolidine; and
thiazol-2'-oxy-5-methylene-N-[α-methyl-γ-(p-hydroxyphenyl)-propyl]-oxazolidine.

With respect to the thiazole substituted compounds of formula III, the following 5'-position substituted thiazole compounds, and their 4'-position thiazole substituted counterparts, are particularly preferred:

5'-hydroxymethylthiazol-2'-oxy-5-methylene-N-isopropyl-oxazolidine;
5'-methoxycarbonylthiazol-2'-oxy-5-methylene-N-isopropyloxazolidine;
5'-phenylthiazol-2'-oxy-5-methylene-N-isopropyl-oxazolidine;
5'-aminocarbonylthiazol-2'-oxy-5-methylene-N-isopropyl-oxazolidine;
5'-methylaminocarbonylthiazol-2'-oxy-5-methylene-N-isopropyloxazolidine;
5'-dimethylaminocarbonylthiazol-2'-oxy-5-methylene-N-isopropyloxazolidine;
5'-acetamidothiazol-2'-oxy-5-methylene-N-isopropyl-oxazolidine;
5'-phenylcarbonylaminothiazol-2'-oxy-5-methylene-N-isopropyloxazolidine;
5'-benzylcarbonylaminothiazol-2'-oxy-5-methylene-N-isopropyloxazolidine;
5'-methoxycarbonylaminothiazol-2'-oxy-5-methylene-N-isopropyloxazolidine;
5'-ureidothiazol-2'-oxy-5-methylene-N-isopropyl-oxazolidine;
5'-sulfamoylthiazol-2'-oxy-5-methylene-N-isopropyl-oxazolidine;
5'-methylsulfinylthiazol-2'-oxy-5-methylene-N-isopropyl-oxazolidine.

The preferred pharmaceutical acceptable salts are hydrogen addition salts of chloride, bromide, sulfate, maleate, lactate, tartrate, succinate and especially chloride and maleate. Thus the preferred salts are the preferred anion addition salts of formulas I and III and correspondingly the particularly preferred salts are the preferred hydrogen anion addition salts of the preferred and particularly preferred compounds of formulas I and III and especially the hydrochloride and maleate addition salts.

One process, according to the invention, for preparing the compounds of formulas I and II, of the invention, can be conveniently represented by the following schematic overall reaction equations:

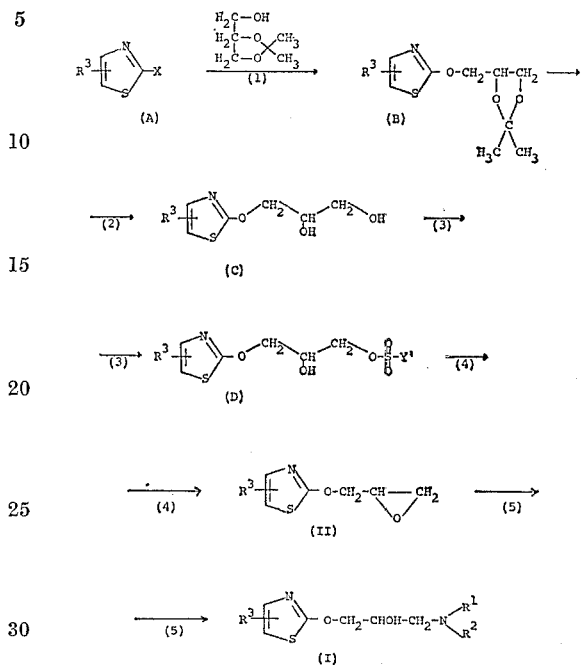

wherein X is bromo or chloro, Y' is alkyl or phenyl, and $R^1$, $R^2$, and $R^3$ have the same meanings as set forth herein above.

Step (1) of the above process can be effected by treating the thiazole compound of formula A with glycerol acetonide in a suitable inert solvent, in the presence of an alkali metal hydride. Typically, this treatment is conducted at temperatures in the range of about from 20° C. to reflux for about from a few minutes to 20 hours, using mole ratios in the range of about from 1 to 100 moles of glycerol acetonide per mole of compound A. However, temperature, reaction times, and mole ratios both above and below can also be used. Suitable alkali metal hydrides which can be used include, for example, sodium hydride, potassium hydride, calcium hydride, lithium hydride and the like. Suitable inert organic solvents which can be used include, for example, monoglyme, tetrahydrofuran, diglyme, dimethylformamide, and the like. Also an excess of glycerol acetonide can be used as the solvent. Further by using the optically pure (+) glycerol acetonide isomer (see *J. Biol. Chem.*, v. 128, p. 463 (1939)) or the optically pure (−) glycerol acetonide isomer (see *J. Am. Chem. Soc.*, v. 67, p. 944 (1945)) the corresponding (+) or (−) optically active isomer of formula B is obtained. Correspondingly, wherein a (+) and (−) isomer mixture of the glycerol acetonide is used, the product will similarly be a mixture of isomers. This optically active isomer relationship between the starting materials and products exist throughout all the steps of various processes described herein. Also typically and conveniently, a racemic glycerol acetonide isomer mixture will be used and thus typically the product will correspondingly be a racemic mixture.

Step (2) can be conveniently effected by treating the compound of formula B with a suitable organic or inorganic acid, preferably in a suitable inert solvent. Typically this treatment is conducted at temperatures in the range of about from 0° to 65° C. and preferably about 25-30° C. for about from three minutes to 18 hours and preferably about from 1 to 4 hours. However, temperatures, reaction times and mole ratios both above and below these ranges can also be used. Suitable inorganic acids which can be used include, for example, hydrochloric acid, hydrobromic acid, sulfuric acid, phosphoric acid and the like. Suitable organic acids which can be used include, for example, formic acid, oxalic acid, acetic acid, propionic acid, and the like. Suitable solvents which can be used include, for example, water, methanol, acetone, monoglyme, ether and the like. Good results are typically obtained by using aqueous formic acid solution.

Step (3) of the above process can be effected by treating the compound of formula C with a suitable phenyl sulfonyl chloride or bromide or alkyl sulfonyl chloride or bromide, in a suitable organic solvent. The particular sulfonyl derivative used is largely immaterial since the sulfonyl substituent is split off during the next step. Thus, typically other phenyl sulfonyl chloride or bromide or alkyl sulfonyl chloride or bromide derivatives can also be used. Typically this treatment is conducted at temperatures in the range of about from 0° to 60° C. and preferably about from 0° to 25° C. for about from 5 minutes to 18 hours, preferably about from 10 minutes to 45 minutes, using mole ratios in the range of about from 1.0 to 1.1 moles of sulfonyl derivative per mole of compound of formula C. However, temperatures, treatment times, and mole ratios both above and below these ranges can also be used. Suitable phenyl sulfonyl chlorides or bromides, which can be used include, for example, benzene sulfonyl chloride, benzene sulfonyl bromide, or p-toluene sulfonyl chloride, p-ethyl benzene sulfonyl bromide, and the like. Suitable alkyl sulfonyl chlorides, and bromides, which can be used include, for example, methane sulfonyl chloride, methane sulfonyl bromide and the like. Suitable organic solvents which can be used include, for example, pyridine, triethylamine or other tertiary amines, and the like.

Step (4) can be conveniently effected by treating the compound of formula D with a strong base preferably in an inert organic solvent. Conveniently this treatment is conducted by adding a strong base directly to the product reaction mixture of step (3) without separation of the product of formula D from the reaction mixture. The treatment can, of course, also be applied to the isolated product of formula D. Typically, this treatment is conducted at temperatures in the range of about from 0° to 100° C., preferably about from 20° to 60° C. for from ½ hour to 3 hours, and preferably about from ½ hour to 1 hour. However, temperatures and reaction times both above and below these ranges can also be used. Suitable strong bases which can be used include, for example, alkali metal hydroxides such as, for example, sodium hydroxide, potassium hydroxide, and the like, and alkali metal alkoxides such as, for example, sodium methoxide, potassium methoxide, and alkyl or aryl lithiums such as butyl lithium, octyl lithium, phenyl lithium and the like. Suitable inert organic solvents include, for example, monoglyme, ethyl ether, benzene and the like.

Step (5) can be conducted by treating the intermediate product of formula II, of the invention, with the desired $R^1$, $R^2$ amine or amino derivative or N-heterocyclic derivative, including amines incorporated in cyclic systems. For example by treating the compound of formula II with alcoholic solution of ammonia, the corresponding compounds of formula I wherein each of $R^1$ and $R^2$ is hydrogen is obtained. Similarly, treatment with a monoalkyl amine will yield the corresponding compound of formula I wherein one of $R^1$ or $R^2$ is the corresponding alkyl group and the other is hydrogen, and where a dialkyl amine is used, each of $R^1$ and $R^2$ will be alkyl group. Correspondingly, using a nitrogen heterocyclic such as, for example, piperidine; pyrrolidine; or morpholine will afford the corresponding $N_1$-piperidino; $N_1$-pyrrolidinyl; or $N_1$-morpholino, respectively, compounds of formula I. Further although optimum conditions and solvents will vary with the particular intermediate of formula II and ammonia or amino-type derivatives used, the treatment is typically conducted at temperatures in the range of about from 25° to 100° C. for about from 10 minutes to 18 hours. However, temperature ranges both above and below these can also be used. Suitable solvents which can be used include, for example, monoglyme, methanol, ethanol, pyridine and the like.

Also although not specifically stated, it should be understood, as would be apparent to one having ordinary skill in the art, that where the starting material for a given step has free hydroxy or free amino groups, which could interfere with the treatment, such groups are preferably protected with conventional labile ester or ether groups by procedures which are well within the scope of the art. For example, with respect to step (3), free hydroxy groups, other than the 1 and 2 hydroxy propane groups, are conveniently protected by treatment with acetic anhydride. The acetate protecting group can then be conveniently removed, after the treatment of step (3), via treatment with a mild base.

Preferably, with the exception of step (4) which, as noted above, is conveniently conducted by addition to the previous product reaction mixture, the respective products of each step are isolated prior to their subsequent use as starting materials for the next succeeding step. Separation and isolation can be effected by any suitable separation or purification procedure such as, for example, evaporation, crystallization, chromatography, thin-layer chromatography, etc. Specific illustrations of typical separation and isolation procedures can be had by reference to the corresponding examples described herein below. However, other equivalent separation or isolation procedures could, of course, also be used. Where an isomer mixture of the product of formula I is obtained, for example where racemic glycerol acetonide mixture has been used in step (1), the respective optically active (+) and (−) isomers can be resolved by conventional procedures. Such as, for example, by reacting the compounds of formula I with an optically active acid which will yield pure optical salts of the compounds of formula I and then isolating the respective (+) and (−) optical salts by repeated crystallization.

The initial starting materials of formula A are generally known compounds or can be prepared according to known procedures and/or according to the preparations described herein below, or by obvious modification of such procedures and preparations. For example, procedures for preparing 2,5-dibromothiazole are described in *Recueil des Travaux Chimiques des Pays Base*, vol. 73, p. 325 (1964) and the 2,4-dibromothiazole in *Bulletin de la Societe Chimique de France*, p. 1735 (1962). 2-bromo-5-nitrothiazole is described in *Helv. Chim. Acta.*, vol. 33, p. 306 (1950) and 4-acetamido-2-bromothiazole and 4-amino-2-bromothiazole hydrobromide are described in the *Journal of Organic Chemistry*, vol. 28, p. 1877 (1963). However, because of the unavailability or difficulties involved preparing the starting material of formula A, or because in certain instances it is generally more convenient to prepare other intermediates than the 4- or 5-substituted thiazole starting material of formula A, the following preparations are preferred in those instances. In each case the intermediate can then be used as starting material in its respective place in the above described process sequence.

For example, the $R^3$-cyano compounds, of the invention, can be conveniently prepared via the $R^3$-cyano compound of formula B which in turn can be conveniently prepared from the corresponding $R^3$-bromo compounds of formula B:

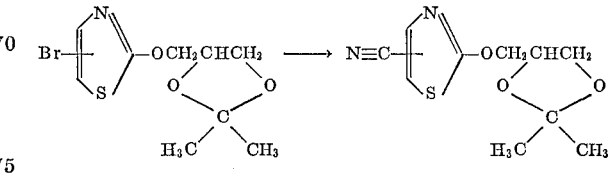

This preparation can be effected by treating the R³-bromo compound of formula B with cuprous cyanide or potassium cyanide in a suitable inert organic solvent followed by treatment with a mild base to neutralize any hydrogen cyanide which may have been formed. Typically the initial treatment is conducted at temperatures in the range of about from 60 to 150° C., preferably about from 60° to 120° C. for about from 1 hour to 24 hours, preferably about from 2 to 8 hours, using mole ratios in the range of about from 1 to 200 moles of cuprous cyanide per mole of R³-bromo compound of formula B. However, temperatures, treatment times and mole ratios both above and below these ranges can also be used. Best results are obtained by conducting the treatment under anhydrous conditions and preferably under sealed conditions. Suitable inert organic solvents which can be used include, for example, pyridine, dimethylformamide, dimethylsulfoxide, diglyme, hexamethylphosphorous triamide, and the like, and mixtures of such solvents. Also in place of cupric cyanide, the following compounds can be used: potassium cyanide, sodium cyanide, lithium cyanide and the like.

The R³-acyl, alkoxycarbonyl, and hydroxyalkyl compounds can also be conveniently prepared via the corresponding intermediate of formula B. These intermediates can be prepared via a 4- or 5-lithium substituted thiazole derivative corresponding to formula B, which can be conveniently prepared from the corresponding bromothiazole derivative.

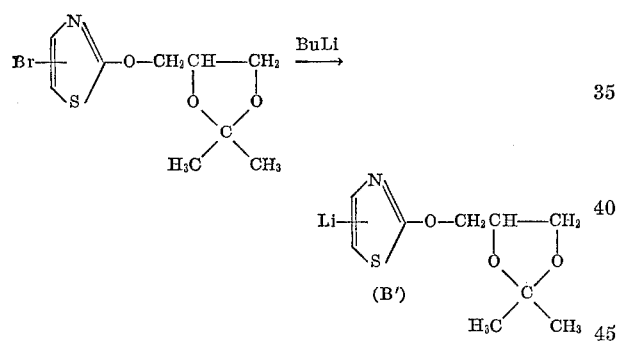

This preparation can be conveniently effected by treating the R³-bromo compound of formula B with an alkyl lithium reagent, e.g., t- or n-butyllithium, in a suitable inert organic solvent. Typically, this treatment is conducted at temperatures in the range of about from −10° to −150° C., preferably in the range of about from −60° to −80° C. for about from ½ hour to 2 hours, preferably about ½ to 1 hour, using mole ratios in the range of about from 2 to 3 moles of butyllithium per mole compound of formula B. However, temperature, reaction times, and mole ratios both above and below these ranges can also be used. Best results are typically obtained by conducting the treatment under anhydrous conditions and preferably in the absence of air such as, for example, by conducting the treatment under an inert gas such as nitrogen. Suitable inert organic solvents which can be used include, for example, tetrahydrofuran, hexane, ethyl, ether, monoglyme, and the like, and mixture of such solvents.

The R³-acyl,

and -hydroxyalkyl ocmpounds of formula B can then be prepared by a series of treatments which can be represented by the following sequence of overall reaction equations:

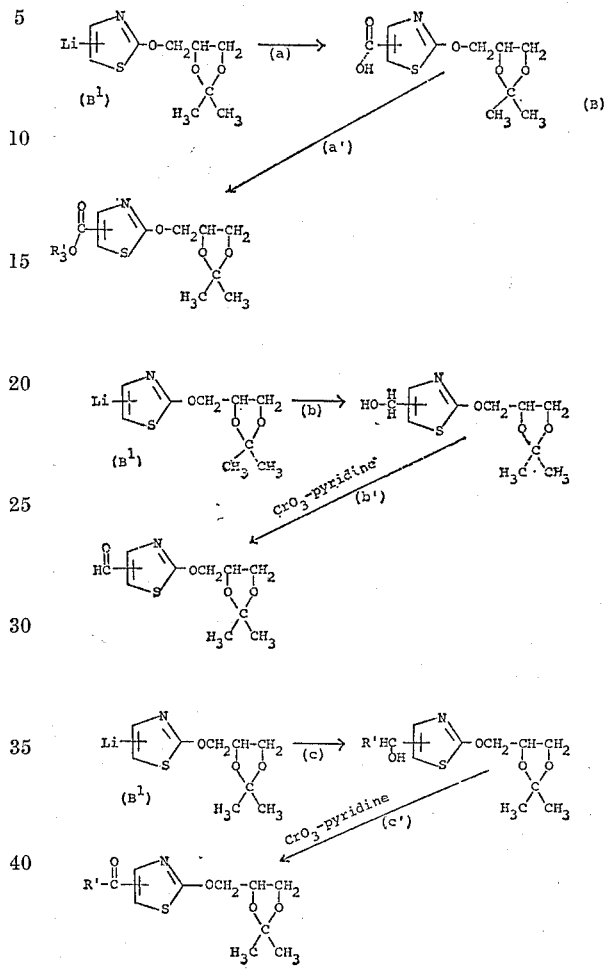

wherein R' is lower alkyl and R₃' is as defined herein above.

Step (a) can be effected by treating the compound of formula B¹, in a suitable inert organic solvent, with carbon dioxide. This treatment can be conveniently effected by treating in situ the compound of formula B¹, in the inert organic solvent, with gaseous carbon dioxide, and is typically conducted at temperatures in the range of about from −10° to −150° C., and preferably about from −10° to −80° C., for about from ½ hour to 2 hours. Best results are again obtained by conducting the reaction under anhydrous conditions. Suitable inert organic solvents include those solvents which were named herein above with respect to the preparation of the lithium intermediate of formula B¹. Step (a') can be conveniently effected by treating the R³-carboxy acid compound of formula B with a diazoalkane, having the desired alkyl group, in a suitable inert organic solvent. Typically this treatment is conducted at temperatures in the range of about from 0 to 25° C., preferably about from 0 to 10° C. for about from 1 minute to 2 hours, using a mole ratio of about from 1 to 3 moles of diazoalkane per mole of compound of formula B¹. However, temperatures, reaction times and mole ratios both above and below these ranges can also be used. Suitable diazoalkanes which can be used include, for example, diazomethane, diazoethane, and the like. Suitable inert organic solvents which can be used include, for example, ether, methanol, monoglyme, and the like, and mixture thereof of such solvents.

The R³-alkoxycarbonyl and also the R³-aryloxy and R³-arylalkoxy compound can be prepared by converting the carboxy compound of formula B to its sodium salt and then treating this sodium salt with an alkyl halide or aryl halide or arylalkyl halide having the desired alkyl, aryl or arylalkyl group. Preparation of the sodium salt can be conveniently effected by treating the R³-carboxy compound of formula B with a sodium alkoxide (e.g., sodium methoxide) in a suitable inert organic solvent, conveniently the same solvent as used for the halide treatment. The treatment is conveniently conducted at room temperature using a slight excess of the sodium alkoxide. The sodium salt is then treated with the desired alkyl halide in a suitable inert organic solvent. Typically this treatment is conducted at temperatures in the range of about from 20 to 100° C. for about from 1 to 24 hours using mole ratios in the range of about from 2 to 50 moles of alkyl halide per mole of sodium salt. Suitable alkyl halides include, for example, methyl iodide, isopropyl iodide, hexyl iodide, t-butyl chloride, valeryl bromide, phenyl iodide, benzyl iodide and the like. Suitable inert organic solvents include, for example, dimethylformamide, monoglyme, acetonitrile and the like.

Step (b) can be effected by treating the compound of formula B¹ with formaldehyde in an inert organic solvent. Again, this step can be conveniently effected by treating the product reaction mixture used to prepare the compound of formula B¹. This treatment is typically conducted at temperatures in the range of about from −10 to −100° C., preferably about from −20 to −40° C., for about from ½ hour to 2 hours, and preferably about from ½ hour to 1 hour. However, temperatures and reaction times both above and below these ranges could also be used. Best results are again obtained by conducting the treatment under anhydrous conditions. Suitable inert organic solvents which can be used include those described hereinabove with respect to the preparation of the compounds of formula B¹. Step (b′) can be effected by treating the R³-hydroxymethyl compound of formula B with chromic trioxide (CrO₃) in pyridine solvent. Typically, this treatment is conducted at temperatures in the range of about from −20 to 30° C., preferably about from 0° to 5° C. and about from 15 minutes to 8 hours, preferably about from 3 to 5 hours using mole ratios in the range of about from 1 to 2 moles of chromic trioxide per mole of compound of formula B. Alternatively, the oxidation can be effected with chromic trioxide-pyridine complex in methylene chloride. Other reagents which can be used in place of chromic trioxide include, for example, manganese dioxide, dichloro dicyanoquinone, dimethylsulfoxide-dialkyl carbodiimide, and the like. Suitable solvents which can be used include, for example, methylene chloride, dioxane, monoglyme, and the like.

Step (c) can be effected by treating the compound of formula B¹ with an alkyl aldehyde having the desired alkyl group, in a suitable inert organic solvent. Again, this treatment is preferably effected by adding the alkyl aldehyde directly to the product reaction mixture used to prepare the compound of formula B¹. Typically, this treatment is conducted at temperatures in the range of about from −10 to −150° C. and preferably about from −60 to −80° C. for about from 1 to 8 hours, preferably about from ½ hour to 2 hours using mole ratios in the range of about from 1.1 to 10 moles. Suitable aldehydes which can be used, depending upon the desired alkyl group, include, for example, acetaldehyde, propionaldehyde, n-butyraldehyde, t-butyraldehyde, n-valeraldehyde, and the like. Suitable solvents which can be used include, for example, those previously described with respect to the preparation of the lithium intermediate of formula B¹. Step (c′) can be effected in the same manner as described hereinabove as step (b′).

Starting materials for the R³-amino or nitrogen derivative types of substituents (e.g., amide, urethane, urea, etc.) starting materials can be prepared according to the following sequence represented by the following schematic overall reaction equations:

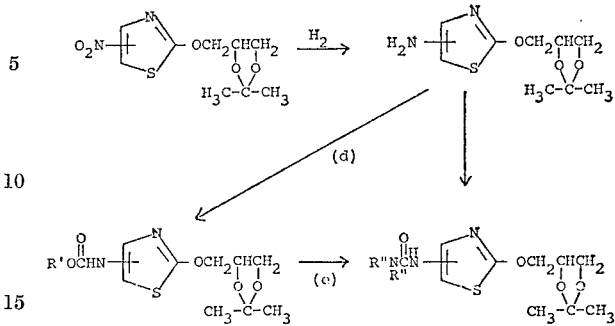

As shown above, the R³-amino compounds of formula B can be prepared from the corresponding R³-nitro compounds of formula B via hydrogenation. This can be conveniently effected by treating the R³-nitro compound of formula B in a suitable inert organic solvent with gaseous hydrogen in the presence of a suitable catalyst such as, for example, Raney nickel. This treatment is typically conducted at temperatures in the range of about from −30° to +30° C., preferably about from 25° to 30° C., for about from 15 minutes to 16 hours and preferably about from 1 to 3 hours. Suitable solvents which can be used include, for example, ethanol, methanol, ethyl acetate, tetrahydrofuran, and the like. Suitable hydrogenation catalysts which can be used include, for example, Raney nickel, palladium, and the like. Step (d) of the above reaction sequence can be effected in two phases. In the first phase the R³-amino compound of formula B is treated with sodium hydride in an inert organic solvent containing a catalytic amount of t-butanol. Typically, this treatment is conducted at temperatures in the range of about from 0 to 20° C., for about from 1 to 24 hours and preferably about from 7 to 8 hours. Best results are obtained by conducting this treatment under anhydrous conditions and preferably under an inert gaseous atmosphere. In the second phase the desired alkyl chloroformate is then conveniently added to the reaction mixture, without separation of the intermediate product, and the mixture maintained at from about −10° to 80° C., preferably at reflux, for from about ½ hour to 16 hours. Suitable alkyl chloroformates which can be used include, for example, methyl chloroformate, ethyl chloroformate, isopropyl chloroformate, t-butyl chloroformate, n-butyl chloroformate, and the like. Alternatively, step (d) can be effected by treating the R³-amino compound of formula B with an alkyl chloroformate, of the desired alkyl group, in an inert organic basic solvent. Typically this treatment is conducted at temperatures in the range of about from 0 to 30° C. for about from 1 to 24 hours. The same range of alkyl chloroformates can be used in this treatment as above. Suitable basic solvents include, for example, pyridine, triethylamine and the like.

Step (e) of the above reaction sequence can be effected by treating the R³-alkoxycarbonylamino of formula B in a suitable inert organic solvent with anhydrous ammonia or the desired alkylamine. In the case of ammonia or the more volatile amines (e.g., methylamine, ethylamine, etc.) treatment can be conveniently conducted by passing gaseous ammonia or the desired alkylamine through a solution containing the alkoxycarbonylamine of formula B in a suitable solvent. Typically, this treatment is conducted at temperatures in the range of about from 20 to 100° C. and preferably about from 20 to 70° C. When alkylamines having higher boiling points are used, the treatment is conveniently conducted by treating the compounds of formula B, in a suitable inert organic solvent, with an excess of the amine at temperatures in the range of about from 50 to 125° C. Suitable amines which can be used include, for example, isopropylamine, n-butylamine, cyclohexylamine, and the like.

Alternatively, the $R^3$-ureido ($R''$ is hydrogen) compounds of formula B can be prepared directly from the corresponding $R^3$-amino compound via treatment with silicon tetraisocyanate in a suitable inert organic solvent. Typically, this treatment is conducted at temperatures in the range of about from 0° to 80° C., preferably about from 20 to 40° C. for about from 1 to 2 hours. Suitable solvents which can be used include, for example, benzene, toluene, xylene, and the like.

The $R^3$-formamide, alkoxycarbonylamino and ureido or alkylureido compounds can also be prepared starting from the known $R^3$-carboxylic acid ethyl ester (*Helv. Chim. Acta.*, 29, 1230 (1946)) according to the sequence represented by the following schematic reaction equations:

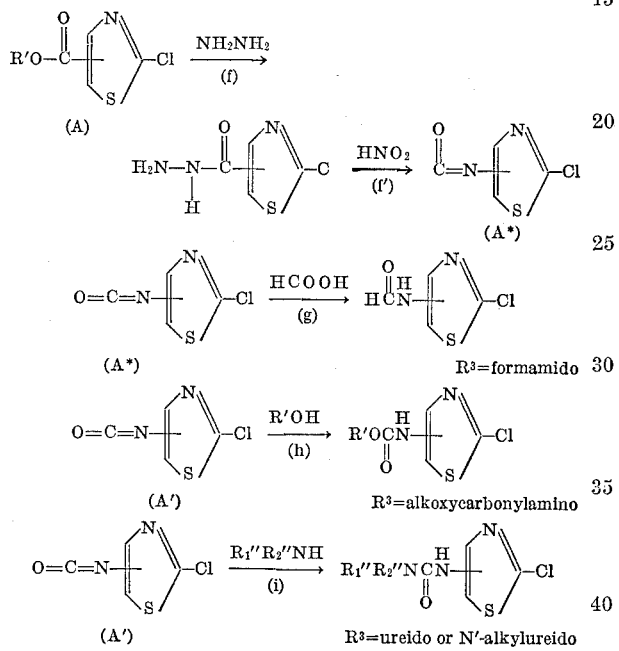

wherein $R'$ is lower alkyl, aryl or arylalkyl and $R_1''$ and $R_2''$ are independently hydrogen, lower alkyl, aryl or arylalkyl.

Step (f) of the above reaction sequence can be effected by treating the above 2-chloro-$R^3$-carboxylic acid or alkyl ester compound of formula A with hydrazine hydrate. Typically, this treatment is conveniently conducted at temperatures in the range of about from 0° to 100° C., for about from 1 to 6 hours. Suitable inert organic solvents which can be used include, for example, methanol, ethanol, monoglyme, dimethylformamide and the like. Step (f') is effected in two steps first by treating the $R^3$-hydrazide product of step (f) with nitrous acid. The nitrous acid can be conveniently prepared by reacting sodium nitrite and conc. hydrochloric acid. The treatment (step (f)(1)) is conveniently conducted at ambient temperatures although temperatures both above and below ambient can also be used. The resulting $R^3$-azide compound of formula A is then heated (step f') (2)) at temperatures in the range of about from 60 to 150° C. under anhydrous conditions in a suitable inert organic solvent; to give the $R^3$-isocyanate of formula A*. Suitable inert organic solvents which can be used include, for example, benzene, toluene, xylene, diglyme, triglyme, and the like, and mixtures of such solvents.

Step (g) can be effected by treating the $R^3$-isocyanate compound of formula A* with formic acid in a suitable inert organic solvent. Typically, this treatment is conducted at temperatures in the range of about from 0° to 60° C., preferably about from 10 to 30° C. for about from 1 to 5 hours. Suitable inert organic solvents which can be used include, for example, benzene, glyme, ethyl ether, formic acid, and the like.

The $R^3$-alkoxycarbonylamino compound of formula A can be prepared, according to step (h), by treating the compounds of formula A; with an alkyl, aryl or arylalkyl alcohol of the desired $R'$ group. Typically, and preferably, this treatment is conducted at temperatures in the range of about the reflux temperature of the system, for about from ½ hour to 5 hours. Suitable alcohols which can be used include, for example, methanol, ethanol, isopropanol, phenol, benzyl alcohol and the like. Alternatively, the treatment can be conducted in an inert organic solvent such as, for example, monoglyme, dioxane, benzene, and the like.

The $R^3$-ureido or $N'-R_1'',R_2''$ ureido compounds of formula A can be prepared via step (i), by treating the compound of formula A' with anhydrous ammonia or an amine having the desired $R_1''$ and/or $R_2''$ group with or without an inert organic solvent. This treatment is typically conducted at temperatures in the range of about from 20 to 100° C. for about from 1 to 72 hours using mole ratios in the range of about from 1 to 50 moles of ammonia or alkylamine per mole of thiazole derivative.

The $R^3$-formamide, alkoxycarbonylamino, ureido and $N'$-alkylureido compounds of formula B and formula C can be obtained by respectively applying the above sequence of treatment to the corresponding $R^3$-alkoxycarbonyl compounds of formula B and $R^3$-alkoxycarbonyl, 1- and 2-acylated compounds of formula C, i.e.,

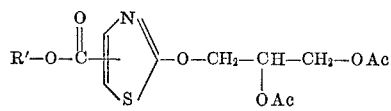

wherein Ac is acyl. In the case of the acylated compounds of formula C, the 1- and 2-acyloxy groups can be conveniently removed from the $R^3$-formamide, acylamido, ureido or $N'$-alkylureido products by either acid or base hydrolysis.

The $R^3$-alkylamino; N-alkyl-alkoxycarbonylamino; and dialkylamino compounds of formula B can be prepared via the following schematic overall reaction equations:

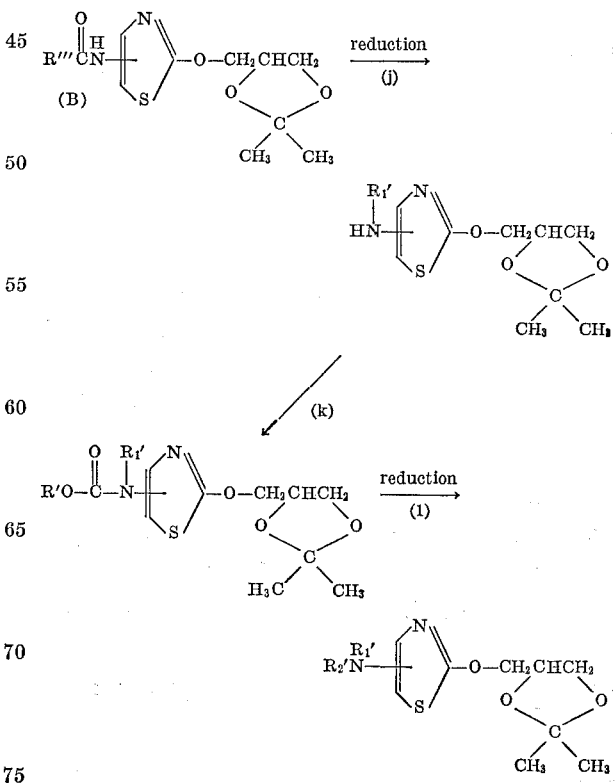

wherein R', R₁' and R₂' are independently lower alkyl and R''' is hydrogen, lower alkyl or lower alkoxy.

Step (j) can be conveniently effected by treating the R³ is

compound of formula B with lithium aluminum hydride (LiAlH₄) in an inert organic solvent such as, for example, tetrahydrofuran and the like. Preferably the treatment is conducted at reflux for about from ½ to 5 hours.

The R³-N-alkyl-alkoxycarbonylamino compounds of formula B can then be prepared, according to step (k), by treating the corresponding R³-alkylamino compounds of formula B with an alkyl chloroformate having the desired R' alkyl group. This treatment can be conducted in the same manners as described herein above with respect to step (d) and alternative step (d'). The R³-dialkylamino compounds can then be prepared (step (l)) by reduction with lithium aluminum hydride in the same manner as described herein above with respect to step (j).

The R³-N-alkylformamide compounds of formula C can be conveniently prepared by treating the R³-alkylamino or R³-dialkylamino compounds of formula B with formic acid in a suitable inert organic solvent such as, for example, benzene, xylene, diglyme and the like. The treatment is preferably conducted at reflux. Further as the treatment is conducted under acidic conditions, the acetonide moiety, of formula B, will concomitantly be cleaved yielding the diol moiety of formula C.

The R³-N-alkyl ureido (i.e., R³ is

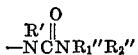

wherein R' is lower alkyl and R₁' and R₂' are independently hydrogen or lower alkyl) can be prepared by treating the corresponding R³ is N-alkyl-alkoxycarbonylamino compound of formula A, having the desired N-alkyl (i.e., R') group according to the same procedure as described herein above with respect to step (e).

The starting materials for the R³-sulfonamido or alkyl sulfonamido aryl sulfonamido can be prepared by treating the corresponding R³-amino or alkylamino compounds of formula B with a mixture of alkali metal t-butoxide, or a tertiary amine such as pyridine or triethylamine, and alkyl or aryl sulfonyl chloride having the desired alkyl or aryl substituent. This treatment is typically conducted at temperatures in the range of about from 0° to 60° C. for about from 1 hour to 16 hours. Suitable alkyl sulfonyl chlorides which can be used include, for example, methane sulfonyl chloride, ethane sulfonyl chloride and the like. Suitable aryl sulfonyl chlorides which can be used include, for example, phenyl sulfonyl chloride, p-toluene sulfonyl chloride and the like. Suitable solvents include, for example, benzene, ether, tetrahydrofuran, glyme, and the like. This treatment can be represented by the following overall schematic reaction equation:

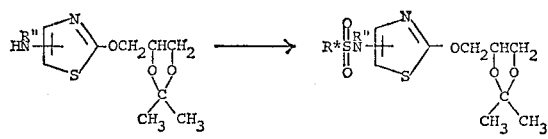

wherein R'' is hydrogen or lower alkyl, and R* is lower alkyl, aryl or substituted aryl.

The R³-thioalkyls, alkyl sulfinyls, alkyl sulfonyls can be prepared from the corresponding R³-bromo compounds of formula B according to the following schematic overall reaction equation sequence:

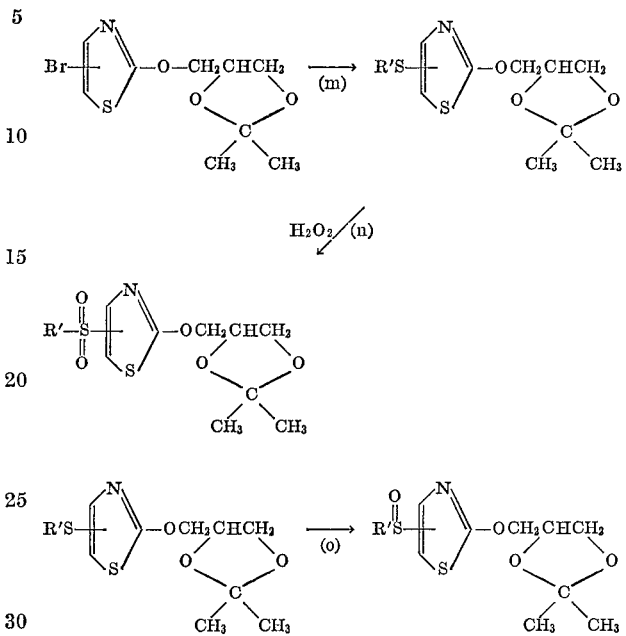

wherein R' is lower alkyl.

Step(m) can be effected by treating the R³-bromo compound of formula B with the desired alkyl mercaptan in a hydroxylic organic solvent containing an alkali metal alkoxide. Preferably the R³-bromo compound of formula C is added to a mixture containing the alkyl mercaptan and alkali metal alkoxide in a suitable inert organic solvent. Typically, this reaction is conducted at the reflux temperature of the system or under pressure at higher temperature. However, temperatures both above and below reflux could also be used. For example in pressure systems, temperatures in the range of about from 80 to 180° C. typically yield good results. Suitable alkyl mercaptans which can be used include, for example, methyl mercaptan, ethyl mercaptan, propyl mercaptan, isopropyl mercaptan, butyl mercaptan, t-butyl mercaptan, and the like. Suitable solvents which can be used include, for example, methanol, ethanol, dimethylformamide, hexamethyl phosphoramide, the mercaptan themselves and the like. Suitable alkali metal alkoxides which can be used include, for example, sodium ethoxide, potassium ethoxide, lithium ethoxide and the like.

The R³-alkyl sulfonyl can be prepared according to step (n) by treating the corresponding R³-thioalkyl compounds with hydrogen peroxide in acetic acid. Typically, this treatment is conducted at temperatures in the range of about from 20 to 100° C. for about from 1 to 24 hours.

The R³-alkyl sulfinyl compounds of formula B can be prepared according to step (o), by treatment of the corresponding R³-thia alkyl compounds with m-chloroperbenzoic in a suitable inert organic solvent. Typically, this treatment is conducted at temperatures in the range of about from −10° to 60° C. Suitable inert organic solvents which can be used include, for example, methylene chloride, chloroform, benzene and the like. Also in place of m-chloroperbenzoic acid, other peracids and periodates such as, for example, peracetic acid and sodium periodate and the like can be used.

The R³-sulfamoyl compounds of formula B can be prepared from the corresponding R³-alkyl sulfonato compounds of formula A wherein X is bromo. This preparation can be represented by the following schematic overall reaction equation sequence:

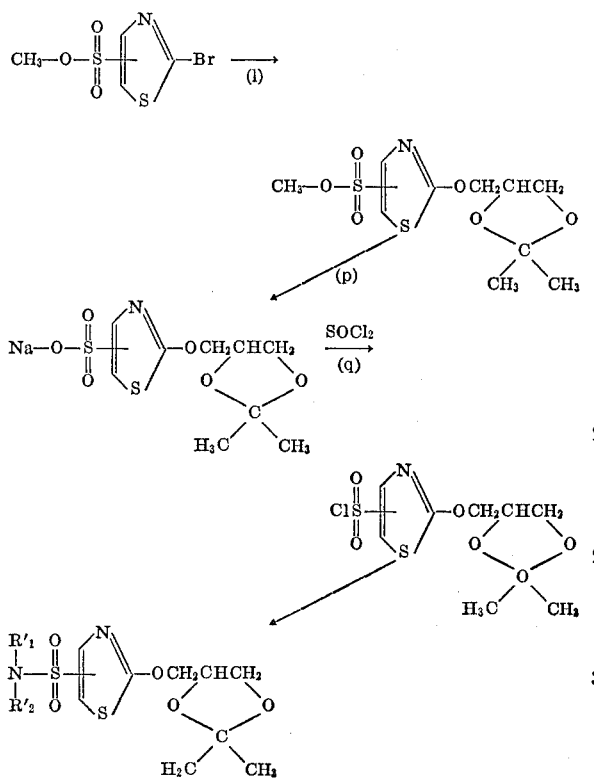

Step (1), the conversion of the 2-bromo group into the corresponding 1,2-propylacetonide can be effected according to the same procedures described hereinabove with respect to the generic process step (1).

The 5-methylsulfonate-2-bromo-thiazole compound of formula A can be prepared via treatment of the known 5-sulfo-2-bromothiazole, e.g., see *Helv. Chim. Acta.*, vol. 28, p. 985 (1945), with sodium methoxide followed by treatment with methyl iodide. With respect to the 4-methylsulfonate compounds of formula (B) these compounds can be prepared by treating the known 4-sulfo-2,5-dibromo-thiazole compound (*Helv. Chim. Acta.*, vol. 28, p. 985 (1945)) with sodium methoxide and methyl iodide. This affords 4-methylsulfonate-2,5-dibromo-thiazole which is preferably converted to 1-[4-methylsulfonyl-5-bromo-thiazol - 2 - oxy]-propanediol-2,3-acetonide and then reduced to the R³-methylsulfonyl compound of formula B. Typically the reduction can be effected via contact with gaseous hydrogen, in the presence of a suitable catalyst, e.g., Raney nickel, in a suitable inert organic solvent such as, for example, methanol containing a small amount of triethylamine. Alternatively, treatment of the bromo compound with excess zinc in boiling ethanol yields the debrominated compound.

Step (p) can be conveniently effected by treating the R³-methylsulfonato compound of formula B with aqueous sodium hydroxide, in a suitable inert organic solvent such as, for example, methanol.

The R³-sodium sulfonato compound of formula B is treated with thionyl chloride in a suitable inert organic medium. This treatment is typically conducted at temperatures in the range of about from —10° to 80° C. and preferably about from 0° to 20° C. for about from ½ hour to 5 hours and preferably about from 1 to 2 hours. Suitable inert organic media which can be used include, for example, dimethylformamide, benzene, monoglyme, chloroform and the like.

The R³-sulfamoyl or alkyl sulfamoyl compounds of formula B can then be prepared according to step (r), by treating the corresponding 4- or 5-chloro sulfonyl compounds with ammonia or an alkylamine or dialkylamine having the desired alkyl or dialkyl groups, in a suitable inert organic solvent in the presence of triethylamine. This treatment is typically conducted at temperatures in the range of about from —10° to 80° C. for about from ½ hour to 5 hours, and is conveniently conducted in the case of ammonia or gaseous amines by passing the gas through a solution of the R³-sulfonyl chloride compound of formula B. Where liquid amines are used, the reactants which can be used include, for example, methylene chloride, benzene, monoglyme, dimethylformamide, and the like. Suitable alkyl amines which can be used include, for example, methylamine, dimethylamine, ethylamine, diethylamine, propylamine, isopropylamine, butylamine, t-butylamine, and the like. Also in place of triethylamine, other tertiary amines such as pyridine or tributylamine can also be used.

The compounds of formula I wherein one of R¹ or R² is hydrogen and the other is hydrogen, lower alkyl, or arylalkyl can also be prepared via an alternate process via the intermediates of formula III. This process can be represented by the following schematic overall reaction equations:

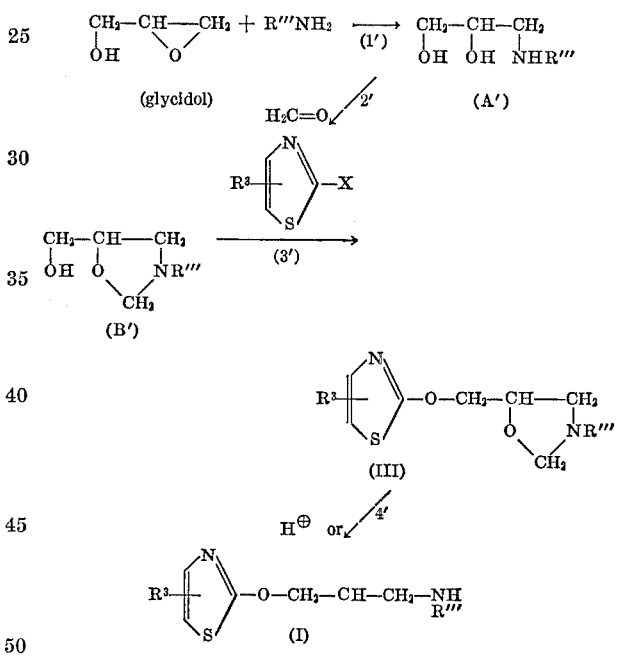

wherein R′″ is hydrogen, lower alkyl or arylalkyl and R³ and X are as defined herein above.

Step (1′) of the above process can be effected by treating glycidol with ammonia or the desired monosubstituted amine. Typically, this treatment is conducted at temperatures in the range of about from 20° C. to reflux and preferably at reflux, for about from 0.5 to 5 hours. Frequently, as the reaction is exothermic and typically will occur at ambient temperature, the reaction can be conducted at reflux without supplying external heat. Also wherein anhydrous ammonia or volatile amines are used, the reaction is typically conducted by passing the gaseous ammonia or substituted amine through a solution of glycidol. Alternatively, suitable inert organic solvents can be used but, typically are unnecessary as glycidol itself is a liquid at room temperature in which the respective substituted amines are usually soluble. Suitable substituted amines which can be used include, for example, methylamine, ethylamine, propylamine, isopropylamine, n-butylamine, t-butylamine, phenylethylamine, p-methylbenzyl, and the like.

Step (2′) can be effected by treating the product of step (1′), of formula A′, with formaldehyde in a suitable inert organic solvent such as, for example, ethanol. Typically, this treatment is conducted at temperatures in the range of about from 20° C. below reflux to reflux and preferably at reflux about from 8 to 18 hours. Typically, the formaldehyde is used in the form of an aqueous solution.

Step (3') is preferably conducted in two steps. In the initial phase the 5-hydroxymethyl-3-oxazolidine or 5-hydroxymethyl-substituted oxazolidine product of step (2') (i.e., formula B') is treated with an alkaline metal hydride, e.g., sodium hydride, in a suitable inert organic solvent. Typically, this treatment is conducted at temperatures in the range of about from 20 to 80° C. for about from 15 minutes to 5 hours. Preferably this treatment is conducted under anhydrous conditions and preferably conducted in the absence of air, e.g., under an inert gas, e.g., nitrogen. Inert organic solvents which can be used include, for example, dimethylformamide, monoglyme, diglyme, and the like. The second phase of step (3') is conducted by treating the initial product reaction mixture with either 2-chloro or 2-bromothiazole or the desired $R^3$-substituted-2-chloro or 2-bromothiazole. Typically, this treatment is conducted at temperatures in the range of about from 60 to 140° C. for about from 1 to 24 hours. Typically, the 2-halo thiazole reagent will be added to the reaction mixture in the form of a solution in a suitable inert organic solvent. Suitable inert organic solvents which can be used include, for example, dimethylformamide, monoglyme, diglyme, and the like. Again preferably the second phase will also be conducted under anhydrous conditions and preferably conducted in an inert gas such as, for example, nitrogen. Step (4') can be conveniently effected by simple acidic or basic hydrolysis of the intermediate of formula III. Thus, acid hydrolysis can be conveniently effected by treating the compound of formula III with a suitable inert organic acid such as, for example, acetic, formic, oxalic acid and the like or suitable acids such as, for example, hydrochloric, sulfuric, and the like. Preferably the hydrolysis is conducted under mildly acidic conditions. Similarly, basic hydrolysis can be conducted by treating the compound of formula III with a suitable base such as, for example, dilute sodium hydroxide, potassium hydroxide and the like. Preferably the hydrolysis can be conducted under mildly alkaline conditions. Alternatively, the hydrolysis can be conducted via exchange with a suitable ion exchange resin in either the H+ or OH− form.

The compounds of formula III can also be prepared directly from the corresponding compounds of formula I:

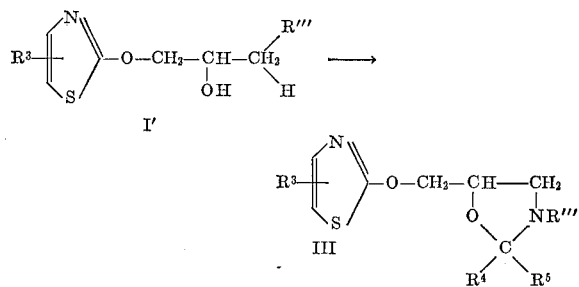

wherein $R'''$, $R^3$, $R^4$ and $R^5$ are as defined herein above.

This treatment can be conveniently effected by treating the corresponding compound of formula I' with a ketone, having the desired $R^4$ and $R^5$ substituents, and aluminum isopropoxide. Typically this treatment is conducted at temperatures in the range of about from 20 to 100° C. for about from 1 to 48 hours using mole ratios in the range of from about 1 to 150 moles of ketone and 1 to 10 moles of aluminum isopropoxide per mole of compound of formula I.

Typically a substantial excess of ketone is used as the excess ketone usually will function as an inert organic solvent. Suitable ketones which can be used include, for example, acetone, cyclohexanone, cyclopentanone, cycloheptanone, and the like. Also in place of aluminum isopropoxide, the following compounds can be used; aluminum t-butoxide.

Alternatively the above treatment can be effected in the case of the 2-spirocycloalkyloxazolidine compounds, of formula III (i)e), $R^4$ and $R^5$ together with the carbon atom to which they are joined form a cycloalkyl), by treating the corresponding compound of formula I' with a cycloalkyl-one having the desired cycloalkyl group, in an inert organic solvent in the presence of potassium carbonate. Typically this treatment is conducted at temperatures in the range of about from 20 to 100° C. for about from 48 to 72 hours, using mole ratios in the range of about from 1 to 150 moles of cycloalkyl-one per mole of compound of formula I'. Suitable cycloalkyl-ones which can be used include, for example, cyclohexanone, cyclopentanone, cycloheptanone, and the like. In place of potassium carbonate, the following compounds can also be used; sodium carbonate, lithium carbonate, and the like.

The $R^3$-alkoxy compounds of formulas I, II and III, of the invention, are most conveniently prepared from the corresponding $R^3$-bromo products of formulas I, II and III:

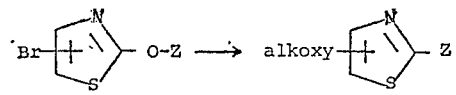

wherein Z is as defined herein above.

This step can be effected by treating the corresponding $R^3$-bromo compounds with an alkali metal alkoxide, having the desired alkoxide group, in the presence of the corresponding alkanol. Typically this treatment is conducted at temperatures in the range of about from 20° to 150° C. for about from 2 to 24 hours using about from 1 to 10 molar equivalents of alkoxide. Preferably the treatment is conducted at reflux and preferably is conducted under anhydrous conditions. Suitable alkanols which can be used include, for example, methanol, ethanol, n-propanol, isopropanol, t-butanol and the like.

Suitable alkali metal alkoxides which can be used include, for example, sodium methoxide, lithium, methoxide, potassium methoxide and the like. The alkali metal alkoxide is conveniently prepared in situ by adding elemental alkali metal to a substantial excess of the corresponding anhydrous alkanol (e.g., methanol, ethanol, propanol, etc.) having the desired alkyl substituent. The desired $R^3$-bromo compound of formula I, II or III, corresponding to the desired product, can then be added directly to this mixture with the excess alkanol serving as an inert organic solvent.

Alternatively the alkoxide displacement treatment can be conducted in benzene or toluene using a crown polyether to solubilize the alkali metal alkoxide. Preferably where the starting materials of formula I, II or III have free amino or free hydroxy groups, a mole ratio in the range of about from 0.1 to 0.5 moles of starting material of formula II, II or III is used per mole of alkali metal alkoxide and where the starting material does not have free amino or free hydroxy groups, a mole ratio in the range from 0.5 to 1.5 is preferred.

Again, as noted previously with respect to the first described process of the invention, it should be understood that in each of the aforedescribed preparation and process steps, that where starting materials having free amino or free hydroxy groups which could interfere with the desired treatment are used, such starting materials are first protected with conventional labile ester or ether groups. And again, unless noted to the contrary, it is preferred that the respective products of each process step or preparation step, described herein above, be separated and/or isolated prior to its use as starting material for subsequent steps. Separation and isolation can be effected by any suitable or purification procedure such as, for example, evaporation, crystallization, column chromatography, thin-layer chromatography, distillation, etc. Specific illustrations of typical separation and isolation procedures can be had by reference to the appropriate examples described herein below. However, other equivalent separation procedures could, also be used. Also where an isomer mixture of the product of formula I or III is obtained, for example, wherein an isomeric mixture of glycerol acetonide or glycerol has been used in steps (1) and (1'), respectively, the respective optically active (+) and (−) isomers can be resolved by known procedures. Optimum resolution procedures can be obtained by routine trial and error procedures well within the scope of those skilled in the art.

The pharmaceutically acceptable acid addition salts of the compounds of formulas I and III can be prepared via neutralization of the parent compound, typically via neutralization of an amino moiety, with the desired acid-anion. Other pharmaceutically acceptable addition salts can then be conveniently prepared from the neutralization addition salts via anion exchange with a suitable ion exchange resin in the desired anion form.

The compounds of formulas I and III, of the invention, are useful in the treatment and palliation of cardiovascular abnormalities in mammals. The compounds of the invention primarily achieve their therapeutic action by affecting the $\beta$-adrenergic receptor sites in mammals. The compounds which primarily function as strong $\beta$-adrenergic stimulating agents (such as, for example, 1-isopropylamino-3-(thiazol-2-oxy)-2-propanol;
1-amino-3-(thiazol-2-oxy)-2-propanol;
1-sec-butylamino-3-(thiazol-2-oxy)-2-propanol;
1-cyclopropylamino-3-(thiazol-2-oxy)-2-propanol;
1-cyclophenylamino-3-(thiazol-2-oxy)-2-propanol;
(+)-1-$\alpha$-phenylethylamino-3-(thiazol-2-oxy)-2-propanol;
1-$\gamma$-phenylpropylamino-3-(thiazol-2-oxy)-2-propanol;
1-[$\alpha$-methyl-$\beta$-phenyl]-ethylamino-3-(thiazol-2-oxy)-2-propanol;
1-[$\beta$-(3,4-dimethoxyphenyl)]-ethylamino-3-(thiazol-2-oxy)-2-propanol and the corresponding hydrolyzation precursors of formula III are especially useful in the treatment and palliation of acute heart failure (such as, for example, acute heart failure following myocardial infarction), myocardial depression following cardiac surgery, chronic heart failure of all etiologies, bradyarrhythmias, general cardiomyopathic conditions and instances of complete heart block, occurring in mammals. The $\beta$-adrenergic stimulating agents also, as would be expected, typically exhibit a degree of subsequent $\beta$-adrenergic blocking activity. Also generally the compounds of formulas I and III where $R^3$ is hydrogen primarily function as $\beta$-adrenergic stimulating agents and are typically enhanced, with respect to such activity, by the presence of a secondary amine side chain (i.e. one of $R^1$ or $R^2$ is hydrogen) and further enhanced by the presence of a methine hydrogen atom on the $R^1$ or $R^2$ carbon atom which is attached to the amine nitrogen (e.g.

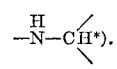

The compounds of formulas I and III which primarily function as $\beta$-adrenergic blockers (such as, for example, 1-isopropylamino-3-(5-aminocarbonyl-thiazol-2-oxy)-2-propanol;
1-isopropylamino-3-(5-methylaminocarbonyl-thiazol-2-oxy)-2-propanol;
1-isopropylamino-3-(5-dimethylaminocarbonyl-thiazol-2-oxy)-2-propanol;
1-isopropylamino-3-(5-acetamido-thiazol-2-oxy)-2-propanol and their hydrolyzation precursor of formula III, and generally the 5-acetamidothiazole compounds of formulas I and III) are especially useful in the treatment and palliation of cardiac arrhythmias, hypertrophic subaortic stenosis, hypertension, thyrotoxicosis, pheochromocytoma, hyperkinetic, syndromes, and general ischemic conditions (e.g. angina pectoris). Additional information concerning the use, action, and determination of $\beta$-blockers can be obtained by reference to the literature such as, for example, Dotlery et al., Clinical Pharmacology and Therapeutics, vol. 10, No. 6, 765–797 and the references cited therein.

The compounds of formulas I and III can be administered in a wide variety of dosage forms, either alone or in combination with other pharmaceutically compatible medicaments, in the form of pharmaceutical compositions suited for oral or parenteral administration. The compounds are typically administered as pharmaceutical compositions consisting essentially of the pharmaceutically acceptable salts of the compounds of formula I and/or III and a pharmaceutical carrier. The pharmaceutical carrier can be either a solid material or liquid, in which the compound is dissolved, dispersed or suspended, and can optionally contain small amounts of preservatives and/or pH-buffering agents. Suitable preservatives which can be used include, for example, benzyl alcohol and the like. Suitable buffering agents inculde, for example, sodium acetate and pharmaceutical phosphate salts and the like.

The liquid compositions can, for example, be in the form of solutions, emulsions, suspensions, syrups or elixirs. A preferred mode of administration and composition is intravenous administration of a simple solution of the pharmaceutically acceptable addition salts of the compounds of formula I and//or III in sterile water optionally containing small quantities of preservatives and/or buffering agents.

The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, sodium bisulfite and the like.

The compounds of this invention are typically administered in dosages of about from 0.01 to 5 mg. per kg. of body weight. The precise effective dosage will, of course, vary depending upon the mode of administration, the condition being treated and the host.

A further understanding of the invention can be had from the following non-limiting preparations and examples. Also as used herein above and below unless expressly stated to the contrary, all temperatures and temperature ranges refer to the centigrade system and the terms ambient or room temperature refer to about 20° C. The term percent or (%) refers to weight percent. The term molar equivalent (m. equiv.) refers to a quantity of reagent equal in moles to the moles of the immediately preceding reactant recited in the preparations and examples. Also unless expressly stated to the contrary, racemic mixtures are used as starting materials and correspondingly racemic mixtures are obtained as products and where necessary, preparations and examples are repeated to provide sufficient quantities of starting materials for subsequent preparations and examples.

PREPARATION 1

5-Alkyl-2-Aminothiazoles and 2-Amino-5-Cycloalkylthiazoles 76 grams of thiourea is suspended in 200 ml. of water, and the suspension is stirred while 80 ml. of chloroacetone is added over a period of 30 minutes. The reaction mixture is then refluxed for 2 hours, cooled and 200 g. of sodium hydroxide is added. The reaction mixture is then extracted with 3 portions of ether, and the ether layers are separated, combined, dried over solid sodium hydroxide and filtered. The ether is removed under vacuum and the remaining oil is distilled to yield 2-amino-5-methyl-thiazole.

Then repeating the above procedure but replacing chloroacetone with other alkyl chloromethyl ketones and chloromethyl cycloalkyl ketones yields the corresponding 5-alkyl-2-aminothiazoles and 2-amino-5-cycloalkylthiazoles, i.e., 2-amino-5-isopropylthiazole, 2-amino-5-t-butylthiazole, 2-amino-4-cyclopropylthiazole, and 2-amino-4-cyclopentylthiazole are prepared from the corresponding isopropyl chloromethyl ketone, t-butyl chloromethyl ketone, cyclopropyl chloromethyl ketone and cyclopentyl chloromethyl ketone respectively.

PREPARATION 2

5-Alkyl-2-Bromothiazoles and 2-Bromo-5-Cycloalkylthiazoles 29 grams of 2-amino-5-methylthiazole is dissolved in 120 ml. of 80% phosphoric acid and the mixture is cooled to 5° C. 60 ml. of concentrated nitric acid is then slowly added to the reaction mixture with stirring. When the reaction mixture temperature is within the range of 0 to —5° C., it is treated with a solution of 24 g. of sodium nitrite and 70 ml. of water. The reaction mixture is then stirred for 30 minutes and added to an aqueous solution prepared from 200 ml. of water, 50 g. of copper sulfate and 50 g. of sodium bromide and having a temperature of 0° C. The reaction mixture is then left standing at room temperature for 30 minutes, poured into water, extracted with benzene, and the benzene layers are collected, washed three times with water, dried over magnesium sulfate, and evaporated to dryness to yield 2-bromo-5-methylthiazole.

Repeating the above procedure with the other 5-alkyl-2-aminothiazoles and 2-amino-5-cycloalkylthiazoles produced in accordance with Preparation 1 yields the corresponding 5-alkyl-2-bromothiazoles and 2-bromo-5-cycloalkylthiazoles, e.g., 2-bromo - 5 - isopropylthiazole, 2-bromo-5-t-butylthiazole, 2-bromo - 5 - cyclopropylthiazole, 2-bromo-5-cyclopentylthiazole, respectively.

PREPARATION 3

4-Alkyl-2-Bromothiazole and 2-Bromo-4-Cycloalkylthiazoles

Equal molar amounts of α-bromopropanol and thiourea are refluxed in ethanol for several hours, cooled and admixed with excess sodium hydroxide. The reaction mixture is then extracted with ether, and the ether phase is dried over sodium hydroxide and filtered. The ether is then removed by evaporation, and the residue is distilled under vacuum to yield 2-amino-4-methylthiazole.

Repeating the procedure of Preparation 2 but replacing 2-amino-5-methylthiazole with 2-amino-4-methylthiazole yields 2-bromo-4-methylthiazole.

Repeating the above procedure but replacing α-bromopropanal with other 2-alkyl-2-bromoethanals and 2-cycloalkyl-2-bromoethanals yields the corresponding 4-alkyl-2-bromothiazoles and 2-bromo-4-cycloalkylthiazoles, e.g. 2-bromo-4-isopropylthiazole, 2 - bromo-4-t-butylthiazole, 2-bromo-4-cyclopropylthiazole, and 2-bromo-4-cyclopentylthiazole are prepared from 2-bromo-2-isopropylethanal, 2-bromo-2-t-butylethanal, 2-bromo-2-cyclopropylethanal and 2-bromo-2-cyclopentylethanal, respectively.

PREPARATION 4

2-Amino-5-Phenylthiazoles and 2-Amino-5-Substituted Phenylthiazoles

To a slurry of 24 g. of acetophenone and 30.4 g. of thiourea, 50.8 g. of iodine is added, and the mixture is then heated for 16 hours on a steam bath in an enclosed vessel. The reaction mixture is then diluted with water and heated until a solution is obtained. The reaction mixture is then filtered and the filtrate is cooled and made alkaline with excess aqueous ammonia. The precipitate is then separated from the reaction mixture by filtration and crystallized from ethanol to yield 2-amino-4-phenylthiazole.

Repeating the procedure of Preparation 2 but replacing 2-amino-5-methylthiazole with 2-amino-5-phenylthiazole yields 2-bromo-5-phenylthiazole.

Repeating the above procedure but replacing acetophenone with other alkylphenyl methyl ketones such as methyl p-tolyl ketone, halophenyl methyl ketones such as p-chlorophenyl methyl ketone, hydroxyphenyl methyl ketones such as p-hydroxyphenyl methyl ketone, alkoxyphenyl methyl ketones such as p-methoxyphenyl methyl ketone, and acyloxyphenyl methyl ketones such as p-acetoxyphenyl methyl ketones yields the corresponding 4-alkylphenyl-2-bromothiazoles such as 2-bromo-5-p-tolylthiazole, 2-bromo-4-halophenylthiazoles such as 2-bromo-5-p-chlorophenylthiazole, 2-bromo - 5 - hydroxyphenylthiazoles such as 2-bromo-5-p-hydroxyphenylthiazole, 5-alkoxyphenyl-2-bromothiazoles such as 2-bromo-5-p-methoxyphenylthiazole, and 5-acyloxyphenyl-2-bromothiazoles such as 5-p-acetoxyphenyl-2-bromothiazole.

PREPARATION 5

2-Bromo-4-Phenylthiazoles and 2-Bromo-4-Substituted Phenylthiazoles

Equal molar amounts of the diethylacetal of 2-phenyl-2-bromoethanal and thiourea are refluxed in ethanol for several hours, cooled and made alkaline with an excess of aqueous ammonia. Water is added to the reaction mixture, and the precipitate is removed by filtration and recrystallized with ethanol to yield 2-amino-4-phenylthiazole. Repeating the procedure of Preparation 2 but replacing 2-amino-5-methylthiazole with 2-amino-4-phenylthiazole yields 2-bromo-4-phenylthiazole.

Repeating the above procedure with diethyl acetals of 2-alkylphenyl-2-bromoethanals such as 2 - bromo-2-p-tolylethanal, 2 - halophenyl-2-bromoethanals such as 2-bromo-2-p-chlorophenylethanal, 2-bromo-2-hydroxyphenylethanals such as 2-bromo-2-p-hydroxyphenylethanal, 2-alkoxyphenyl-2-bromoethanals such as 2-acetoxyphenyl-2-bromoethanals yields the corresponding 4-alkylphenyl-2-bromothiazoles, such as 2-bromo-4-p-tolylthiazole, 2-bromo-4-halophenylthiazoles such as 2-bromo-5-p-chlorophenylthiazole, 2-bromo-4-hydroxyphenylthiazole such as 2 - bromo-4-p-hydroxyphenylthiazole, 4 - alkylphenyl-2-bromo-thiazoles such as 2-bromo-4-p-methoxyphenylthiazole, and 5-acyloxyphenyl-2-bromothiazoles such as 4-p-acetoxyphenyl-2-bromothiazole.

PREPARATION 6

2-Bromo-5-Chlorothiazole

A solution of 50 g. of 2-aminothiazole in 100 ml. of a 1:1 aqueous hydrochloric acid solution is treated with 42 g. of chlorine over a period of 20 minutes. The solution is evaporated until the volume is reduced by half, cooled and neutralized with an excess of aqueous ammonia. The precipitate is removed by filtration, dissolved in 400 ml. of benzene and dried over a magnesium sulfate. The solution is concentrated and cooled to yield 2-amino-5-chlorothiazole crystals which are separated by filtration. Repeating the procedure of Preparation 2 but replacing 2-amino-5-methylthiazole with 2 - amino-5-chlorothiazole yields 2-bromo-5-chlorothiazole.

PREPARATION 7

2,4-Dichlorothiazole and 2,4-Dibromothiazole

A solution of 5 g. of 2,4-dihydroxythiazole, 26.6 ml. of phosphorus oxychloride and 3.33 ml. of pyridine is refluxed in an oil bath for 3 hours, the excess reactants are removed, ice is added to the reaction mixture and the reaction mixture is extracted with ether. The ether phase is washed with 5% sodium chloride solution, dried over solid sodium sulfate and evaporated to yield 2,4-dichlorothiazole. Repeating the above procedure but replacing phosphorous oxychloride with phosphorous oxybromide yields 2,4-dibromothiazole.

PREPARATION 8

2,5-Dibromothiazole

A solution of 50 g. of 2-aminothiazole in 250 ml. of water and 62 ml. of a 40% aqueous hydrogen bromide solution was prepared. 80 g. of bromine is aspirated into the solution at 15° C., and the reaction is permitted to continue until a yellow color appears. The reaction mixture is boiled for 5 minutes, cooled, and the precipitate is removed by filtration. The precipitate is suspended in 500 ml. of water and 300 ml. of chloroform, and the mixture is made alkaline by adding an excess of aqueous ammonia. The chloroform layer is separated, dried over magnesium sulfate, concentrated, and the precipitate is filtered off to yield 2-amino-5-bromothiazole. Repeating the procedure of Preparation 2 but replacing 2-amino-5-methylthiazole with 2-amino-5-bromothiazole yields 2,5-bromothiazole.

PREPARATION 9

2-Bromo-5-Iodothiazole

To a hot solution of 5 g. of 2-aminothiazole and 200 ml. of water is added 250 ml. of an aqueous solution of 16 g. of mercuric chloride and 32 g. of sodium acetate trihydrate. This mixture is boiled for 15 minutes, cooled and filtered, and the filtrate is washed with water, methanol and ether to yield 2-amino-5-thiazole mercuric chloride.

A mixture of 1 g. of the latter compound, 1.5 g. of potassium iodide, 10 ml. of water and 0.5 g. of iodine is maintained at room temperature for 3 hours, with stirring, and then filtered. The resulting solid is rinsed with water, mixed with 30 ml. of ethanol and filtered. The filtrate is concentrated by evaporation and cooled to yield crystals of 2-amino-5-iodothiazole which are separated by filtration.

Repeating the procedure of Preparation 2 but replacing 2-amino-4-methylthiazole with 2-amino - 5 - iodothiazole yields 2-bromo-5-iodothiazole.

PREPARATION 10

2-Bromo-4-Iodothiazole 18 g. of 4-amino-2-bromothiazole in 50 ml. of concentrated hydrochloric acid solution is mixed with 30 g. of ice, and the mixture is cooled to 0° C. The solution is then treated by dropwise addition of 8 g. of sodium nitrite and 30 ml. of water, maintaining the reaction temperature at 0–5° C. After stirring the reaction mixture for an additional 15 minutes, the solution is poured into a solution of 60 g. of potassium iodide in 200 ml. of water. The mixture after standing for 30 minutes, it is extracted with ethyl acetate, and the ethyl acetate layer is separated, washed three times with water, dried over magnesium sulfate and evaporated under vacuum to yield 2-bromo-4-iodothiazole.

PREPARATION 11

2-Bromo-4-Fluorothiazolo and 2-Bromo-5-Fluorothiazole

To a mixture of 30 ml. of concentrated hydrochloric acid and 30 ml. of water is added 22.5 g. of 2-bromo-4-aminothiazole hydrobromide and the reaction mixture is cooled to 0° C. A cold solution of 9 g. of sodium nitrite in a minimum amount of water is added slowly, while maintaining the reaction mixture at a temperature below 0° C. A cold solution of 18 g. of ammonium fluoroborate in 60 ml. of water is then added with vigorous stirring, and the reaction mixture is stirred for an addition 30 minutes while maintaining it at 0° C. The reaction mixture is then filtered, and the solids obtained are washed with 20 ml. of cold aqueous 5% ammonium fluoroborate solution, 30 ml. of cold methanol and several portions of ether. The solids are covered with 100 ml. of high boiling petroleum ether at 10° C. The resulting mixture is allowed to warm slowly until decomposition starts, at which time the 2-bromo-4-fluorothiazole precipitate is removed from the mixture by filtration.

Repeating the above procedure but replacing 2-bromo-4-aminothiazole with 2-bromo-5-aminothiazole yields 2-bromo-5-fluorothiazole.

PREPARATION 12

4-Carbonylamino-2-Bromothiazole 37.5 g. of chloroacetonitrile and 37.5 g. of ammonium thiocyanate are combined with 700 ml. of ethanol and the mixture refluxed for 2 hours. The reaction mixture is then filtered and the filtrate is evaporated under vacuum. The residue is dissolved in 1 liter of dry ether, cooled to 0° C., and anhydrous hydrogen bromide is passed through the reaction mixture for 1.5 hours. The solids are removed by filtration in a dry atmosphere, washed with ether and added to 300 ml. of a 2:1 mixture of acetic anhydride:pyridine. After 2 hours at room temperature, the solution is poured into 1 liter of an aqueous 20% sodium acetate solution, stirred, and the solid is separated by filtration and recrystallized from acetone-petroleum ether to yield 2-bromo-4-acetamidothiazole.

Repeating the above procedure but respectively replacing acetic anhydride with propionic anhydride and benzoic anhydride respectively yields 2-bromo-ethylcarbonylaminothiazole and 2-bromophenylcarbonylaminothiazole.

PREPARATION 13

2-Bromo-4-Trifluoromethylthiazole

Thirty ml. of 65% (wt.) aqueous nitric acid is added to a solution containing 0.106 moles of 2-amino-4-trifluoromethylthiazole (see *Journal of Organic Chemistry*, p. 499 (1955)) in 150 ml. of aqueous 80% (wt.) phosphoric acid at 30° C. The resulting mixture is diazotized by the slow addition of 30 ml. of an aqueous solution containing 0.106 moles of sodium nitrite, at 0° C. The resulting mixture is then cooled to —5° C., and maintained at this temperature for 30 minutes with constant stirring. This mixture is then in turn slowly admixed over a period of 20 minutes to a solution containing 20 g. of copper sulfate and 55 g. of sodium bromide in 100 ml. of water, at 0° C. The temperature of the resulting mixture is then allowed to rise to ambient temperature (i.e., about 20° C.) and the mixture then neutralized with dilute aqueous sodium hydroxide. The mixture is then distilled with steam and the resulting distillate extracted with ether. The ether extract is evaporated yielding a residue of 2-bromo-4-trifluoromethylthiazole.

PREPARATION 14

3-(5-Trifluoromethylthiazol-2-Oxy)-Propanediol 1,2-Acetonide 500 mg. of 3-(5-bromothiazol-2-oxy)-propanediol 1,2-acetonide is added to a mixture containing 1 g. of powdered copper and 2.5 ml. of trifluoromethyl iodide in 5 ml. of dimethylformamide. The resulting mixture is heated in a sealed tube at 135° C. until conversion of the acetonide starting material is determined to be complete by thin-layer chromatography and gas chromatography analysis of the reaction mixture. The reaction mixture is cooled and the solvents evaporated by unsealing the tube at room temperature. The resulting residue is then further purified by thin-layer chromatography on silica gel plates affording 3 - (5 - trifluoromethylthiazol - 2-oxy)-propanediol 1,2-acetonide.

PREPARATION 15

3-(4- and 5-Carboxy-Thiazol-2-Oxy)-Propanediol 1,2-Acetonide

A solution containing 1 g. of 3-(5-bromothiazol-2-oxy)-propanediol 1,2-acetonide in 75 ml. of tetrahydrofuran is cooled to —75° C. and 2 molar equivalents of butyl lithium in hexane is added with constant stirring under a nitrogen atmosphere. The resulting reaction mixture is allowed to stand for 7 minutes and then a slow stream of anhydrous carbon dioxide is passed through the solution for 30 minutes, at —75° C. The reaction mixture is then sealed and permitted to warm to room temperature and then diluted with water and extracted with ether. The aqueous phase is neutralized with an ion exchange resin (in the acid form) and then evaporated, under high vacuum at 20° C., to dryness affording 3-(5-carboxythiazol-2-oxy)-propanediol 1,2-acetonide.

Similarly, by following the same procedure but using the corresponding 3-(4-bromothiazol-2-oxy)-propanediol 1,2-acetonide starting material, the corresponding 3-(4-carboxythiazol-2-oxy acid)-propanediol 1,2-acetonide is prepared.

3-(4- and 5-Methoxycarbonylthiazol-2-oxy)-Propanediol 1,2-Acetonide

One gram of 3-(5-carboxythiazol-2-oxy)-propanediol 1,2-acetonide is dissolved in 50 ml. of methanol and treated with an excess of diazomethane in ethyl ether. The mixture is allowed to stand for ½ hour at ambient temperature and then evaporated to dryness yielding a residue of 3-(5 - methoxycarbonylthiazol-2-oxy)-propanediol 1,2-acetonide which is further purified by chromatography over alumina. Repeating the same procedure but using 3-(4-carboxythiazol-2-oxy)-propanediol 1,2-acetonide affords 3-(4-carboxythiazol-2-oxy)-propanediol 1,2-acetonide.

3-(4- and 5-Ethercarbonylthiazol-2-Oxy)-Propanediol 1,2-Acetonides

Two grams of anhydrous potassium carbonate is added to 1 gram of 3-(5-carboxythiazol-2-oxy)-propanediol 1,2-acetonide in 25 ml. of dimethylacetamide followed by the addition of 1 ml. of ethyl iodide. The mixture is stirred for 24 hours at room temperature and then diluted with water and extracted with ethyl acetate. The ethyl acetate extract is evaporated to dryness affording a residue of 3-(5-ethoxycarbonylthiazol-2-oxy)-propanediol 1,2-acetonide which is further purified by chromatography over alumina eluting sequentially with hexane, benzene, acetone and mixtures of these solvents.

Similarly, by following the same procedure but respectively using propyl bromide, cyclopentyl bromide, phenyl bromide, and benzyl bromide in place of ethyl iodide, the following compounds are respectively prepared:

3-(5-propoxycarbonylthiazol-2-oxy)-propanediol 1,2-acetonide;
3-(5-cyclopentoxycarbonylthiazol-2-oxy)-propanediol 1,2-acetonide;
3-(5-phenoxycarbonylthiazol-2-oxy)-propanediol 1,2-acetonide; and
3-(5-benzyloxycarbonylthiazol-2-oxy)-propanediol 1,2-acetonide.

Similarly the corresponding 4-positioned counterparts of each of the above compounds are respectively prepared by using 3-(4-carboxythiazol-2-oxy)-propanediol 1,2-acetonide as the starting material.

PREPARATION 16

3-(4-and 5-Hydroxyalkyl, Formyl and Acyl-Thiazol-2-Oxy)-Propanediol 1,2-Acetonide A solution containing 1 g. of 3-(5-bromothiazol-2-oxy)-propanediol 1,2-acetonide in 75 ml. of tetrahydrofuran is cooled to —75° C. and 2 molar equivalents of butyl lithium in hexane is added with constant stirring under a nitrogen atmosphere. The resulting reaction mixture is allowed to stand for 7 minutes and then a slow stream of anhydrous gaseous formaldehyde is passed through the solution for 30 minutes at —75° C. The reaction mixture is then sealed and permitted to warm to room temperature and then diluted with water and extracted with ether. The aqueous phase is neutralized with an ion exchange resin (in the acid form) and then evaporated, under high vacuum at 20° C., to dryness affording 3-(5-hydroxymethylthiazol - 2 - oxy)-propanediol 1,2-acetonide. One gram of this residue is dissolved in 25 ml. of dichloromethane. Five molar equivalents of chromium trioxide in the form of a chromium trioxide-dipyridine complex is added to the solution at room temperature. The mixture is allowed to stand at room temperature until thin-layer chromatography reveals formation of 5-aldehyde thiazole to be complete. The mixture is then washed with water, dried over sodium sulfate and the solvents distilled off. The product-rich concentrate is then purified by high vacuum distillation affording 3-(5-formylthiazol-2-oxy)-propanediol 1,2-acetonide. The corresponding 4-formylthiazole derivative is prepared according to the same procedure by using 3-(4-bromothiazol-2-oxy)-propanediol 1,2-acetonide as the starting material.

Similarly by following the same procedure but using acetylaldehyde, propionaldehyde and t-butylaldehyde, respectively, in place of formaldehyde, the following compounds and their corresponding 4-positioned counterparts are respectively prepared:

3-(5-acetylthiazol-2-oxy)-propanediol 1,2-acetonide;
3-(5-propionyl-2-oxy)-propanediol 1,2-acetonide; and
3-(5-t-butyryl-2-oxy)-propanediol 1,2-acetonide.

PREPARATION 17

3-(4- and 5-Cyanothiazol-2-Oxy)-Propanediol 1,2-Acetonide

A mixture containing 50 mg .of cuprous cyanide in 14.7 ml. of 3-(5-bromothiazol-2-oxy)-1,2-propanediol 1,2-acetonide and 3 ml. of dimethylformamide is heated in a sealed vessel at 120° C. for 4 hours. The mixture is then cooled to room temperature and then partitioned between ethyl ether and water. The ethyl ether phase is separated, dried over sodium sulfate and evaporated to dryness yielding a residue of 3-(5-cyanothiazol-2-oxy)-1,2-propanediol 1,2-acetonide. By repeating this procedure but using 3-(4-bromothiazol-2-oxy)-propanediol 1,2 - acetonide as the starting material, 3-(4-cyanothiazol-2-oxy)-2-propanediol 1,2-acetonide is also prepared.

To illustrate the use of other solvents, the above procedure is repeated for both the 4- and 5-cyano products respectively using each of the following solvents; pyridine, dimethyl sulfoxide, dimethylacetamide, diglyme, and hexamethylphosphoric triamide, in place of dimethylformaide.

PREPARATION 18

3-(4- and 5-Ureidothiazol-2-Oxy)-Propanediol 1,2-Acetonide

A solution of silicon tetraisocyanate in benzene is slowly added to a solution containing 1 g. of 3 - (5 - aminothiazol - 2 - oxy)-propanediol 1,2-acetonide in 50 ml. of benzene under reflux. The treatment is monitored by thin-layer chromatography and allowed to continue until the 3-(5-aminothiazol - 2 - oxy)-propanediol 1,2-acetonide reactant is consumed. The reaction mixture is then diluted with water and extracted with chloroform. The chloroform extract is evaporated to dryness yielding a residue of 3-(5-ureidothiazol - 2 - oxy)-propanediol 1,2-acetonide. Similarly, 3-(4-ureidothiazol - 2 - oxy)-propanediol 1,2-acetonide is prepared by following the same procedure but using the corresponding 4-aminothiazole acetonide derivative as starting material.

PREPARATION 19

3-(4- and 5-Alkoxycarbonylaminothiazol-2-Oxy)-Propanediol 1,2-Acetonide

One gram of 3-(5-aminothiazol - 2 - oxy)-propanediol 1,2-acetonide is dissolved in 50 ml. of benzene containing 0.1 ml. of t-butanol, at 20° C., under a nitrogen atmosphere. 1.1 equivalents of dry sodium hydride is then admixed to this solution and the solution stirred until no further evolution of hydrogen is observed. 1.3 equivalents of methyl chloroformate is added and the resulting mixture heated at reflux for 3 hours. The mixture is then cooled to room temperature, washed with water and evaporated to dryness yielding a residue of 3-(5-methoxycarbonylaminothiazol - 2 - oxy)-propanediol 1,2-acetonide. Repeating the same procedure but using 3 - (4 - aminothiazol - 2 - oxy)-propanediol 1,2-acetonide as the starting material yields 3-(4-methoxycarbonylaminothiazol-2-oxy)-propanediol 1,2-acetonide.

Similarly, by following the same procedure but respectively using propionyl chloride, butyryl chloride and valeric anhydride, the following compounds are respectively prepared:

3-(5-ethoxycarbonylaminothiazol-2-oxy)-propanediol 1,2-acetonide;
3-(4-ethoxycarbonylaminothiazol-2-oxy)-propanediol 1,2-acetonide;
3-(5-propoxycarbonylaminothiazol-2-oxy)-propanediol 1,2-acetonide;
3-(4-propoxycarbonylaminothiazol-2-oxy)-propanediol 1,2-acetonide;
3-(5-butoxycarbonylaminothiazol-2-oxy)-propanediol 1,2-acetonide; and
3-(4-butoxycarbonylaminothiazol-2-oxy)-propanediol 1,2-acetonide.

PREPARATION 20

3-(4- and 5-Ureidothiazol-2-Oxy)-Propanediol 1,2-Acetonide

A solution containing 0.2 g. of 3-(5-methoxycarbonylaminothiazol - 2 - oxy)-propanediol 1,2-acetonide in 25 ml. of anhydrous ethanol is saturated with anhydrous gaseous ammonia and then sealed and heated for one hour at 70° C. The solution is then allowed to stand for 3 days at ambient temperature (i.e., about 20° C.) after which time the solution is unsealed and the ethanol solvent is evaporated affording a residue of 3-(5-ureidothiazol-2-oxy)-propanediol 1,2 - acetonide. Similarly, 3-(4-ureidothiazol - 2 - oxy)-propanediol 1,2-acetonide is prepared by following the same procedure but using the corresponding 4-thiazole acetonide starting material.

Similarly, by following the same procedure as above but respectively using methylamine and ethylamine in place of ammonia, the following compounds are prepared:

3-(5-[N'-methylureido]-thiazol-2-oxy)-propanediol 1,2-acetonide;
3-(4-[N'-methylureido]-thiazol-2-oxy)-propanediol 1,2-acetonide;
3-(5-[N'-ethylureido]-thiazol-2-oxy)-propanediol 1,2-acetonide; and
3-(4-[N'-ethylureido]-thiazol-2-oxy)-propanediol 1,2-acetonide.

3-(4- and 5-[N'-C$_3$-C$_7$-Alkylureido]-Thiazol-2-Oxy)-Propanediol 1,2-Acetonide 0.3 grams of isopropylamine is added to a solution containing 0.2 g. of 3-(5-methoxycarbonylaminothiazol-2-oxy)-propanediol 1,2-acetonide in 10 ml. of anhydrous ethanol. The mixture is then heated at reflux and monitored by thin-layer chromatography until formation of the isopropylureidothiazole derivative is complete. The mixture is then cooled and evaporated affording a residue of 3 - (5 - [N' - isopropylureido] - thiazol - 2 - oxy)-propanediol 1,2-acetonide, which is then further purified by dissolution in an ethyl acetate solvent followed by filtration and adsorption through silica gel followed by evaporation of the ethyl acetate solvent. Similarly, 3-(4-[N'-isopropylureido]-thiazol - 2 - oxy)-propanediol 1,2-acetonide is prepared by using the corresponding 4-thiazole acetonide derivative as starting material.

Similarly, by following the same procedure but using t-butylamine in place of isopropylamine, the following compounds are respectively prepared:

3-(5-[N'-t-butylureido]-thiazol-2-oxy)-propanediol 1,2-acetonide; and
3-(4-[N'-t-butylureido]-thiazol-2-oxy)-propanediol 1,2-acetonide.

PREPARATION 21

2-Chloro-4- and 5-Isocyanato-Thiazole 9.6 grams of 2-chlorothiazole-4-carboxylic acid ethyl ester (Helv. Chim. Acta., 29, 1230 (1946)) and 2.5 g. of hydrazine hydrate are admixed together and warmed in a water bath.

The mixture is then extracted with methylene chloride and the extracts then evaporated. A 3 gram portion of the resulting residue is suspended in a solution of 6 ml. of concentrated hydrochloric acid and 25 ml. of water at 20° C. The suspension is then cooled at about 0° C. and a solution containing 1.5 g. of sodium nitrite is added with rapid stirring. The mixture is then filtered and the filtered cake dissolved in benzene and the resulting solution dried over sodium sulfate and then evaporated to dryness. A 1 gram portion of the resulting residue is dissolved in 50 ml. of anhydrous toluene. The resulting solution is heated at reflux until no further evolution of nitrogen is observed, and then evaporated affording 2-chloro-4-isocyanatothiazole. Similarly, 2-chloro-4-isocyanato-thiazole is also prepared according to the same procedure but using 5-carboxylic acid ethyl acid 2-chlorothiazole as the starting material.

PREPARATION 22

2-Chloro-4- and 5-Formylamino-Thiazole

A solution containing 0.5 g. of 2-chloro-5-isocyanatothiazole in 20 ml. of 99.1% aqueous formic acid is heated at 80° C. and monitored until thin-layer chromatographic analysis shows formation of the formyl derivative to be complete. The solvents are then removed by lyophilization and the residue dissolved in methylene dichloride. The methylene dichloride solution is washed with aqueous 1% sodium hydroxide solution and water, dried over sodium sulfate and evaporated to dryness yielding 2-chloro-5-formylaminothiazole. Similarly, 2-chloro-4-formylaminothiazole is prepared by the same procedure but using 2-chloro-4-isocyanato-thiazole as starting material.

2-Chloro-4- and 5-Ethercarbonylamino-Thiazole

A solution containing 0.5 g. of 2-chloro-5-isocyanatothiazole in 25 ml. of methanol is refluxed for 2 hours. The excess methanol is then evaporated affording a residue of 2 - chloro-5-methoxycarbonylaminothiazole. Similarly, 2-chloro-4-methoxycarbonylaminothiazole is prepared by using 2 - chloro-4-isocyanatothiazole as starting material.

Similarly, by respectively using ethanol, isopropanol, phenol and benzyl alcohol in place of methanol, the following compounds are respectively obtained:

2-chloro-5-ethoxycarbonylaminothiazole;
2-chloro-4-ethoxycarbonylaminothiazole;
2-chloro-5-isopropoxycarbonylaminothiazole;
2-chloro-4-isopropoxycarbonylaminothiazole;
2-chloro-5-phenoxycarbonylaminothiazole;
2-chloro-4-phenoxycarbonylaminothiazole;
5-benzyloxycarbonylamino-2-chlorothiazole; and
4-benzyloxycarbonylamino-2-chlorothiazole.

2-Chloro-4- and 5-Ureidothiazole

A solution containing 0.5 g. of 2-chloro-5-isocyanatothiazole in 10 ml. of anhydrous liquid ammonia in a sealed pressure flask at 20° C. and monitored and maintained at this temperature until formation of the ureido compound is shown to be complete. Evaporation of the excess ammonia affords 2 - chloro-5-ureidothiazole. Similarly, 2-chloro-4-ureidothiazole is prepared by using 2-chloro-4-isocyanatothiazole as starting material.

Similarly by following the same procedure as above but respectively using methylamine and dimethylamine as starting materials, the following compounds are respectively obtained:

2-chloro-5-(N'-methylureido)-thiazole;
2-chloro-4-(N'-methylureido)-thiazole;
2-chloro-5-(N',N'-dimethylureido)-thiazole; and
2-chloro-4-(N',N'-dimethylureido)-thiazole.

PREPARATION 23

3-(4- and 5-Alkylaminothiazol-2-Oxy)-Propanediol 1,2-Acetonide

A solution containing 1 g. of 3-(5-acetamidothiazol-2-oxy)-propanediol 1,2-acetonide in 50 ml. of tetrahydrofuran is admixed to a boiling suspension containing 0.5 g. of lithium aluminum hydride (LiAlH$_4$) in 20 ml. of tetrahydrofuran. The mixture is boiled with constant stirring for an additional 4 hours and then cooled and a mixture of ethyl acetate and water is added cautiously to decompose excess hydride. The mixture is then extracted with ethyl acetate and the resulting extract is then evaporated to dryness affording 3-(5-ethylamino-thiazol-2-oxy)-propanediol 1,2 - acetonide. Similarly, 3-(4-ethylamino-thiazol-2-oxy)-propanediol 1,2-acetonide is prepared by using the corresponding 4-acetamidothiazole acetonide starting material.

Similarly by following the same procedure but using the corresponding 4- and 5-formamido; acetylamido and butyramido thiazole derivatives as starting materials, the following compounds are respectively obtained:

3-(5-methylaminothiazol-2-oxy)-propanediol 1,2-acetonide;
3-(4-methylaminothiazol-2-oxy)-propanediol 1,2-acetonide;
3-(5-propylaminothiazol-2-oxy)-propanediol 1,2-acetonide;
3-(4-propylaminothiazol-2-oxy)-propanediol 1,2-acetonide;
3-(5-butylaminothiazol-2-oxy)-propanediol 1,2-acetonide;
3-(4-butylaminothiazol-2-oxy)-propanediol 1,2-acetonide.

3-(4- and 5-[N-Alkylformamido]-Thiazol-2-Oxy)-Propanediol 1,2-Acetonide

A solution containing 1 g. of 3-(5-methylaminothiazol-2-oxy)-propanediol 1,2-acetonide and 2 ml. of methyl formate in 25 ml. of ethanol is heated at reflux and monitored by thin-layer chromatography until analysis reveals formation of the 5-formyl derivative to be complete. The mixture is then evaporated to dryness affording a residue of 3-(5-[N-methylformamido]-thiazol-2-oxy)-propanediol 1,2-acetonide which is further purified by chromatography over silica gel. Similarly, 3-(4-[N-methylformamido]-thiazol-2-)-propanediol 1,2-acetonide is prepared by using the corresponding 4-methylamine starting material.

Similarly by following the same procedure as above but using the corresponding 4- and 5-ethylamino, isopropylamino, and t-butylamino thiazole acetonide derivatives, the following compounds are respectively prepared:

3-(5-[γ-ethylformamido]-thiazol-2-oxy)-propanediol 1,2-acetonide;
3-(4-[N-ethylformamido]-thiazol-2-oxy)-propanediol 1,2-acetonide;
3-(5-[N-isopropylformamido]-thiazol-2-oxy)-propanediol 1,2-acetonide;
3-(4-[N-isopropylformamido]-thiazol-2-oxy)-propanediol 1,2-acetonide;
3-(5-[N-t-butylformamido]-thiazol-2-oxy)-propanediol 1,2-acetonide; and
3-(4-[N-t-butylformamido]-thiazol-2-oxy)-propanediol 1,2-acetonide.

3-(4- and 5-[N-Alkylformamido]-Thiazol-2-Oxy)-Propane-1,2-Diol

Eight ml. of acetic anhydride is added to a suspension containing 1.38 g. of anhydrous sodium formate and 3.7 g. of 3-(5-methylaminothiazol-2-oxy)-propanediol 1,2-acetonide in 20 ml of 90% (wt.) aqueous formic acid at 15° C. The mixture is maintained at 15° C. for 24 hours and poured into water and the pH adjusted to ten by the addition of dilute sodium carbonate. The mixture is then extracted with ethyl acetate and the extract is evaporated to dryness. The resulting residue is added to 2 ml. of 88% aqueous formic acid and stirred for 5 minutes at room temperature and then evaporated to dryness. The rseidue is added to a solution containing 0.25 g. of sodium methoxide in 25 ml. of methanol at 20° C. The mixture is allowed to stand for one hour at room temperature and then neutralized by the slow addition of hydrochloric acid and evaporated to dryness to yield 3-(5-[N-methylformamido]-thiazol-2-oxy)-propane-1,2-diol. Similarly, by using the corresponding starting materials, the N-alkylformamidothiazole 1,2-propanediols corresponding to the N-alkylformamido thiazole propanediol 1,2-acetonides enumerated above with respect to the preceding procedure are prepared by the same procedure.

PREPARATION 24

3-(4- and 5-Thio-Thiazol-2-oxy)-Propanediol 1,2-Acetonides

A solution containing 1.2 g. of sodium and 45 ml. of methanol is added to a solution containing 3.1 g. of ethyl mercaptan in 10 ml. of methanol. To the resulting solution is added a solution containing 15 g. of 3-(5-bromothiazol-2-oxy)-propanediol 1,2-acetonide in 100 ml. of methanol. The resulting mixture is then refluxed and monitored and refluxing continued until thin-layer chromatographic analysis shows the reaction to be complete. The mixture is then evaporated and the residue mixed with 200 ml. of water and the resulting mixture extracted with ethyl acetate. The ethyl acetate is evaporated affording a crude residue of 3-(5-thioethylthiazol-2-oxy)-propanediol 1,2-acetonide which is further purified by chromatography over alumina eluting with benzene, ether and ethyl acetate. Similarly, 3-(4-thioethylthiazol - 2-oxy)-propanediol 1,2-acetonide is also prepared by using the corresponding 4-bromothiazole acetonide starting materials.

Similarly, by following the same procedure as above but respectively using methyl mercaptan, isopropyl mercaptan, t-butyl mercaptan, benzyl mercaptan and thiophenol, the following compounds are respectively prepared:

3-(5-thiomethylthiazol-2-oxy)-propanediol 1,2-acetonide;
3-(4-thiomethylthiazol-2-oxy)-propanediol 1,2-acetonide;
3-(5-thioisopropylthiazol-2-oxy)-propanediol 1,2-acetonide;
3-(4-thioisopropylthiazol-2-oxy)-propanediol 1,2-acetonide;
3-(5-t-thiobutylthiazol-2-oxy)-propanediol 1,2-acetonide;
3-(4-t-thiobutylthiazol-2-oxy)-propanediol 1,2-acetonide;
3-(5-thiophenylthiazol-2-oxy)-propanediol 1,2-acetonide;
3-(4-thiophenylthiazol-2-oxy)-propanediol 1,2-acetonide;
3-(5-thiobenzylthiazol-2-oxy)-propanediol 1,2-acetonide; and
3-(4-thiobenzylthiazol-2-oxy)-propanediol 1,2-acetonide.

PREPARATION 25

3-(4- and 5-Sulfonylthiazol-2-oxy)-1,2-Propanediols 2.5 equivalents of 30% aqueous hydrogen peroxide solution is added to a solution containing 7.5 g. of 3-(5-thioethylthiazol-2-oxy)-propanediol 1,2-acetonide in 75 ml. of acetic acid at room temperature (i.e., about 20° C.). The mixture is allowed to stand overnight at 20° C. and then heated to 80° C. and maintained at this temperature for ½ hour and then cooled to 20° C., diluted with water and neutralized by the addition of sodium carbonate. The mixture is then continuously extracted with ethyl acetate, in a continuous extraction apparatus, for 48 hours. The extract is evaporated to dryness, and the resulting residue dissolved in 250 ml. of methanol. A solution containing 2.5 g. of sodium hydroxide in 25 ml. of water is then added to the methanol solution at 20° C. The resulting solution is allowed to stand for 2 hours at 20° C. and then neutralized by the slow addition of acetic acid. The neutralized mixture is concentrated to a volume of about 100 ml. by evaporation, then diluted with water and extracted with methylene chloride. The methylene chloride extract is evaporated to dryness affording crude 3-[5-ethylsulfonylthiazol-2-oxy]-propane 1,2-diol which is further purified by chromatography over synthetic magnesium silicate eluting with benzene, ethyl acetate and methanol and sequentially proportioned mixtures of these solvents. Similarly, 3-[4-ethylsulfonylthiazol-2-oxy]-propane 1,2-diol is prepared by using 3-[4-thioethylthiazol-2-oxy]-propanediol 1,2-acetonide as the starting material.

Similarly, by following the same procedure but respectively using the corresponding 3-(4- and 5-thiomethyl, thioisopropyl, thio-t-butyl, thiophenyl and thiobenzyl-thiazol-2-oxy)-propanediol 1,2-acetonide as starting materials, the following compounds are prepared:

3-[5-methylsulfonylthiazol-2-oxy]-propane 1,2-diol;
3-[4-methylsulfonylthiazol-2-oxy]-propane 1,2-diol;
3-[5-isopropylsulfonylthiazol-2-oxy]-propane 1,2-diol;
3-[4-isopropylsulfonylthiazol-2-oxy]-propane 1,2-diol;
3-[5-t-butylsulfonylthiazol-2-oxy]-propane 1,2-diol;
3-[4-t-butylsulfonylthiazol-2-oxy]-propane 1,2-diol;
3-[5-phenylsulfonylthiazol-2-oxy]-propane 1,2-diol;
3-[4-phenylsulfonylthiazol-2-oxy]-propane 1,2-diol;
3-[5-benzylsulfonylthiazol-2-oxy]-propane 1,2-diol; and
3-[4-benzylsulfonylthiazol-2-oxy]-propane 1,2-diol.

PREPARATION 26

3-(4- and 5-Alkylsulfinylthiazol-2-Oxy)-Propanediol 1,2-Acetonide

One gram of m-chloroperbenzoic acid is added to a solution containing 1 g. of 3-(5-thioethylthiazol-2-oxy)-propanediol 1,2-acetonide in 100 ml. of methylene chloride at 0° C. The resulting mixture is monitored and maintained at this temperature until the analysis reveals that the m-chloroperbenzoic acid has been consumed. The reaction mixture is then washed with dilute aqueous sodium carbonate solution, then water and then dried over sodium sulfate and evaporated to dryness affording 3-(5-ethylsulfinylthiazol-2-oxy)-propanediol 1,2-acetonide which is further purified by chromatography over alumina. Similarly, 3-(4-ethylsulfinylthiazol-2-oxy)-propanediol 1,2-acetonide is also prepared by using the corresponding 4-thioethylthiazole acetonide derivative as starting materials.

Similarly, by following the same procedure as above but using the corresponding 3-(4- and 5-thiomethyl-, thioisopropyl-, thio-t-butyl-, thiophenyl-, thiobenzyl-thiazol-2-oxy)-propanediol 1,2-acetonide, derivatives as starting materials, the following compounds are respectively prepared:

3-(4-methylsulfinylthiazol-2-oxy)-propanediol 1,2-acetonide;
3-(5-methylsulfinylthiazol-2-oxy)-propanediol 1,2-acetonide;
3-(4-isopropylsulfinylthiazol-2-oxy)-propanediol 1,2-acetonide;
3-(5-isopropylsulfinylthiazol-2-oxy)-propanediol 1,2-acetonide;
3-(4-t-butylsulfinylthiazol-2-oxy)-propanediol 1,2-acetonide;
3-(5-t-butylsulfinylthiazol-2-oxy)-propanediol 1,2-acetonide;
3-(5-phenylsulfiinylthiazol-2-oxy)-propanediol 1,2-acetonide;
3-(4-phenylsulfinylthiazol-2-oxy)-propanediol 1,2-acetonide;
3-(5-benzylsulfinylthiazol-2-oxy)-propanediol 1,2-acetonide; and
3-(4-benzylsulfinylthiazol-2-oxy)-propanediol 1,2-acetonide.

PREPARATION 27

2-Bromo-5-Butylsulfonylthiazole 30 ml. of aqueous 65% (wt.) nitric acid is added to a solution containing 0.106 moles of 2 - amino - 5 - butylsulfonylthiazole (*J. of Org. Chem.*, vol. 24, p. 187 (1957)) in 150 ml. of 80% aqueous phosphoric acid at 0° C. A solution containing 11 g. of sodium nitrite in 30 ml. of water is then admixed to the solution. The resulting mixture is cooled at —5° C. and maintained at this temperature, with constant stirring for 30 minutes. The resulting mixture is then admixed over a period of 20 minutes to a solution containing 20 g. of copper sulfate and 55 g. of sodium bromide in 100 ml. of water at 0° C. The resulting sodium reaction mixture is then allowed to warm to ambient temperature (i.e., about 20° C.) and then neutralized by the addition of aqueous sodium hydroxide. The resulting mixture is then extracted with ethyl acetate and the extract then subjected to high vacuum distillation and the fraction rich in 2-bromo-5-butylsulfonylthiazole recovered.

2-Bromo-5-Butylsulfinylthiazole 1.1 equivalents of m-chloroperbenzoic acid is added to a solution containing 1 g. of 2 - acetamido - 5 - butylthiazole (*J. Org. Chem.*, vol. 24, 187 (1959)) in 50 ml. of methylene chloride at 0° C. The mixture is monitored and maintained at this temperature until analysis reveals no significant quantity of m-chloroperbenzoic acid. The reaction mixture is then washed with dilute aqueous sodium carbonate, then water, and dried over sodium sulfate and evaporated to dryness affording 2 - acetamido-5 - butylsulfinylthiazole, which is then further purified by chromatography over alumina. A mixture containing 3.5 mmoles of 2 - acetamido - 5 - butylsulfinylthiazole in 20 ml. of concentrated hydrochloric acid and 10 ml. of water is refluxed with constant stirring or 24 hours. The resulting solution is then cooled by dilution with an equal volume of cold water (about 10° C.) and then neutralized to a pH of about 6 by the slow addition of sodium acetate. The resulting precipitate is filtered, washed with water, and then recrystallized from benzene affording 2 - amino-5 - butylsulfinylthiazole. The 2 - amino - 5 - butylsulfinylthiazole product is then in turn converted to 2 - bromo-5 - butylsulfinylthiazole according to the same procedure described hereinabove with respect to the conversion of the 2 - amino - 5 - butylsulfinylthiazole to the corresponding 2-bromo-5-butylsulfinylthiazole.

PREPARATION 28

3-(5-Sulfamoylthiazol-2-Oxy)-Propanediol 1,2-Acetonide

A mixture containing 1 g. of 2 - bromothiazol-5-sulfonic acid in 100 ml. of methanol at 20° C. is treated with a solution containing a stoichiometric equivalent amount of sodium methoxide in 20 ml. of methanol. The mixture is then evaporated and the resulting residue is suspended in 15 ml. of dimethylformamide. 1.3 equivalents of methyl iodide is then added to this mixture with constant stirring at 20° C. The mixture is monitored and maintained at this temperature with constant stirring until analysis reveals essentially complete consumption of the methyl iodide. The mixture is then diluted with water and the pH adjusted to 10 by the addition of dilute aqueous sodium hydroxide. The mixture is then extracted with ethyl acetate and the extracts evaporated affording 2 - bromo - 5-methyl-sulfonatothiazole. One gram of this product is added to a solution prepared by mixing two equivalents of sodium hydride in 20 ml. of glycerol acetonide. The resulting mixture is heated at 120° under a nitrogen atmosphere until thin-layer chromatographic analysis of the mixture shows the reaction to be essentially complete. The mixture is then allowed to cool to room temperature and then evaporated to dryness under vacuum. The residue is then dissolved in 50 ml. of methanol containing 0.5 g. of sodium hydroxide and 5 ml. of water. The resulting mixture is allowed to stand at room temperature for 18 hours then warmed at about 90° C. for 30 minutes, and then allowed to cool to room temperature and neutralized by the addition of an ion exchange resin form (acid form). The ion exchange resin is then removed by decanting the solution and the resulting decanted solution neutralized by the addition of one equivalent of sodium methoxide, and then evaporated to dryness affording 3-(5 - sodium sulfonatothiazol - 2 - oxy) - propane - diol 1,2-acetonide. One gram of this product is then suspended in 20 ml. of benzene and the resulting suspension cooled to 0° C. and 1.1 equivalents of oxalyl chloride added. The resulting mixture is allowed to stand for 18 hours at 20° C., then poured into water and extracted with methylene chloride. The resulting extract is then filtered through diatomaceous earth and evaporated to dryness affording 3 - (5 - chlorosulfonylthiazol - 2 - oxy) - propanediol 1,2-acetonide. One gram of this product is then redissolved in 20 ml. of methylene chloride and 1.2 equivalents of triethylamine at 0° C. A slow stream of gaseous anhydrous ammonia is passed through the resulting mixture for 5 minutes. The reaction mixture is sealed and allowed to stand at 20° C. for 18 hours, and then unsealed, washed with water, dried over sodium sulfate and evaporated to dryness affording 3 - (5 - sulfamoylthiazol-2 - oxy) - propanediol 1,2-acetonide.

Similarly, by the following the same procedure but respectively using methylamine, ethylamine, dimethylamine, and isopropylamine in the last step in place of ammonia affords, respectively, the following compounds:

3-(5-[N-methylsulfamoyl]-thiazol-2-oxy)-
propanediol 1,2-acetonide;
3-(5-[N-ethylsulfamoyl]-thiazol-2-oxy)-
propanediol 1,2-acetonide;
3-(5-[N,N-dimethylsulfamoyl]-thiazol-2-oxy)-
propanediol 1,2-acetonide; and
3-(5-[N-isopropylsulfamoyl]-thiazol-2-oxy)-
propanediol 1,2-acetonide.

PREPARATION 29

3-(4-Sulfamoyl-Thiazol-2-Oxy)-Propanediol 1,2-Acetonide

A mixture containing 1 g. of 2,5-dibromothiazole-4-sulfonic acid in 100 ml. of methanol at 20° C. is treated with a solution containing a stoichiometric equivalent amount of sodium methoxide in 20 ml. of methanol. The resulting mixture is evaporated to dryness affording a residue which is then suspended in 15 ml. of dimethylformamide. 1.3 equivalents of methyl iodide is added to the suspension and the resulting mixture is monitored and stirred until analysis reveals essentially complete consumption of the methyl iodide. The mixture is then diluted with water and the pH adjusted to 10 by the addition of dilute aqueous sodium hydroxide. The mixture is then extracted with ethyl acetate and the extract then evaporated affording a residue of 2,5-dibromo-methylsulfonatothiazole. One gram of this residue is added to a solution prepared by mixing two equivalents of sodium hydride in 20 ml. of glycerol acetonide. The resulting mixture is heated at 120° under a nitrogen atmosphere, until the reaction is essentially completed as determined by thin-layer chromatographic reaction mixture. The reaction mixture is then slurried with an excess of ion exchange resin (acid form), and the liquid then decanted and evaporated to dryness under vacuum. The residue is then dissolved in 50 ml. methanol containing 0.5 ml. of triethylamine. One gram of Raney nickel is added and the resulting slurry is stirred in a hydrogen atmosphere until the theoretical consumption of hydrogen is complete. The mixture is then filtered, to remove the Raney nickel, and a solution containing 0.5 g. of sodium hydroxide and 5 g. of water is added to the filtrate. The filtrate-sodium hydroxide mixture is maintained at 20° C. for 18 hours and then warmed at 90° C. for 10 minutes and then allowed to cool to 20° C. The mixture is then neutralized by the addition of an excess of ion exchange resin (acid form). The solution is then decanted and neutralized by the addition of 1 equivalent of sodium methoxide and then evaporated to dryness yielding 3-(4-sodium sulfonatothiazol-2-oxy)-propanediol 1,2-acetonide. The following compounds are then obtained by respectively treating 1 gram portions of 3-(4-sodium sulfonatothiazol-2-oxy)-propanediol 1,2-acetonide according to the same procedures as described herein above in Preparation 28 with respect to 3-(5-sodium sulfonatothiazol-2-oxy)-propanediol 1,2-acetonide:

3-(4-sulfamoylthiazol-2-oxy)-propanediol 1,2-acetonide;
3-(4-[N-methylsulfamoyl]-thiazol-2-oxy)-propanediol
1,2-acetonide;
3-(4-[N-ethylsulfamoyl]-thiazol-2-oxy)-propanediol
1,2-acetonide;
3-(4-[N-dimethylsulfamoyl]-thiazol-2-oxy)-propanediol
1,2-acetonide; and
3-(4-[N-isopropylsulfamoyl]-thiazol-2-oxy)-propanediol
1,2-acetonide.

PREPARATION 30

2-Bromo-4- and 5-Nitrothiazole 45 ml. of nitrogen tetraoxide is added to 100 ml. of nitromethane at 10° C. An excess of borontrifluoride is bubbled through the mixture, while maintaining the mixture temperature below 10° C. A second solution is concurrently prepared by saturating a solution containing 30 grams of 2-bromothiazole in 50 ml. of nitromethane at $-15°$ C., with gaseous borontrifluoride. This solution is then slowly added, over a period of 30 minutes, to the nitrogen tetraoxide slurry, previously prepared, at 20° C. The resulting mixture is stirred at room temperature for 19 hours and then heated at 65 to 70° C. for 2 hours. The mixture is cooled to room temperature, poured over ice, and then made slightly alkaline by the addition of 10% aqueous sodium hydroxide. The mixture is then extracted six times with 100 ml. volumes of methylene chloride. The extracts are combined, dried over sodium sulfate, and then evaporated to dryness. The resulting residue is chromatographed over alumina, eluting with hexane, benzene and ethyl acetate and sequentially proportioned mixtures of these solvents, affording as separate product fractions, 2-bromo-4-nitrothiazole and 2-bromo-5-nitrothiazole.

PREPARATION 31

4- and 5-Aminothiazole-2-Oxy-1,2-Propanediol 1,2-Acetonide

A solution of 1 g. of 4-nitrothiazol-2-oxy-1,2-propanediol 1,2-acetonide in 50 ml. of ethanol is stirred with 0.5 g. of Raney nickel in a hydrogen atmosphere at 20° C. until the theoretical amount of hydrogen, as determined by analysis of the hydrogen atmosphere, has been consumed.

Similarly 5 - aminothiazol - 2 - oxy-1,2-propanediol 1,2-acetonide is prepared by following the same procedure but using 5-aminothiazol-2-oxy-1,2-propanediol 1,2-acetonide.

PREPARATION 32

3-(4- and 5-Carboxythiazol-2-Oxy)-1,2-Propanediol 1,2-Acetonide (Alternate Procedure)

Two grams of 2-bromo-5-ethoxycarbonylthiazole (Helv. Chim. Acta., p. 2063 (1954)) is added to a mixture containing 2 molar equivalents of sodium hydride in 50 ml. of glycerol acetonide, under a nitrogen atmosphere at room temperature. The resulting mixture is refluxed for 1.25 hours and then cooled to room temperature, diluted with ethyl ether, and filtered. The filtrate is washed twice with saturated aqueous sodium chloride, dried over sodium sulfate, and evaporated to dryness. The residue is dissolved in 25 ml. of methanol and then 0.2 g. of sodium hydroxide in 5 ml. of water is added. The mixture is allowed to stand for 12 hours at room temperature and then neutralized by the addition of dilute aqueous hydrochloric acid. The mixture is then concentrated by evaporation at 30° C., to remove the majority of the methanol, and then extracted with ethyl acetate. The resulting extract is evaporated to dryness yielding 3-(5-carboxythiazol-2-oxy)-1,2-propanediol 1,2-acetonide. Similarly, 3-(4-carboxythiazol-2-oxy)-1,2-propanediol 1,2-acetonide is prepared by using 2-bromo-4-ethoxycarbonylthiazole as the starting materials.

The procedures described in Preparation 15 for the preparation of 3-(4- and 5-alkoxy- and general ether-carbonylthiazol-2-oxy)-1,2-propanediol 1,2-acetonides are repeated using the products of this preparation as starting materials.

EXAMPLE 1

This example illustrates the first step of the generic process of the invention. In this example sodium hydride (18 g., 56 wt. percent dispersion in oil) is washed with n-hexane, and the hexane is replaced with monoglyme (100 ml.). To this mixture is added a solution of glycerol acetonide (44.5 g.) in monoglyme (200 ml.) under an atmosphere of nitrogen. After 15 minutes, 2-chlorothiazole (32 g.) is added, and the mixture is refluxed for 1.25 hours. The reaction mixture is then cooled, diluted with ether and filtered. The filtrate is washed with saturated aqueous sodium chloride solution twice, dried and concentrated by evaporation. Fractional distillation yields 3-(thiazol-2-oxy)-propanediol 1,2-acetonide.

Repeating the above procedure with 2-bromothiazole yields 3-(thiazol-2-oxy)propanediol 1,2-acetonide.

Similarly by following the same procedure but respectively replacing 2-chlorothiazole with the compounds listed in Column A, the corresponding compounds listed in Column B are respectively obtained:

Column A 2-bromo-4-methylthiazole;
2-bromo-5-methylthiazole;
2-bromo-4-isopropylthiazole;
2-bromo-5-isopropylthiazole;
2-bromo-4-t-butylthiazole;
2-bromo-5-t-butylthiazole;
2-bromo-4-cyclopropylthiazole;
2-bromo-5-cyclopropylthiazole;
2-bromo-4-cyclopentylthiazole;
2-bromo-5-cyclopentylthiazole;
2-bromo-4-phenylthiazole;
2-bromo-5-phenylthiazole;
2-bromo-4-p-tolylthiazole;
2-bromo-5-p-tolylthiazole;
2-bromo-4-cyanothiazole;
2-bromo-5-cyanothiazole;
2-bromo-4-fluorothiazole;
2-bromo-5-fluorothiazole;
2,4-dichlorothiazole;
2-bromo-5-chlorothiazole;
2,5-dibromothiazole;
2-bromo-5-iodothiazole;
2-bromo-4-iodothiazole;
2-bromo-4-trifluoromethylthiazole;
4-acetamido-2-bromothiazole;
5-acetamido-2-bromothiazole;
2-bromo-4-ethylamidothiazole;
2-bromo-5-ethylamidothiazole;
2-bromo-4-phenylamidothiazole;
2-bromo-5-phenylamidothiazole;
4-formylamido-2-chlorothiazole;
5-formylamido-2-chlorothiazole;
2-chloro-4-nitrothiazole;
2-chloro-5-nitrothiazole;
2-bromo-5-nitrothiazole;
2-bromo-4-p-chlorophenylthiazole;
2-bromo-5-p-chlorophenylthiazole;
2-bromo-4-p-hydroxyphenylthiazole;
2-bromo-5-p-hydroxyphenylthiazole;
2-bromo-4-p-methoxyphenylthiazole;
2,4-dibromothiazole;
2-bromo-5-p-methoxyphenylthiazole;
4-p-acetoxyphenyl-2-bromothiazole;
5-p-acetoxyphenyl-2-bromothiazole;
2-chloro-4-ureidothiazole;
2-chloro-5-ureidothiazole;
2-chloro-5-methoxycarbonylaminothiazole;
2-chloro-4-methoxycarbonylaminothiazole;
2-chloro-5-isopropoxycarbonylaminothiazole;
2-chloro-4-isopropoxycarbonylaminothiazole;
2-chloro-5-phenoxycarbonylaminothiazole;
2-chloro-4-phenoxycarbonylaminothiazole;
5-benzyloxycarbonylamino-2-chlorothiazole;
4-benzyloxycarbonylamino-2-chlorothiazole;
2-bromo-5-butylsulfonylthiazole;
2-bromo-4-butylsulfonylthiazole;
2-bromo-5-butylsulfinylthiazole; and
2-bromo-4-butylsulfinylthiazole.

Column B 3-(4-methylthiazol-2-oxy)-propanediol 1,2-acetonide;
3-(5-methylthiazol-2-oxy)-propanediol 1,2-acetonide;
3-(4-isopropylthiazol-2-oxy)-propanediol 1,2-acetonide;
3-(5-isopropylthiazol-2-oxy3-propanediol 1,2-acetonide;
3-(4-t-butylthiazol-2-oxy)-propanediol 1,2-acetonide;
3-(5-t-butylthiazol-2-oxy)-propanediol 1,2-acetonide;
3-(4-cyclopropylthiazol-2-oxy)-propanediol 1,2-acetonide;
3-(5-cyclopropylthiazol-2-oxy)-propanediol 1,2-acetonide;
3-(4-cyclopentylthiazol-2-oxy)-propanediol 1,2-acetonide;
3-(5-cyclopentylthiazol-2-oxy)-propanediol 1,2-acetonide;
3-(4-phenylthiazol-2-oxy)-propanediol 1,2-acetonide;
3-(5-phenylthiazol-2-oxy)-propanediol 1,2-acetonide;
3-(4-tolylthiazol-2-oxy)-propanediol 1,2-acetonide;
3-(5-tolylthiazol-2-oxy)-propanediol 1,2-acetonide;
3-(4-cyanothiazol-2-oxy)-propanediol 1,2-acetonide;
3-(5-cyanothiazol-2-oxy)-propanediol 1,2-acetonide;
3-(4-fluorothiazol-2-oxy)-propanediol 1,2-acetonide;
3-(5-fluorothiazol-2-oxy)-propanediol 1,2-acetonide;
3-(4-chlorothiazol-2-oxy)-propanediol 1,2-acetonide;
3-(5-chlorothiazol-2-oxy)-propanediol 1,2-acetonide;
3-(5-bromothiazol-2-oxy)-propanediol 1,2-acetonide;
3-(5-iodothiazol-2-oxy)-propanediol 1,2-acetonide;
3-(4-iodothiazol-2-oxy)-propanediol 1,2-acetonide;
(3-(4-trifluoromethylthiazol-2-oxy)-propanediol 1,2-acetonide;
3-(4-acetamidothiazol-2-oxy)-propanediol 1,2-acetonide;
3-(5-acetamidothiazol-2-oxy)-propanediol 1,2-acetonide;
3-(4-ethylamidothiazol-2-oxy)-propanediol 1,2-acetonide;
3-(5-ethylamidothiazol-2-oxy)-propanediol 1,2-acetonide;
3-(4-phenylamidothiazol-2-oxy)-propanediol 1,2-acetonide;
3-(5-phenylamidothiazol-2-oxy)-propanediol 1,2-acetonide;
3-(4-formylamidothiazol-2-oxy)-propanediol 1,2-acetonide;
3-(5-formylamidothiazol-2-oxy)-propanediol 1,2-acetonide;
3-(4-nitrothiazol-2-oxy)-propanediol 1,2-acetonide;
3-(5-nitrothiazol-2-oxy)-propanediol 1,2-acetonide;
3-(5-nitrothiazol-2-oxy)-propanediol 1,2-acetonide;
3-(4-p-chlorophenylthiazol-2-oxy)-propanediol 1,2-acetonide;
3-(5-p-chlorophenylthiazol-2-oxy)-propanediol 1,2-acetonide;
3-(4-p-hydroxyphenylthiazol-2-oxy)-propanediol 1,2-acetonide;

3-(5-p-hydroxyphenylthiazol-2-oxy)-propanediol 1,2-acetonide;
3-(4-p-methoxyphenylthiazol-2-oxy)-propanediol 1,2-acetonide;
3-(5-p-methoxyphenylthiazol-2-oxy)-propanediol 1,2-acetonide;
3-(4-p-acetoxyphenylthiazol-2-oxy)-propanediol 1,2-acetonide;
3-(5-p-acetoxyphenylthiazol-2-oxy)-propanediol 1,2-acetonide;
3-(4-ureidothiazol-2-oxy)-propanediol 1,2-acetonide;
3-(5-ureidothiazol-2-oxy)-propanediol 1,2-acetonide;
3-(5-methoxycarbonylaminothiazol-2-oxy)-propanediol 1,2-acetonide;
3-(4-methoxycarbonylaminothiazol-2-oxy)-propanediol 1,2-acetonide;
3-(5-isopropoxycarbonylaminothiazol-2-oxy)-propanediol 1,2-acetonide;
3-(4-isopropoxycarbonylaminothiazol-2-oxy)-propanediol 1,2-acetonide;
3-(5-phenoxycarbonylaminothiazol-2-oxy)-propanediol 1,2-acetonide;
3-(4-phenoxycarbonylaminothiazol-2-oxy)-propanediol 1,2-acetonide;
3-(5-benzyloxycarbonylaminothiazol-2-oxy)-propanediol 1,2-acetonide;
3-(4-benzyloxycarbonylaminothiazol-2-oxy)-propanediol 1,2-acetonide;
3-(5-butylsulfonylthiazol-2-oxy)-propanediol 1,2-acetonide;
3-(4-butylsulfonylthiazol-2-oxy)-propanediol 1,2-acetonide;
3-(5-butylsulfinylthiazol-2-oxy)-propanediol 1,2-acetonide;
3-(4-butylsulfinylthiazol-2-oxy)-propanediol 1,2-acetonide; and
3-(4-bromothiazol-2-oxy)-2-propanediol 1,2-acetonide.

EXAMPLE 2

This example illustrates methods according to step (2) of the generic process of the invention. In this example one gram of 3-(thiazol-2-oxy)-propanediol 1,2-acetonide in 2 ml. of a 88% aqueous formic acid is stirred at room temperature for 5 minutes. The solution is then evaporated under vacuum at room temperature to yield a residue of 3-(2-thiazoloxy)-1,2-propanediol.

Similarly by following the above procedure but respectively replacing 3-(thiazol-2-oxy)-propanediol 1,2-acetonide with the compounds listed in Column C, the corresponding compounds listed in Column D are respectively prepared:

Column C 3-(4-methylthiazol-2-oxy)-propanediol 1,2-acetonide;
3-(5-methylthiazol-2-oxy)-propanediol 1,2-acetonide;
3-(4-isopropylthiazol-2-oxy)-propanediol 1,2-acetonide;
3-(5-isopropylthiazol-2-oxy)-propanediol 1,2-acetonide;
3-(4-t-butylthiazol-2-oxy)-propanediol 1,2-acetonide;
3-(5-t-butylthiazol-2-oxy)-propanediol 1,2-acetonide;
3-(4-cyclopropylthiazol-2-oxy)-propanediol 1,2-acetonide;
3-(5-cyclopropylthiazol-2-oxy)-propanediol 1,2-acetonide;
3-(4-cyclopentylthiazol-2-oxy)-propanediol 1,2-acetonide;
3-(5-cyclopentylthiazol-2-oxy)-propanediol 1,2-acetonide;
3-(4-bromothiazol-2-oxy)-2-propanediol 1,2-acetonide;
3-(4-phenylthiazol-2-oxy)-propanediol 1,2-acetonide;
3-(5-phenylthiazol-2-oxy)-propanediol 1,2-acetonide;
3-(4-tolylthiazol-2-oxy)-propanediol 1,2-acetonide;
3-(5-tolylthiazol-2-oxy)-propanediol 1,2-acetonide;
3-(4-cyanothiazol-2-oxy)-propanediol 1,2-acetonide;
3-(5-cyanothiazol-2-oxy)-propanediol 1,2-acetonide;
3-(4-fluorothiazol-2-oxy)-propanediol 1,2-acetonide;
3-(5-fluorothiazol-2-oxy)-propanediol 1,2-acetonide;
3-(4-chlorothiazol-2-oxy)-propanediol 1,2-acetonide;
3-(5-chlorothiazol-2-oxy)-propanediol 1,2-acetonide;
3-(5-bromothiazol-2-oxy)-propanediol 1,2-acetonide;
3-(5-iodothiazol-2-oxy)-propanediol 1,2-acetonide;
3-(4-iodothiazol-2-oxy)-propanediol 1,2-acetonide;
3-(5-trifluoromethylthiazol-2-oxy)-propanediol 1,2-acetonide;
3-(4-acetamidothiazol-2-oxy)-propanediol 1,2-acetonide;
3-(5-acetamidothiazol-2-oxy)-propanediol 1,2-acetonide;
3-(4-ethylamidothiazol-2-oxy)-propanediol 1,2-acetonide;
3-(5-ethylamidothiazol-2-oxy)-propanediol 1,2-acetonide;
3-(4-phenylamidothiazol-2-oxy)-propanediol 1,2-acetonide;
3-(5-phenylamidothiazol-2-oxy)-propanediol 1,2-acetonide;
3-(4-formylamidothiazol-2-oxy)-propanediol 1,2-acetonide;
3-(5-formylamidothiazol-2-oxy)-propanediol 1,2-acetonide;
3-(4-nitrothiazol-2-oxy)-propanediol 1,2-acetonide;
3-(5-nitrothiazol-2-oxy)-propanediol 1,2-acetonide;
3-(4-p-chlorophenylthiazol-2-oxy)-propanediol 1,2-acetonide;
3-(5-p-chlorophenylthiazol-2-oxy)-propanediol 1,2-acetonide;
3-(4-p-hydroxyphenylthiazol-2-oxy)-propanediol 1,2-acetonide;
3-(5-p-hydroxyphenylthiazol-2-oxy)-propanediol 1,2-acetonide;
3-(4-p-methoxyphenylthiazol-2-oxy)-propanediol 1,2-acetonide;
3-(5-p-methoxyphenylthiazol-2-oxy)-propanediol 1,2-acetonide;
3-(4-p-acetoxyphenylthiazol-2-oxy)-propanediol 1,2-acetonide;
3-(5-p-acetoxyphenylthiazol-2-oxy)-propanediol 1,2-acetonide;
3-(4-ureidothiazol-2-oxy)-propanediol 1,2-acetonide;
3-(5-ureidothiazol-2-oxy)-propanediol 1,2-acetonide;
3-(5-methoxycarbonylaminothiazol-2-oxy)-propanediol 1,2-acetonide;
3-(4-methoxycarbonylaminothiazol-2-oxy)-propanediol 1,2-acetonide;
3-(5-isopropoxycarbonylaminothiazol-2-oxy)-propanediol 1,2-acetonide;
3-(4-isopropoxycarbonylaminothiazol-2-oxy)-propanediol 1,2-acetonide;
3-(5-phenoxycarbonylaminothiazol-2-oxy)-propanediol 1,2-acetonide;
3-(4-phenoxycarbonylaminothiazol-2-oxy)-propanediol 1,2-acetonide;
3-(5-benzyloxycarbonylaminothiazol-2-oxy)-propanediol 1,2-acetonide;
3-(4-benzyloxycarbonylaminothiazol-2-oxy)-propanediol 1,2-acetonide;
3-(5-butylsulfonylthiazol)-2-oxy)-propanediol 1,2-acetonide;
3-(4-butylsulfonylthiazol-2-oxy)-propanediol 1,2-acetonide;
3-(5-butylsulfinylthiazol-2-oxy)-propanediol 1,2-acetonide;
3-(4-butylsulfinylthiazol-2-oxy)-propanediol 1,2-acetonide;
3-(5-trifluoromethylthiazol-2-oxy)-propanediol 1,2-acetonide;
3-(5-carboxythiazol-2-oxy)-propanediol 1,2-acetonide;
3-(4-carboxythiazol-2-oxy)-propanediol 1,2-acetonide;
3-(5-methoxycarbonylthiazol-2-oxy)-propanediol 1,2-acetonide;
3-(4-methoxycarbonylthiazol-2-oxy)-propanediol 1,2-acetonide;
3-(5-ethoxycarbonylthiazol-2-oxy)-propanediol 1,2-acetonide;
3-(4-ethoxycarbonylthiazol-2-oxy)-propanediol 1,2-acetonide;
3-(5-propoxycarbonylthiazol-2-oxy)-propanediol 1,2-acetonide;
3-(5-cyclopentoxycarbonylthiazol-2-oxy)-propanediol 1,2-acetonide;

3-(4-cyclopentoxycarbonylthiazol-2-oxy)-propanediol 1,2-acetonide;
3-(5-phenoxycarbonylthiazol-2-oxy)-propanediol 1,2-acetonide;
3-(4-phenoxycarbonylthiazol-2-oxy)-propanediol 1,2-acetonide;
3-(5-benzyloxycarbonylthiazol-2-oxy)-propanediol 1,2-acetonide;
3-(4-benzyloxycarbonylthiazol-2-oxy)-propanediol 1,2-acetonide;
3-(5-formylthiazol-2-oxy)-propanediol 1,2-acetonide;
3-(4-formylthiazol-2-oxy)-propanediol 1,2-acetonide;
3-(5-acetylthiazol-2-oxy)-propanediol 1,2-acetonide;
3-(4-acetylthiazol-2-oxy)-propanediol 1,2-acetonide;
3-(5-propionylthiazol-2-oxy)-propanediol 1,2-acetonide;
3-(4-propionylthiazol-2-oxy)-propanediol 1,2-acetonide;
3-(5-t-butyrylthiazol-2-oxy)-propanediol 1,2-acetonide;
3-(4-t-butyrylthiazol-2-oxy)-propanediol 1,2-acetonide;
3-(5-cyanothiazol-2-oxy)-propanediol 1,2-acetonide;
3-(4-cyanothiazol-2-oxy)-propanediol 1,2-acetonide;
3-(5-butoxycarbonylaminothiazol-2-oxy)-propanediol 1,2-acetonide;
3-(5-[N'-methylureido]-thiazol-2-oxy)-propanediol 1,2-acetonide;
3-(4-[N'-methylureido]-thiazol-2-oxy)-propanediol 1,2-acetonide;
3-(5-[N'-ethylureido]-thiazol-2-oxy)-propanediol 1,2-acetonide;
3-(4[N'-ethylureido]-thiazol-2-oxy-propanediol 1,2-acetonide;
3-(5-[N'-isopropyluredio]-thiazol-2-oxy)-propanediol 1,2-acetonide;
3-(4-[N'-isopropylureido]-thiazol-2-oxy)-propanediol 1,2-acetonide;
3-(4-[N'-isopropyluredio]-thiazol-2-oxy)-propanediol 1,2-acetonide;
3-(5-[N'-t-butylureido]-thiazol-2-oxy)-propanediol 1,2-acetonide;
3-(4-[N'-t-butyluredio]-thiazol-2-oxy)-propanediol 1,2-acetonide;
3-(5-ethylaminothiazol-2-oxy)-propanediol 1,2-acetonide;
3-(4-ethylaminothiazol-2-oxy)-propanediol 1,2-acetonide;
3-(5-methylaminothiazol-2-oxy)-propanediol 1,2-acetonide;
3-(4-methylaminothiazol-2-oxy)-propanediol 1,2-acetonide;
3-(5-propylaminothiazol-2-oxy)-propanediol 1,2-acetonide;
3-(4-propylaminothiazol-2-oxy)-propanediol 1,2-acetonide;
3-(5-[N-methylformamido]-thiazol-2-oxy)-propanediol 1,2-acetonide;
3-(4-[N-methylformamido]-thiazol-2-oxy)-propandiol 1,2-acetonide;
3-(5-[N-ethylformamido]-thiazol-2-oxy)-propanediol 1,2-acetonide;
3-(4-[N-ethylformamido]-thiazol-2-oxy)-propanediol 1,2-acetonide;
3-(5-[N-isopropylformamido]-thiazol-2-oxy)-propanediol 1,2-acetonide;
3-(4-[N-isopropylformamido]-thiazol-2-oxy)-propanediol 1,2-acetonide;
3-(5-[N-t-butylformamido]-thiazol-2-oxy)-propanediol 1,2-acetonide;
3-(4-[N-t-butylformamido]-thiazol-2-oxy)-propanediol 1,2-acetonide;
3-(5-hydroxymethylthiazol-2-oxy)-propanediol 1,2-acetonide;
3-(4-hydroxymethylthiazol-2-oxy)-propanediol 1,2-acetonide;
3-(5-thioethylthiazol-2-oxy)-propanediol 1,2-acetonide;
3-(4-thioethylthiazol-2-oxy)-propanediol 1,2-acetonide;
3-(5-thiomethylthiazol-2-oxy)-propanediol 1,2-acetonide;
3-(4-thiomethlythiazol-2-oxy)-propanediol 1,2-acetonide;
3-(5-thioisopropylthiazol-2-oxy)-propanediol 1,2-acetonide;
3-(4-thioisopropylthiazol-2-oxy)-propanediol 1,2-acetonide;
3-(5-thio-t-butylthiazol-2-oxy)-propanediol 1,2-acetonide;
3-(4-thio-t-butylthiazol-2-oxy)-propanediol 1,2-acetonide;
3-(5-thiophenylthiazol-2-oxy)-propanediol 1,2-acetonide;
3-(4-thiophenylthiazol-2-oxy)-propanediol 1,2-acetonide;
3-(5-thiobenzylthiazol-2-oxy)-propanediol 1,2-acetonide;
3-(4-thiobenzylthiazol-2-oxy)-propanediol 1,2-acetonide;
3-(5-ethylsulfonylthiazol-2-oxy)-propanediol 1,2-acetonide;
3-(4-ethylsulfonylthiazol-2-oxy)-propanediol 1,2-acetonide;
3-(5-methylsulfonylthiazol-2-oxy)-propanediol 1,2-acetonide;
3-(4-methylsulfonylthiazol-2-oxy)-propanediol 1,2-acetonide;
3-(5-isopropylsulfonylthiazol-2-oxy)-propanediol 1,2-acetonide;
3-(4-isopropylsulfonylthiazol-2-oxy)-propanediol 1,2-acetonide;
3-(5-phenylsulfonylthiazol-2-oxy)-propanediol 1,2-acetonide;
3-(4-phenylsulfonylthiazol-2-oxy)-propanediol 1,2-acetonide;
3-(5-benzylsulfonylthiazol-2-oxy)-propanediol 1,2-acetonide;
3-(4-benzylsulfonylthiazol-2-oxy)-propanediol 1,2-acetonide;
3-(5-ethylsulfinylthiazol-2-oxy)-propanediol 1,2-acetonide;
3-(4-ethylsulfinylthiazol-2-oxy)-propanediol 1,2-acetonide;
3-(5-methylsulfinylthiazol-2-oxy)-propanediol 1,2-acetonide;
3-(4-methylsulfinylthiazol-2-oxy)-propanediol 1,2-acetonide;
3-(5-isopropylsulfinylthiazol-2-oxy)-propanediol 1,2-acetonide;
3-(4-isopropylsulfinylthiazol-2-oxy)-propanediol 1,2-acetonide;
3-(5-phenylsulfinylthiazol-2-oxy)-propanediol 1,2-acetonide;
3-(4-phenylsulfinylthiazol-2-oxy)-propanediol 1,2-acetonide;
3-(5-benzylsulfinylthiazol-2-oxy)-propanediol 1,2-acetonide;
3-(4-benzylsulfinylthiazol-2-oxy)-propanediol 1,2-acetonide;
3-(5-sulfamoylthiazol-2-oxy)-propanediol 1,2-acetonide;
3-(4-sulfamoylthiazol-2-oxy)-propanediol 1,2-acetonide;
3-(5-[N-ethylsulfamoyl]-thiazol-2-oxy)-propanediol 1,2-acetonide;
3-(4-[N-ethylsulfamoyl]-thiazol-2-oxy)-propanediol 1,2-acetonide;
3-(5-[N-methylsulfamoyl]-thiazol-2-oxy)-propanediol 1,2-acetonide;
3-(4-[N-methylsulfamoyl]-thiazol-2-oxy)-propanediol 1,2-acetonide;
3-(5-[N,N-dimethylsulfamoyl]-thiazol-2-oxy)-propanediol 1,2-acetonide;
3-(4-[N,N-dimethylsulfamoyl]-thiazol-2-oxy)-propanediol 1,2-acetonide;
3-(5-[N-isopropylsulfamoyl]-thiazol-2-oxy)-propanediol 1,2-acetonide; and
3-(4-[N-isopropylsulfamoyl]-thiazol-2-oxy)-propanediol 1,2-acetonide.

Column D 3-(4-methylthiazol-2-oxy)-1,2-propanediol;
3-(5-methylthiazol-2-oxy)-1,2-propanediol;
3-(4-isopropylthiazol-2-oxy)-1,2-propanediol;
3-(5-isopropylthiazol-2-oxy)-1,2-propanediol;
3-(4-t-butylthiazol-2-oxy)-1,2-propanediol;

3-(5-t-butylthiazol-2-oxy)-1,2-propanediol;
3-(4-cyclopropylthiazol-2-oxy)-1,2-propanediol;
3-(5-cyclopropylthiazol-2-oxy)-1,2-propanediol;
3-(4-cyclopentylthiazol-2-oxyl)-1,2-propanediol;
3-(5-cyclopentylthiazol-2-oxy)-1,2-propanediol;
3-(4-phenylthiazol-2-oxy)-1,2-propanediol;
3-(5-phenylthiazol-2-oxy)-1,2-propanediol;
3-(4-tolylthiazol-2-oxy)-1,2-propanediol;
3-(5-tolylthiazol-2-oxy)-1,2-propanediol;
3-(4-cyanothiazol-2-oxy)-1,2-propanediol;
3-(5-cyanothiazol-2-oxy)-1,2-propanediol;
3-(4-fluorothiazol-2-oxy)-1,2-propanediol;
3-(5-fluorothiazol-2-oxy)-1,2-propanediol;
3-(4-chlorothiazol-2-oxy)-1,2-propanediol;
3-(5-chlorothiazol-2-oxy)-1,2-propanediol;
3-(5-bromothiazol-2-oxy)-1,2-propanediol;
3-(5-iodothiazol-2-oxy)-1,2-propanediol;
3-(4-iodothiazol-2-oxy)-1,2-propanediol;
3-(5-trifluoromethylthiazol-2-oxy)-1,2-propanediol;
3-(4-acetamidothiazol-2-oxy)-1,2-propanediol;
3-(5-acetamidothiazol-2-oxy)-1,2-propanediol;
3-(4-ethylamidothiazol-2-oxy)-1,2-propanediol;
3-(5-ethylamidothiazol-2-oxy)-1,2-propanediol;
3-(4-phenylamidothiazol-2-oxy)-1,2-propanediol;
3-(5-phenylamidothiazol-2-oxy)-1,2-propanediol;
3-(4-formylamidothiazol-2-oxy)-1,2-propanediol;
3-(5-formylamidothiazol-2-oxy)-1,2-propanediol;
3-(4-nitrothiazol-2-oxy)-1,2-propanediol;
3-(5-nitrothiazol-2-oxy)-1,2-propanediol;
3-(4-p-chlorophenylthiazol-2-oxy)-1,2-propanediol;
3-(5-p-chlorophenylthiazol-2-oxy)-1,2-propanediol;
3-(4-p-hydroxyphenylthiazol-2-oxy)-1,2-propanediol;
3-(5-p-hydroxyphenylthiazol-2-oxy)-1,2-propanediol;
3-(4-p-methoxyphenylthiazol-2-oxy)-1,2-propanediol;
3-(5-p-methoxyphenylthiazol-2-oxy)-1,2-propanediol;
3-(4-p-acetoxyphenylthiazol-2-oxy)-1,2-propanediol;
3-(5-p-acetoxyphenylthiazol-2-oxy)-1,2-propanediol;
3-(4-ureidothiazol-2-oxy)-1,2-propanediol;
3-(5-ureidothiazol-2-oxy)-1,2-propanediol;
3-(5-methoxycarbonylaminothiazol-2-oxy)-1,2-propanediol;
3-(4-methoxycarbonylaminothiazol-2-oxy)-1,2-propanediol;
3-(5-isopropoxycarbonylaminothiazol-2-oxy)-1,2-propanediol;
3-(4-isopropoxycarbonylaminothiazol-2-oxy)-1,2-propanediol;
3-(5-phenoxycarbonylaminothiazol-2-oxy)-1,2-propanediol;
3-(4-phenoxycarbonylaminothiazol-2-oxy)-1,2-propanediol;
3-(5-benzyloxycarbonylaminothiazol-2-oxy)-1,2-propanediol;
3-(4-benzyloxycarbonylaminothiazol-2-oxy)-1,2-propanediol;
3-(5-butylsulfonylthiazol-2-oxy)-1,2-propanediol;
3-(4-butylsulfonylthiazol-2-oxy)-1,2-propanediol;
3-(5-butylsulfinylthiazol-2-oxy)-1,2-propanediol;
3-(4-butylsulfinylthiazol-2-oxy)-1,2-propanediol;
3-(5-trifluoromethylthiazol-2-oxy)-1,2-propanediol;
3-(5-carboxythiazol-2-oxy)-1,2-propanediol;
3-(4-carboxythiazol-2-oxy)-1,2-propanediol;
3-(5-methoxycarbonylthiazol-2-oxy)-1,2-propanediol;
3-(4-methoxycarbonylthiazol-2-oxy)-1,2-propanediol;
3-(5-ethoxycarbonylthiazol-2-oxy)-1,2-propanediol;
3-(4-ethoxycarbonylthiazol-2-oxy)-1,2-propanediol;
3-(5-propoxycarbonylthiazol-2-oxy)-1,2-propanediol;
3-(5-cyclopentoxycarbonylthiazol-2-oxy)-1,2-propanediol;
3-(4-cyclopentoxycarbonylthiazol-2-oxy)-1,2-propanediol;
3-(5-phenoxycarbonylthiazol-2-oxy)-1,2-propanediol;
3-(4-phenoxycarbonylthiazol-2-oxy)-1,2-propanediol;
3-(5-benzyloxycarbonylthiazol-2-oxy)-1,2-propanediol;
3-(4-benzyloxycarbonylthiazol-2-oxy)-1,2-propanediol;
3-(5-formylthiazol-2-oxy)-1,2-propanediol;
3-(4-formylthiazol-2-oxy)-1,2-propanediol;

3-(5-acetylthiazol-2-oxy)-1,2-propanediol;
3-(4-acetylthiazol-2-oxy)-1,2-propanediol;
3-(5-propionylthiazol-2-oxy)-1,2-propanediol;
3-(4-propionylthiazol-2-oxy)-1,2-propanediol;
3-(5-t-butyrylthiazol-2-oxy)-1,2-propanediol;
3-(4-t-butyrylthiazol-2-oxy)-1,2-propanediol;
3-(5-cyanothiazol-2-oxy)-1,2-propanediol;
3-(4-cyanothiazol-2-oxy)-1,2-propanediol;
3-(4-bromothiazol-2-oxy)-1,2-propanediol;
3-(5-butoxycarbonylaminothiazol-2-oxy)-1,2-propanediol;
3-(5-[N'-methylureido]-thiazol-2-oxy)-1,2-propanediol;
3-(4-[N'-methylureido]-thiazol-2-oxy)-1,2-propanediol;
3-(5-[N'-ethylureido]-thiazol-2-oxy)-1,2-propanediol;
3-(4-[N'-ethylureido]-thiazol-2-oxy)-1,2-propanediol;
3-(5-[N'-isopropylureido]-thiazol-2-oxy)-1,2-propanediol;
3-(4-[N'-isopropylureido]-thiazol-2-oxy)-1,2-propanediol;
3-(5-[N'-t-butylureido]-thiazol-2-oxy)-1,2-propanediol;
3-(4-[N'-t-butylureido]-thiazol-2-oxy)-1,2-propanediol;
3-(5-ethylaminothiazol-2-oxy)-1,2-propanediol;
3-(4-ethylaminothiazol-2-oxy)-1,2-propanediol;
3-(5-methylaminothiazol-2-oxy)-1,2-propanediol;
3-(4-methylaminothiazol-2-oxy)-1,2-propanediol;
3-(5-propylaminothiazol-2-oxy)-1,2-propanediol;
3-(4-propylaminothiazol-2-oxy)-1,2-propanediol;
3-(5-[N-methylformamido]-thiazol-2-oxy)-1,2-propanediol;
3-(4-[N-methylformamido]-thiazol-2-oxy)-1,2-propanediol;
3-(5-[N-ethylformamido]-thiazol-2-oxy)-1,2-propanediol;
3-(4-[N-ethylformamido]-thiazol-2-oxy)-1,2-propanediol;
3-(5-[N-isopropylformamido]-thiazol-2-oxy)-1,2-propanediol;
3-(4-[N-isopropylformamido]-thiazol-2-oxy)-1,2-propanediol;
3-(5-[N-t-butylformamido]-thiazol-2-oxy)-1,2-propanediol;
3-(4-[N-t-butylformamido]-thiazol-2-oxy)-1,2-propanediol;
3-(5-hydroxymethylthiazol-2-oxy)-1,2-propanediol;
3-(4-hydroxymethylthiazol-2-oxy)-1,2-propanediol;
3-(5-thioethylthiazol-2-oxy)-1,2-propanediol;
3-(4-thioethylthiazol-2-oxy)-1,2-propanediol;
3-(5-thiomethylthiazol-2-oxy)-1,2-propanediol;
3-(4-thiomethylthiazol-2-oxy)-1,2-propanediol;
3-(5-thioisopropylthiazol-2-oxy)-1,2-propanediol;
3-(4-thioisopropylthiazol-2-oxy)-1,2-propanediol;
3-(5-thio-t-butylthiazol-2-oxy)-1,2-propanediol;
3-(4-thio-t-butylthiazol-2-oxy)-1,2-propanediol;
3-(5-thiophenylthiazol-2-oxy)-1,2-propanediol;
3-(4-thiophenylthiazol-2-oxy)-1,2-propanediol;
3-(5-thiobenzylthiazol-2-oxy)-1,2-propanediol;
3-(4-thiobenzylthiazol-2-oxy)-1,2-propanediol;
3-(5-ethylsulfonylthiazol-2-oxy)-1,2-propanediol;
3-(4-ethylsulfonylthiazol-2-oxy)-1,2-propanediol;
3-(5-methylsulfonylthiazol-2-oxy)-1,2-propanediol;
3-(4-methylsulfonylthiazol-2-oxy)-1,2-propanediol;
3-(5-isopropylsulfonylthiazol-2-oxy)-1,2-propanediol;
3-(4-isopropylsulfonylthiazol-2-oxy)-1,2-propanediol;
3-(5-phenylsulfonylthiazol-2-oxy)-1,2-propanediol;
3-(4-phenylsulfonylthiazol-2-oxy)-1,2-propanediol;
3-(5-benzylsulfonylthiazol-2-oxy)-1,2-propanediol;
3-(4-benzylsulfonylthiazol-2-oxy)-1,2-propanediol;
3-(5-ethylsulfinylthiazol-2-oxy)-1,2-propanediol;
3-(4-ethylsulfinylthiazol-2-oxy)-1,2-propanediol;
3-(5-methylsulfinylthiazol-2-oxy)-1,2-propanediol;
3-(4-methylsulfinylthiazol-2-oxy)-1,2-propanediol;
3-(5-isopropylsulfinylthiazol-2-oxy)-1,2-propanediol;
3-(4-isopropylsulfinylthiazol-2-oxy)-1,2-propanediol;
3-(5-phenylsulfinylthiazol-2-oxy)-1,2-propanediol;
3-(4-phenylsulfinylthiazol-2-oxy)-1,2-propanediol;
3-(5-benzylsulfinylthiazol-2-oxy)-1,2-propanediol;
3-(4-benzylsulfinylthiazol-2-oxy)-1,2-propanediol;
3-(5-sulfamoylthiazol-2-oxy)-1,2-propanediol;
3-(4-sulfamoylthiazol-2-oxy)-1,2-propanediol;

3-(5-[N-methylsulfamoyl]-thiazol-2-oxy)-1,2-propanediol;
3-(4-[N-ethylsulfamoyl]-thiazol-2-oxy)-1,2-propanediol;
3-(5-[N-methylsulfamoyl]-thiazol-2-oxy)-1,2-propanediol;
3-(4-[N-methylsulfamoyl]-thiazol-2-oxy)-1,2-propanediol;
3-(5-[N,N-dimethylsulfamoyl]-thiazol-2-oxy)-1,2-propanediol;
3-(4-[N,N-dimethylsulfamoyl]-thiazol-2-oxy)-1,2-propanediol;
3-(5-[N-isopropylsulfamoyl]-thiazol-2-oxy)-1,2-propanediol; and
3-(4-[N-isopropylsulfamoyl]-thiazol-2-oxy)-1,2-propanediol.

EXAMPLE 3

This example illustrates steps (3) and (4) of the generic process, of the invention, and further illustrates the preparation of the compounds of formula II of the invention. In this example 50 grams of 3-(thiazol-2-oxy)-1,2-propanediol is dissolved in 200 ml. of pyridine at 20° C. and then 22.5 ml. of methylsulfonyl chloride is added. The mixture is allowed to stand for 10 minutes and then separated into two portions (1/10 portion and one 9/10 portion). The 1/10 portion is diluted with water, then filtered and the resulting filter cake dried affording 2-hydroxy-1-methylsulfonyloxy-3-(thiazol-2-oxy)-propane.

The remaining 9/10 portion is diluted with one liter of ethyl ether and 200 g. of solid sodium methoxide added in portions during 5–10 minutes. The resulting mixture is stirred at 20–25° C. for one hour, or until complete transformation is demonstrated by thin-layer chromatography, and then poured into water. The ether layer is washed several times with water and then concentrated. The concentrate is diluted with benzene and washed with 20 vol. percent aqueous acetic acid three times, then with saturated aqueous sodium chloride solution three times, and then once with an aqueous saturated sodium bicarbonate solution. The organic layer is dried over sodium sulfate and evaporated to remove all residual solvent. The residue is distilled at reduced pressure to yield 1,2-epoxy-3-(thiazol-2-oxy)-propane.

Similarly, by respectively using the compounds of Column D as starting materials, the corresponding compounds of formula II, of the invention, enumerated herein below in Column E are respectively prepared:

Column E 1,2-epoxy-3-(4-methylthiazol-2-oxy)-propane;
1,2-epoxy-3-(5-methylthiazol-2-oxy)-propane;
1,2-epoxy-3-(4-isopropylthiazol-2-oxy)-propane;
1,2-epoxy-3-(5-isopropylthiazol-2-oxy)-propane;
1,2-epoxy-3-(4-t-butylthiazol-2-oxy)-propane;
1,2-epoxy-3-(5-t-butylthiazol-2-oxy)-propane;
1,2-epoxy-3-(4-cyclopropylthiazol-2-oxy)-propane;
1,2-epoxy-3-(5-cyclopropylthiazol-2-oxy)-propane;
1,2-epoxy-3-(4-cyclopentylthiazol-2-oxy)-propane;
1,2-epoxy-3-(5-cyclopentylthiazol-2-oxy)-propane;
1,2-epoxy-3-(4-phenylthiazol-2-oxy)-propane;
1,2-epoxy-3-(5-phenylthiazol-2-oxy)-propane;
1,2-epoxy-3-(4-tolylthiazol-2-oxy)-propane;
1,2-epoxy-3-(5-tolylthiazol-2-oxy)-propane;
1,2-epoxy-3-(4-cyanothiazol-2-oxy)-propane;
1,2-epoxy-3-(5-cyanothiazol-2-oxy)-propane;
1,2-epoxy-3-(4-fluorothiazol-2-oxy)-propane;
1,2-epoxy-3-(5-fluorothiazol-2-oxy)-propane;
1,2-epoxy-3-(4-bromothiazol-2-oxy)-2-propane;
1,2-epoxy-3-(4-chlorothiazol-2-oxy)-propane;
1,2-epoxy-3-(5-chlorothiazol-2-oxy)-propane;
1,2-epoxy-3-(5-bromothiazol-2-oxy)-propane;
1,2-epoxy-3-(5-iodothiazol-2-oxy)-propane;
1,2-epoxy-3-(4-iodothiazol-2-oxy)-propane;
1,2-epoxy-3-(4-trifluoromethylthiazol-2-oxy)-propane;
1,2-epoxy-3-(4-acetamidothiazol-2-oxy)-propane;
1,2-epoxy-3-(5-acetamidothiazol-2-oxy)-propane;
1,2-epoxy-3-(4-ethylamidothiazol-2-oxy)-propane;
1,2-epoxy-3-(5-ethylamidothiazol-2-oxy)-propane;
1,2-epoxy-3-(4-phenylamidothiazol-2-oxy)-propane;
1,2-epoxy-3-(5-phenylamidothiazol-2-oxy)-propane;
1,2-epoxy-3-(4-formylamidothiazol-2-oxy)-propane;
1,2-epoxy-3-(5-formylamidothiazol-2-oxy)-propane;
1,2-epoxy-3-(4-nitrothiazol-2-oxy)-propane;
1,2-epoxy-3-(5-nitrothiazol-2-oxy)-propane;
1,2-epoxy-3-(4-p-chlorophenylthiazol-2-oxy)-propane;
1,2-epoxy-3-(5-p-chlorophenylthiazol-2-oxy)-propane;
1,2-epoxy-3-(4-p-hydroxyphenylthiazol-2-oxy)-propane;
1,2-epoxy-3-(5-p-hydroxyphenylthiazol-2-oxy)-propane;
1,2-epoxy-3-(4-p-methoxyphenylthiazol-2-oxy)-propane;
1,2-epoxy-3-(5-p-methoxyphenylthiazol-2-oxy)-propane;
1,2-epoxy-3-(4-p-acetoxyphenylthiazol-2-oxy)-propane;
1,2-epoxy-3-(5-p-acetoxyphenylthiazol-2-oxy)-propane;
1,2-epoxy-3-(4-ureidothiazol-2-oxy)-propane;
1,2-epoxy-3-(5-ureidothiazol-2-oxy)-propane;
1,2-epoxy-3-(5-methoxycarbonylaminothiazol-2-oxy)-propane;
1,2-epoxy-3-(4-methoxycarbonylaminothiazol-2-oxy)-propane;
1,2-epoxy-3-(5-isopropoxycarbonylaminothiazol-2-oxy)-propane;
1,2-epoxy-3-(4-isopropoxycarbonylaminothiazol-2-oxy)-propane;
1,2-epoxy-3-(5-phenoxycarbonylaminothiazol-2-oxy)-propane;
1,2-epoxy-3-(4-phenoxycarbonylaminothiazol-2-oxy)-propane;
1,2-epoxy-3-(5-benzyloxycarbonylaminothiazol-2-oxy)-propane;
1,2-epoxy-3-(4-benzyloxycarbonylaminothiazol-2-oxy)-propane;
1,2-epoxy-3-(5-butylsulfonylthiazol-2-oxy)-propane;
1,2-epoxy-3-(4-butylsulfonylthiazol-2-oxy)-propane;
1,2-epoxy-3-(5-butylsulfinylthiazol-2-oxy)-propane;
1,2-epoxy-3-(4-butylsulfinylthiazol-2-oxy)-propane;
1,2-epoxy-3-(5-trifluoromethylthiazol-2-oxy)-propane;
1,2-epoxy-3-(5-carboxythiazol-2-oxy)-propane;
1,2-epoxy-3-(4-carboxythiazol-2-oxy)-propane;
1,2-epoxy-3-(5-methoxycarbonylthiazol-2-oxy)-propane;
1,2-epoxy-3-(4-methoxycarbonylthiazol-2-oxy)-propane;
1,2-epoxy-3-(5-ethoxycarbonylthiazol-2-oxy)-propane;
1,2-epoxy-3-(4-ethoxycarbonylthiazol-2-oxy)-propane;
1,2-epoxy-3-(5-propoxycarbonylthiazol-2-oxy)-propane;
1,2-epoxy-3-(5-cyclopentoxycarbonylthiazol-2-oxy)-propane;
1,2-epoxy-3-(4-cyclopentoxycarbonylthiazol-2-oxy)-propane;
1,2-epoxy-3-(5-phenoxycarbonylthiazol-2-oxy)-propane;
1,2-epoxy-3-(4-phenoxycarbonylthiazol-2-oxy)-propane;
1,2-epoxy-3-(5-benzyloxycarbonylthiazol-2-oxy)-propane;
1,2-epoxy-3-(4-benzyloxycarbonylthiazol-2-oxy)-propane;
1,2-epoxy-3-(5-formylthiazol-2-oxy)-propane;
1,2-epoxy-3-(4-formylthiazol-2-oxy)-propane;
1,2-epoxy-3-(5-acetylthiazol-2-oxy)-propane;
1,2-epoxy-3-(4-acetylthiazol-2-oxy)-propane;
1,2-epoxy-3-(5-propionylthiazol-2-oxy)-propane;
1,2-epoxy-3-(4-propionylthiazol-2-oxy)-propane;
1,2-epoxy-3-(5-t-butyrylthiazol-2-oxy)-propane;
1,2-epoxy-3-(4-t-butyrylthiazol-2-oxy)-propane;
1,2-epoxy-3-(5-cyanothiazol-2-oxy)-propane;
1,2-epoxy-3-(4-cyanothiazol-2-oxy)-propane;
1,2-epoxy-3-(5-butoxycarbonylaminothiazol-2-oxy)-propane;
1,2-epoxy-3-(5-[N'-methylureido]-thiazol-2-oxy)-propane;
1,2-epoxy-3-(4-[N'-methylureido]-thiazol-2-oxy)-propane;
1,2-epoxy-3-(5-[N'-ethylureido]-thiazol-2-oxy)-propane;
1,2-epoxy-3-(4-[N'-ethylureido]-thiazol-2-oxy)-propane;
1,2-epoxy-3-(5-[N'-isopropylureido]-thiazol-2-oxy)-propane;

1,2-epoxy-3-(4-[N'-isopropylureido]-thiazol-2-oxy)-propane;
1,2-epoxy-3-(5-[N'-t-butylureido]-thiazol-2-oxy)-propane;
1,2-epoxy-3-(4-[N'-t-butylureido]-thiazol-2-oxy)-propane;
1,2-epoxy-3-(5-ethylaminothiazol-2-oxy)-propane;
1,2-epoxy-3-(4-ethylaminothiazol-2-oxy)-propane;
1,2-epoxy-3-(5-methylaminothiazol-2-oxy)-propane;
1,2-epoxy-3-(4-methylaminothiazol-2-oxy)-propane;
1,2-epoxy-3-(5-propylaminothiazol-2-oxy)-propane;
1,2-epoxy-3-(4-propylaminothiazol-2-oxy)-propane;
1,2-epoxy-3-(5-[N-methylformamido]-thiazol-2-oxy)-propane;
1,2-epoxy-3-(4-[N-methylformamido]-thiazol-2-oxy)-propane;
1,2-epoxy-3-(5-[N-ethylformamido]-thiazol-2-oxy)-propane;
1,2-epoxy-3-(4-[N-ethylformamido]-thiazolo-2-oxy)-propane;
1,2-epoxy-3-(5-[N-isopropylformamido]-thiazol-2-oxy)-propane;
1,2-epoxy-3-(4-[N-isopropylformamido]-thiazol-2-oxy)-propane;
1,2-epoxy-3-(5-[N-t-butylformamido]-thiazol-2-oxy)-propane;
1,2-epoxy-3-(4-[N-t-butylformamido]-thiazol-2-oxy)-propane;
1,2-epoxy-3-(5-hydroxymethylthiazol-2-oxy)-propane;
1,2-epoxy-3-(4-hydroxymethylthiazol-2-oxy)-propane;
1,2-epoxy-3-(4-thiomethylthiazol-2-oxy)-propane;
1,2-epoxy-3-(4-thioethylthiazol-2-oxy)-propane;
1,2-epoxy-3-(5-thiomethylthiazol-2-oxy)-propane;
1,2-epoxy-3-(5-thioisopropylthiazol-2-oxy)-propane;
1,2-epoxy-3-(4-thioisopropylthiazol-2-oxy)-propane;
1,2-epoxy-3-(5-thio-t-butylthiazol-2-oxy)-propane;
1,2-epoxy-3-(4-thio-t-butylthiazol-2-oxy)-propane;
1,2-epoxy-3-(5-thiophenylthiazol-2-oxy)-propane;
1,2-epoxy-3-(4-thiophenylthiazol-2-oxy)-propane;
1,2-epoxy-3-(5-thiobenzylthiazol-2-oxy)-propane;
1,2-epoxy-3-(4-thiobenzylthiazol-2-oxy)-propane;
1,2-epoxy-3-(5-ethylsulfonylthiazol-2-oxy)-propane;
1,2-epoxy-3-(4-ethylsulfonylthiazol-2-oxyl-propane;
1,2-epoxy-3-(5-methylsulfonylthiazol-2-oxy)-propane;
1,2-epoxy-3-(4-methylsulfonylthiazol-2-oxy)-propane;
1,2-epoxy-3-(5-isopropylsulfonylthiazol-2-oxy)-propane;
1,2-epoxy-3-(4-isopropylsulfonylthiazol-2-oxy)-propane;
1,2-epoxy-3-(5-phenylsulfonylthiazol-2-oxy)-propane;
1,2-epoxy-3-(4-phenylsulfonylthiazol-2-oxy)-propane;
1,2-epoxy-3-(5-benzylsulfonylthiazol-2-oxy)-propane;
1,2-epoxy-3-(4-benzylsulfonylthiazol-2-oxy)-propane;
1,2-epoxy-3-(5-thioethylthiazol-2-oxy)-propane;
1,2-epoxy-3-(4-ethylsulfinylthiazol-2-oxy)-propane;
1,2-epoxy-3-(5-methylsulfinylthiazol-2-oxy)-propane;
1,2-epoxy-3-(4-methylsulfinylthiazol-2-oxy)-propane;
1,2-epoxy-3-(5-isopropylsulfinylthiazol-2-oxy)-propane;
1,2-epoxy-3-(4-isopropylsulfinylthiazol-2-oxy)-propane;
1,2-epoxy-3-(5-phenylsulfinylthiazol-2-oxy)-propane;
1,2-epoxy-3-(4-phenylsulfinylthiazol-2-oxy)-propane;
1,2-epoxy-3-(5-benzylsulfinylthiazol-2-oxy)-propane;
1,2-epoxy-3-(4-benzylsulfinylthiazol-2-oxy)-propane;
1,2-epoxy-3-(5-sulfamoylthiazol-2-oxy)-propane;
1,2-epoxy-3-(4-sulfamoylthiazol-2-oxy)-propane;
1,2-epoxy-3-(5-[N-ethylsulfamoyl]-thiazol-2-oxy)-propane;
1,2-epoxy-3-(4-[N-ethylsulfamoyl]-thiazol-2-oxy)-propane;
1,2-epoxy-3-(5-[N-methylsulfamoyl]-thiazol-2-oxy)-propane;
1,2-epoxy-3-(4-[N-methylsulfamoyl]-thiazol-2-oxy)-propane;
1,2-epoxy-3-(5-[N,N-dimethylsulfamoyl]-thiazol-2-oxy)-propane;
1,2-epoxy-3-(4-[N,N-dimethylsulfamoyl]-thiazol-2-oxy)-propane;
1,2-epoxy-3-(5-[N-isopropylsulfamoyl]-thiazol-2-oxy)-propane; and
1,2-epoxy-3-(4-[N-isopropylsulfamoyl]-thiazol-2-oxy)-propane.

EXAMPLE 4

This example illustrates methods according to the invention of converting the compounds of formula II, of the invention, into the compounds of formula I of the invention. In this example, 300 mg. of 1,2-epoxy-3-(thiazol-2-oxy)-propane is dissolved in 5 ml. of ethanol saturated with ammonia and left at room temperature for 20 hours. The reaction mixture is then evaporated to remove all residual solvent, and the residue is purified by thin-layer chromatography on preparative silica plate using a developing system of 1 percent triethylamine, 1.5 percent methanol and the remainder ethyl acetate to yield 1-amino-3-(thiazol-2-oxy)-propanol.

Similarly, by following the above procedure but respectively using the compounds enumerated in Column E as starting materials, and in the case of the $R^3$-alkoxycarbonyl and $R^3$-alkoxycarbonylamino compounds conducting the treatment for 6 hours instead of 20 hours, the corresponding compounds enumerated herein below in Column F are respectively prepared:

Column F 1-amino-3-(4-methylthiazol-2-oxy)-2-propanol;
1-amino-3-(5-methylthiazol-2-oxy)-2-propanol;
1-amino-3-(4-isopropylthiazol-2-oxy)-2-propanol;
1-amino-3-(5-isopropylthiazol-2-oxy)-2-propanol;
1-amino-3-(4-t-butylthiazol-2-oxy)-2-propanol;
1-amino-3-(5-t-butylthiazol-2-oxy)-2-propanol;
1-amino-3-(4-cyclopropylthiazol-2-oxy)-2-propanol;
1-amino-3-(5-cyclopropylthiazol-2-oxy)-2-propanol;
1-amino-3-(4-cyclopentylthiazol-2-oxy)-2-propanol;
1-amino-3-(5-cyclopentylthiazol-2-oxy)-2-propanol;
1-amino-3-(4-phenylthiazol-2-oxy)-2-propanol;
1-amino-3-(5-phenylthiazol-2-oxy)-2-propanol;
1-amino-3-(4-tolylthiazol-2-oxy)-2-propanol;
1-amino-3-(5-tolylthiazol-2-oxy)-2-propanol;
1-amino-3-(4-cyanothiazol-2-oxy)-2-propanol;
1-amino-3-(5-cyanothiazol-2-oxy)-2-propanol;
1-amino-3-(4-fluorothiazol-2-oxy)-2-propanol;
1-amino-3-(5-fluorothiazol-2-oxy)-2-propanol;
1-amino-3-(4-chlorothiazol-2-oxy)-2-propanol;
1-amino-3-(5-chlorothiazol-2-oxy)-2-propanol;
1-amino-3-(5-bromothiazol-2-oxy)-2-propanol;
1-amino-3-(5-iodothiazol-2-oxy)-2-propanol;
1-amino-3-(4-iodothiazol-2-oxy)-2-propanol;
1-amino-3-(4-trifluoromethylthiazol-2-oxy)-2-propanol;
1-amino-3-(4-acetamidothiazol-2-oxy)-2-propanol;
1-amino-3-(5-acetamidothiazol-2-oxy)-2-propanol;
1-amino-3-(4-ethylamidothiazol-2-oxy)-2-propanol;
1-amino-3-(5-ethylamidothiazol-2-oxy)-2-propanol;
1-amino-3-(4-phenylamidothiazol-2-oxy)-2-propanol;
1-amino-3-(5-phenylamidothiazol-2-oxy)-2-propanol;
1-amino-3-(4-formylamidothiazol-2-oxy)-2-propanol;
1-amino-3-(5-formylamidothiazol-2-oxy)-2-propanol;
1-amino-3-(4-nitrothiazol-2-oxy)-2-propanol;
1-amino-3-(5-nitrothiazol-2-oxy)-2-propanol;
1-amino-3-(4-p-chlorophenylthiazol-2-oxy)-2-propanol;
1-amino-3-(5-p-chlorophenylthiazol-2-oxy)-2-propanol;
1-amino-3-(4-p-hydroxyphenylthiazol-2-oxy)-2-propanol;
1-amino-3-(5-p-hydroxyphenylthiazol-2-oxy)-2-propanol;
1-amino-3-(4-p-methoxyphenylthiazol-2-oxy)-2-propanol;
1-amino-3-(5-p-methoxyphenylthiazol-2-oxy)-2-propanol;
1-amino-3-(4-p-acetoxyphenylthiazol-2-oxy)-2-propanol;
1-amino-3-(5-p-acetoxyphenylthiazol-2-oxy)-2-propanol;
1-amino-3-(4-ureidothiazol-2-oxy)-2-propanol;
1-amino-3-(5-ureidothiazol-2-oxy)-2-propanol;
1-amino-3-(5-methoxycarbonylaminothiazol-2-oxy)-propanol;

1-amino-3-(4-methoxycarbonylaminothiazol-2-oxy)-2-propanol;
1-amino-3-(5-isopropoxycarbonylaminothiazol-2-oxy)-2-propanol;
1-amino-3-(4-isopropoxycarbonylaminothiazol-2-oxy)-2-propanol;
1-amino-3-(5-phenoxycarbonylaminothiazol-2-oxy)-2-propanol;
1-amino-3-(4-phenoxycarbonylaminothiazol-2-oxy)-2-propanol;
1-amino-3-(5-benzyloxycarbonylaminothiazol-2-oxy)-2-propanol;
1-amino-3-(4-benzyloxycarbonylaminothiazol-2-oxy)-2-propanol;
1-amino-3-(4-bromothiazol-2-oxy)-2-propanol;
1-amino-3-(5-butylsulfonylthiazol-2-oxy)-2-propanol;
1-amino-3-(4-butylsulfonylthiazol-2-oxy)-2-propanol;
1-amino-3-(5-butylsulfinylthiazol-2-oxy)-2-propanol;
1-amino-3-(4-butylsulfinylthiazol-2-oxy)-2-propanol;
1-amino-3-(5-trifluoromethylthiazol-2-oxy)-2-propanol;
1-amino-3-(5-carboxythiazol-2-oxy)-2-propanol;
1-amino-3-(4-carboxythiazol-2-oxy)-2-propanol;
1-amino-3-(5-methoxycarbonylthiazol-2-oxy)-2-propanol;
1-amino-3-(4-methoxycarbonylthiazol-2-oxy)-2-propanol;
1-amino-3-(5-ethoxycarbonylthiazol-2-oxy)-2-propanol;
1-amino-3-(4-ethoxycarbonylthiazol-2-oxy)-2-propanol;
1-amino-3-(5-propoxycarbonylthiazol-2-oxy)-2-propanol;
1-amino-3-(5-cyclopentoxycarbonylthiazol-2-oxy)-2-propanol;
1-amino-3-(4-cyclopentoxycarbonylthiazol-2-oxy)-2-propanol;
1-amino-3-(5-phenoxycarbonylthiazol-2-oxy)-2-propanol;
1-amino-3-(4-phenoxycarbonylthiazol-2-oxy)-2-propanol;
1-amino-3-(5-benzyloxycarbonylthiazol-2-oxy)-2-propanol;
1-amino-3-(4-benzyloxycarbonylthiazol-2-oxy)-2-propanol;
1-amino-3-(5-formylthiazol-2-oxy)-2-propanol;
1-amino-3-(4-formylthiazol-2-oxy)-2-propanol;
1-amino-3-(5-acetylthiazol-2-oxy)-2-propanol;
1-amino-3-(4-acetylthiazol-2-oxy)-2-propanol;
1-amino-3-(5-propionylthiazol-2-oxy)-2-propanol;
1-amino-3-(4-propionylthiazol-2-oxy)-2-propanol;
1-amino-3-(5-t-butyrylthiazol-2-oxy)-2-propanol;
1-amino-3-(4-t-butyrylthiazol-2-oxy)-2-propanol;
1-amino-3-(5-cyanothiazol-2-oxy)-2-propanol;
1-amino-3-(4-cyanothiazol-2-oxy)-2-propanol;
1-amino-3-(5-butoxycarbonylaminothiazol-2-oxy)-2-propanol;
1-amino-3-(5-[N'-methylureido]-thiazol-2-oxy)-2-propanol;
1-amino-3-(4-[N'-methylureido]-thiazol-2-oxy)-2-propanol;
1-amino-3-(5-[N'-ethylureido]-thiazol-2-oxy)-2-propanol;
1-amino-3-(4-[N'-ethylureido]-thiazol-2-oxy)-2-propanol;
1-amino-3-(5-[N'-isopropylureido]-thiazol-2-oxy)-2-propanol;
1-amino-3-(4-[N'-isopropylureido]-thiazol-2-oxy)-2-propanol;
1-amino-3-(5-[N-t-butylureido]-thiazol-2-oxy)-2-propanol;
1-amino-3-(4-[N'-t-butylureido]-thiazol-2-oxy)-2-propanol;
1-amino-3-(5-ethylaminothiazol-2-oxy)-2-propanol;
1-amino-3-(4-ethylaminothiazol-2-oxy)-2-propanol;
1-amino-3-(5-methylaminothiazol-2-oxy)-2-propanol;
1-amino-3-(4-methylaminothiazol-2-oxy)-2-propanol;
1-amino-3-(5-propylaminothiazol-2-oxy)-2-propanol;
1-amino-3-(4-propylaminothiazol-2-oxy)-2-propanol;
1-amino-3-(5-[N-methylformamido]-thiazol-2-oxy)-2-propanol;
1-amino-3-(4-[N-methylformamido]-thiazol-2-oxy)-2-propanol;
1-amino-3-(5-[N-ethylformamido]-thiazol-2-oxy)-2-propanol;
1-amino-3-(4-[N-ethylformamido]-thiazol-2-oxy)-2-propanol;
1-amino-3-(5-[N-isopropylformamido]-thiazol-2-oxy)-2-propanol;
1-amino-3-(4-[N-isopropylformamido)-thiazol-2-oxy)-2-propanol;
1-amino-3-(5-[N-t-butylformamido]-thiazol-2-oxy)-2-propanol;
1-amino-3-(4-[N-t-butylformamido]-thiazol-2-oxy)-2-propanol;
1-amino-3-(5-hydroxymethylthiazol-2-oxy)-2-propanol;
1-amino-3-(4-hydroxymethylthiazol-2-oxy)-2-propanol;
1-amino-3-(5-thioethylthiazol-2-oxy)-2-propanol;
1-amino-3-(4-thioethylthiazol-2-oxy)-2-propanol;
1-amino-3-(5-thiomethylthiazol-2-oxy)-2-propanol;
1-amino-3-(4-thiomethylthiazol-2-oxy)-2-propanol;
1-amino-3-(5-thioisopropylthiazol-2-oxy)-2-propanol;
1-amino-3-(4-thioisopropylthiazol-2-oxy)-2-propanol;
1-amino-3-(5-thio-t-butylthiazol-2-oxy)-2-propanol;
1-amino-3-(4-thio-t-butylthiazol-2-oxy)-2-propanol;
1-amino-3-(5-thiophenylthiazol-2-oxy)-2-propanol;
1-amino-3-(4-thiophenylthiazol-2-oxy)-2-propanol;
1-amino-3-(5-thiobenzylthiazol-2-oxy)-2-propanol;
1-amino-3-(4-thiobenzylthiazol-2-oxy)-2-propanol;
1-amino-3-(5-ethylsulfonylthiazol-2-oxy)-2-propanol;
1-amino-3-(4-ethylsulfonylthiazol-2-oxy)-2-propanol;
1-amino-3-(5-methylsulfonylthiazol-2-oxy)-2-propanol;
1-amino-3-(4-methylsulfonylthiazol-2-oxy)-2-propanol;
1-amino-3-(5-isopropylsulfonylthiazol-2-oxy)-2-propanol;
1-amino-3-(4-isopropylsulfonylthiazol-2-oxy)-2-propanol
1-amino-3-(5-phenylsulfonylthiazol-2-oxy)-2-propanol;
1-amino-3-(4-phenylsulfonylthiazol-2-oxy)-2-propanol;
1-amino-3-(5-benzylsulfonylthiazol-2-oxy)-2-propanol;
1-amino-3-(4-benzylsulfonylthiazol-2-oxy)-2-propanol;
1-amino-3-(5-ethylsulfinylthiazol-2-oxy)-2-propanol;
1-amino-3-(4-ethylsulfinylthiazol-2-oxy)-2-propanol;
1-amino-3-(5-methylsulfinylthiazol-2-oxy)-2-propanol;
1-amino-3-(4-methylsulfinylthiazol-2-oxy)-2-propanol;
1-amino-3-(5-isopropylsulfinylthiazol-2-oxy)-2-propanol;
1-amino-3-(4-isopropylsulfinylthiazol-2-oxy)-2-propanol;
1-amino-3-(5-phenylsulfinylthiazol-2-oxy)-2-propanol;
1-amino-3-(4-phenylsulfinylthiazol-2-oxy)-2-propanol;
1-amino-3-(5-benzylsulfinylthiazol-2-oxy)-2-propanol;
1-amino-3-(4-benzylsulfinylthiazol-2-oxy)-2-propanol;
1-amino-3-(5-sulfamoylthiazol-2-oxy)-2-propanol;
1-amino-3-(4-sulfamoylthiazol-2-oxy)-2-propanol;
1-amino-3-(5-[N-ethylsulfamoyl]-thiazol-2-oxy)-2-propanol;
1-amino-3-(4-[N-ethylsulfamoyl]-thiazol-2-oxy)-2-propanol;
1-amino-3-(5-[N-methylsulfamoyl]-thiazol-2-oxy)-2-propanol;
1-amino-3-(4-[N-methylsulfamoyl]-thiazol-2-oxy)-2-propanol;
1-amino-3-(5-[N,N-dimethylsulfamoyl]-thiazol-2-oxy)-2-propanol;
1-amino-3-(4-[N,N-dimethylsulfamoyl]-thiazol-2-oxy)-2-propanol;
1-amino-3-(5-[N-isopropylsulfamoyl]-thiazol-2-oxy)-2-propanol; and
1-amino-3-(4-[N-isopropylsulfamoyl]-thiazol-2-oxy)-2-propanol.

Similarly by following the same procedure but replacing ammonia with methylamine, dimethylamine and ethylamine, respectively, the corresponding 1-methylamino; 1-dimethylamino; and 1-ethylamino derivatives of each of the above enumerated compounds are respectively prepared.

EXAMPLE 5

This example illustrates further methods according to the invention of preparing the compounds of formula I of the invention. In this example 0.6 g. of isopropyl amine is added to a solution of 0.3 g. of 1,2-epoxy-3-(thiazol-2-oxy)-propane in 20 ml. of anhydrous absolute ethanol at 20° C. The resulting mixture is monitored by thin-layer chromatographic analysis and allowed to stand until conversion of 1,2-epoxy-3-(thiazol-2-oxy)-propane is essentially complete. The mixture is then evaporated to dryness yielding a crude residue of 1-isopropylamino-3-(thiazol-2-oxy)-2-propanol which is then further purified by thin-layer chromatography.

Similarly by following the above procedure but respectively using the compounds enumerated in Column E as starting materials, the corresponding compounds enumerated herein below in Column G are respectively prepared:

Column G 1-isopropylamino-3-(4-methylthiazol-2-oxy)-2-propanol;
1-isopropylamino-3-(5-methylthiazol-2-oxy)-2-propanol;
1-isopropylamino-3-(4-isopropylthiazol-2-oxy)-2-propanol;
1-isopropylamino-3-(5-isopropylthiazol-2-oxy)-2-propanol;
1-isopropylamino-3-(4-t-butylthiazol-2-oxy)-2-propanol;
1-isopropylamino-3-(5-t-butylthiazol-2-oxy)-2-propanol;
1-isopropylamino-3-(4-cyclopropylthiazol-2-oxy)-2-propanol;
1-isopropylamino-3-(5-cyclopropylthiazol-2-oxy)-2-propanol;
1-isopropylamino-3-(4-cyclopentylthiazol-2-oxy)-2-propanol;
1-isopropylamino-3-(5-cyclopentylthiazol-2-oxy)-2-propanol;
1-isopropylamino-3-(4-phenylthiazol-2-oxy)-2-propanol;
1-isopropylamino-3-(5-phenylthiazol-2-oxy)-2-propanol;
1-isopropylamino-3-(4-tolylthiazol-2-oxy)-2-propanol;
1-isopropylamino-3-(5-tolylthiazol-2-oxy)-2-propanol;
1-isopropylamino-3-(4-tolylthiazol-2-oxy)-2-propanol;
1-isopropylamino-3-(5-tolylthiazol-2-oxy)-2-propanol;
1-isopropylamino-3-(4-cyanothiazol-2-oxy)-2-propanol;
1-isopropylamino-3-(5-cyanothiazol-2-oxy)-2-propanol;
1-isopropylamino-3-(4-fluorothiazol-2-oxy)-2-propanol;
1-isopropylamino-3-(5-fluorothiazol-2-oxy)-2-propanol;
1-isopropylamino-3-(4-chlorothiazol-2-oxy)-2-propanol;
1-isopropylamino-3-(5-chlorothiazol-2-oxy)-2-propanol;
1-isopropylamino-3-(5-bromothiazol-2-oxy)-2-propanol;
1-isopropylamino-3-(5-iodothiazol-2-oxy)-2-propanol;
1-isopropylamino-3-(4-iodothiazol-2-oxy)-2-propanol;
1-isopropylamino-3-(4-trifluoromethylthiazol-2-oxy)-2-propanol;
1-isopropylamino-3-(4-acetamidothiazol-2-oxy)-2-propanol;
1-isopropylamino-3-(5-acetamidothiazol-2-oxy)-2-propanol;
1-isopropylamino-3-(4-ethylamidothiazol-2-oxy)-2-propanol;
1-isopropylamino-3-(5-ethylamidothiazol-2-oxy)-2-propanol;
1-isopropylamino-3-(4-bromothiazol-2-oxy)-2-propanol;
1-isopropylamino-3-(4-phenylamidothiazol-2-oxy)-2-propanol;
1-isopropylamino-3-(5-phenylamidothiazol-2-oxy)-2-propanol;
1-isopropylamino-3-(4-formylamidothiazol-2-oxy)-2-propanol;
1-isopropylamino-3-(5-formylamidothiazol-2-oxy)-2-propanol;
1-isopropylamino-3-(4-nitrothiazol-2-oxy)-2-propanol;
1-isopropylamino-3-(5-nitrothiazol-2-oxy)-2-propanol;
1-isopropylamino-3-(4-p-chlorophenylthiazol-2-oxy)-2-propanol;
1-isopropylamino-3-(5-p-chlorophenylthiazol-2-oxy)-2-propanol;
1-isopropylamino-3-(4-p-hydroxyphenylthiazol-2-oxy)-2-propanol;
1-isopropylamino-3-(5-p-hydroxyphenylthiazol-2-oxy)-2-propanol;
1-isopropylamino-3-(4-p-methoxyphenylthiazol-2-oxy)-2-propanol;
1-isopropylamino-3-(5-p-methoxyphenylthiazol-2-oxy)-2-propanol;
1-isopropylamino-3-(4-p-acetoxyphenylthiazol-2-oxy)-2-propanol;
1-isopropylamino-3-(5-p-acetoxyphenylthiazol-2-oxy)-2-propanol;
1-isopropylamino-3-(4-ureidothiazol-2-oxy)-2-propanol;
1-isopropylamino-3-(5-ureidothiazol-2-oxy)-2-propanol;
1-isopropylamino-3-(5-methoxycarbonylaminothiazol-2-oxy)-2-propanol;
1-isopropylamino-3-(4-methoxycarbonylaminothiazol-2-oxy)-2-propanol;
1-isopropylamino-3-(5-isopropoxycarbonylaminothiazol-2-oxy)-2-propanol;
1-isopropylamino-3-(4-isopropoxycarbonylaminothiazol-2-oxy)-2-propanol;
1-isopropylamino-3-(5-phenoxycarbonylaminothiazol-2-oxy)-2-propanol;
1-isopropylamino-3-(4-phenoxycarbonylaminothiazol-2-oxy)-2-propanol;
1-isopropylamino-3-(5-benzyloxycarbonylaminothiazol-2-oxy)-2-propanol;
1-isopropylamino-3-(4-benzyloxycarbonylaminothiazol-2-oxy)-2-propanol;
1-isopropylamino-3-(5-butylsulfonylthiazol-2-oxy)-2-propanol;
1-isopropylamino-3-(4-butylsulfonylthiazol-2-oxy)-2-propanol;
1-isopropylamino-3-(5-butylsulfinylthiazol-2-oxy)-2-propanol;
1-isopropylamino-3-(4-butylsulfinylthiabol-2-oxy)-2-propanol;
1-isopropylamino-3-(5-trifluoromethylthiazol-2-oxy)-2-propanol;
1-isopropylamino-3-(5-carboxythiazol-2-oxy)-2-propanol;
1-isopropylamino-3-(4-carboxythiazol-2-oxy)-2-propanol;
1-isopropylamino-3-(5-methoxycarbonylthiazol-2-oxy)-2-propanol;
1-isopropylamino-3-(4-methoxycarbonylthiazol-2-oxy)-2-propanol;
1-isopropylamino-3-(5-ethoxycarbonylthiazol-2-oxy)-2-propanol;
1-isopropylamino-3-(4-ethoxycarbonylthiazol-2-oxy)-2-propanol;
1-isopropylamino-3-(5-propoxycarbonylthiazol-2-oxy)-2-propanol;
1-isopropylamino-3-(5-cyclopentoxycarbonylthiazol-2-oxy)-2-propanol;
1-isopropylamino-3-(4-cyclopentoxycarbonylthiazol-2-oxy)-2-propanol;
1-isopropylamino-3-(5-phenoxycarbonylthiazol-2-oxy)-2-propanol;
1-isopropylamino-3-(4-phenoxycarbonylthiazol-2-oxy)-2-propanol;
1-isopropylamino-3-(5-benzyloxycarbonylthiazol-2-oxy)-2-propanol;
1-isopropylamino-3-(4-benzyloxycarbonylthiazol-2-oxy)-2-propanol;
1-isopropylamino-3-(5-formylthiazol-2-oxy)-2-propanol;
1-isopropylamino-3-(4-formylthiazol-2-oxy)-2-propanol;
1-isopropylamino-3-(5-acetylthiazol-2-oxy)-2-porpanol;
1-isopropylamino-3-(4-acetylthiazol-2-oxy)-2-propanol;
1-isopropylamino-3-(5-propionylthiazol-2-oxy)-2-propanol;
1-isopropylamino-3-(4-propionylthiazol-2-oxy)-2-propanol;
1-isopropylamino-3-(5-t-butyrylthiazol-2-oxy)-2-propanol;

1-isopropylamino-3-(4-t-butyrylthiazol-2-oxy)-2-propanol;
1-isopropylamino-3-(5-cyanothiazol-2-oxy)-2-propanol;
1-isopropylamino-3-(4-cyanothiazol-2-oxy)-2-propanol;
1-isopropylamino-3-(5-butoxycarbonylaminothiazol-2-oxy)-2-propanol;
1-isopropylamino-3-(5-[N'-methylureido]-thiazol-2-oxy)-2-propanol;
1-isopropylamino-3-(4-[N'-methylureido]-thiazol-2-oxy)-2-propanol;
1-isopropylamino-3-(5-[N'-ethylureido]-thiazol-2-oxy)-2-propanol;
1-isopropylamino-3-(4-[N'-ethylureido] - thiazol-2-oxy)-2-propanol;
1-isopropylamino-3-(5-[N'-isopropylureido] - thiazol - 2-oxy)-2-propanol;
1-isopropylamino-3-(4-[N'-isopropylureido] - thiazol - 2-oxy)-2-propanol;
1-isopropylamino - 3 - (5-[N'-t-butylureido] - thiazol-2-oxy)-2-propanol;
1-isopropylamino-3-(4 - [N'-t-butylureido] - thiazol - 2-oxy)-2-propanol;
1-isopropylamino - 3 - (5 - ethylaminothiazol-2-oxy)-2-propanol;
1-isopropylamino - 3 - (4 - ethylaminothiazol-2-oxy)-2-propanol;
1-isopropylamino - 3 - (5 - methylaminothiazol-2-oxy)-2-propanol;
1-isopropylamino - 3 - (4 - methylaminothiazol-2-oxy)-2-propanol;
1-isopropylamino - 3 - (5 - propylaminothiazol-2-oxy)-2-propanol;
1-isopropylamino - 3 - (4 - propylaminothiazol-2-oxy)-2-propanol;
1-isopropylamino - 3 - (5 - [N-methylformamido]-thiazol-2-oxy)-2-propanol;
1-isopropylamino - 3 - (4-[N-methylformamido]-thiazol-2-oxy)-2-propanol;
1-isopropylamino - 3 - (5 - [N-ethylformamido]-thiazol-2-oxy)-2-propanol;
1-isopropylamino - 3 - (4 - [N-ethylformamido]-thiazol-2-oxy)-2-propanol;
1 - isopropylamino-3-(5-[N-isopropylformamido]-thiazol-2-oxy)-2-propanol;
1-isopropylamino - 3 - (4-[N-isopropylformamido]-thiazol-2-oxy)-2-propanol;
1-isopropylamino - 3 - (5 - [N-t-butylformamido]-thiazol-2-oxy)-2-propanol;
1-isopropylamino - 3 - (4-[N-t-butylformamido]-thiazol-2-oxy)-2-propanol;
1-isopropylamino - 3 - (5-hydroxymethylthiazol-2-oxy)-2-propanol;
1-isopropylamino - 3 - (4 - hydroxymethylthiazol-2-oxy)-2-propanol;
1-isopropylamino - 3 - (5 - thioethylthiazol-2-oxy)-2-propanol;
1-isopropylamino - 3 - (4 - thioethylthiazol - 2 - oxy)-2-propanol;
1-isopropylamino - 3 - (5 - thiomethylthiazol -2-oxy)-2-propanol;
1-isopropylamino - 3 - (4 - thiomethylthiazol-2-oxy)-2-propanol;
1-isopropylamino - 3 - (5 - thioisopropylthiazol-2-oxy)-2-propanol;
1-isopropylamino - 3 - (4-thioisopropylthiazol-2-oxy)-2-propanol;
1-isopropylamino - 3 - (5 - thio-t-butylthiazol-2-oxy)-2-propanol;
1-isopropylamino - 3 - (4 - thio-t-butylthiazol-2-oxy)-2-propanol;
1-isopropylamino - 3 - (5 - thiophenylthiazol-2-oxy)-2-propanol;
1-isopropylamino - 3 - (4 - thiophenylthiazol-2-oxy)-2-propanol;
1-isopropylamino - 3 - (5 - thiobenzylthiazol-2-oxy)-2-propanol;
1-isopropylamino - 3 - (4 - thiobenzylthiazol-2-oxy)-2-propanol;
1-isopropylamino - 3 - (5 - ethylsulfonylthiazol-2-oxy)-2-propanol;
1-isopropylamino - 3 - (4 - ethylsulfonylthiazol-2-oxy)-2-propanol;
1-isopropylamino - 3 - (5 - methylsulfonylthiazol-2-oxy)-2-propanol;
1-isopropylamino - 3 - (4 - methylsulfonylthiazol-2-oxy)-2-propanol;
1-isopropylamino - 3 - (5 - isopropylsulfonylthiazol-2-oxy)-2-propanol;
1-isopropylamino - 3 - (4 - isopropylsulfonylthiazol-2-oxy)-2-propanol;
1-isopropylamino - 3 - (5 - phenylsulfonylthiazol - 2-oxy)-2-propanol;
1-isopropylamino - 3 - (4 - phenylsulfonylthiazol-2-oxy)-2-propanol;
1-isopropylamino - 3 - (5 - benzylsulfonylthiazol-2-oxy)-2-propanol;
1-isopropylamino - 3 - (4 - benzylsulfonylthiazol-2-oxy)-2-propanol;
1-isopropylamino - 3 - (5 - ethylsulfinylthiazol-2-oxy)-2-propanol;
1-isopropylamino - 3 - (4 - ethylsulfinylthiazol-2-oxy)-2-propanol;
1-isopropylamino - 3 - (5 - methylsulfinylthiazol-2-oxy)-2-propanol;
1-isopropylamino - 3 - (4 - methylsulfinylthiazol-2-oxy)-2-propanol;
1-isopropylamino - 3 - (5 - isopropylsulfinylthiazol-2-oxy)-2-propanol;
1-isopropylamino - 3 - (4 - isopropylsulfinylthiazol-2-oxy)-2-propanol;
1-isopropylamino - 3 - (5 - phenylsulfinylthiazol-2-oxy)-2-propanol;
1-isopropylamino - 3 - (4 - phenylsulfinylthiazol-2-oxy)-2-propanol;
1-isopropylamino - 3 - (5 - benzylsulfinylthiazol-2-oxy)-2-propanol;
1-isopropylamino - 3 - (4 - benzylsulfinylthiazol-2-oxy)-2-propanol;
1-isopropylamino - 3 - (5 - sulfamoylthiazol-2-oxy)-2-propanol;
1-isopropylamino - 3 - (4 - sulfamoylthiazol-2-oxy)-2-propanol;
1-isopropylamino - 3 - (5 - [N-ethylsulfamoyl]-thiazol-2-oxy)-2-propanol;
1-isopropylamino-3-(4-[N-ethylsulfamoyl]-thiazol-2-oxy)-2-propanol;
1-isopropylamino-3-(5-[N-methylsulfamoyl]-thiazol-2-oxy)-2-propanol;
1-isopropylamino-3-(4-[N-methylsulfamoyl]-thiazol-2-oxy)-2-propanol;
1-isopropylamino-3-(5-[N,N-dimethylsulfamoyl]-thiazol-2-oxy-2-propanol;
1-isopropylamino-3-(4-[N,N-dimethylsulfamoyl]-thiazol-2-oxy)-2-propanol;
1-isopropylamino-3-(5-[N-isopropylsulfamoyl]-thiazol-2-oxy)-2-propanol; and
1-isopropylamino-3-(4-[N-isopropylsulfamoyl]-thiazol-2-oxy)-2-propanol.

The hydrochloride addition salts of each of the above enumerated compounds are prepared by respectively treating 1 g. of each compound with 1-equivalent of hydrogen chloride in 50 ml. of ethyl ether saturated with dry hydrogen chloride:gas as 20° C. for 1 hour.

Similarly by following the same procedure as above but using t-butylamine in place of isopropylamine, the corresponding 1-t-butylamine derivatives of each of the compounds enumerated above and their hydrochloride addition salts are respectively prepared.

EXAMPLE 6

This example illustrates further methods according to the invention of preparing the compounds of formula I of the invention. In this example 1 g. of morpholine is added to a solution of 0.3 g. of 1,2-epoxy-3-(thiazol-2-oxy)-propane in 20 ml. of anhydrous absolute ethanol at 20° C. The resulting mixture is monitored by thin-layer chromatographic analysis and allowed to stand until conversion of 1,2-epoxy-3-(thiazol-2-oxy)-propane is essentially complete. The mixture is then evaporated to dryness yielding a crude residue of 1-(N-morpholino-3-(thiazol-2-oxy)-2-propanol which is then further purified by thin-layer chromatography.

Similarly by following the above procedure but respectively using the compounds enumerated in Column E as starting material, the corresponding compounds enumerated herein below in Column H are respectively prepared.

Column H 1-(N-morpholino)-3-(4-methylthiazol-2-oxy)-2-propanol;
1-(N-morpholino)-3-(5-methylthiazol-2-oxy)-2-propanol;
1-(N-morpholino)-3-(4-isopropylthiazol-2-oxy)-2-propanol;
1-(N-(morpholino)-3-(5-isopropylthiazol-2-oxy)-2-propanol;
1-(N-morpholino)-3-(4-t-butylthiazol-2-oxy)-2-propanol;
1-(N-morpholino)-3-(5-t-butylthiazol-2-oxy)-2-propanol;
1-(N-morpholino)-3-(4-cyclopropylthiazol-2-oxy)-2-propanol;
1-(N-morpholino)-3-(5-cyclopropylthiazol-2-oxy)-2-propanol;
1-(N-morpholino)-3-(4-cyclopentylthiazol-2-oxy)-2-propanol;
1-(N-morpholino)-3-(5-cyclopentylthiazol)-2-oxy)-2-propanol;
1-(N-morpholino)-3-(4-phenylthiazol-2-oxy)-2-propanol;
1-(N-morpholino)-3-(5-phenylthiazol-2-oxy)-2-propanol;
1-(N-morpholino)-3-(4-tolylthiazol-2-oxy)-2-propanol;
1-(N-morpholino)-3-(5-tolylthiazol-2-oxy)-2-propanol;
1-(N-morpholino)-3-(4-cyanothiazol-2-oxy)-2-propanol;
1-(N-morpholino)-3-(5-cyanothiazol-2-oxy)-2-propanol;
1-(N-morpholino)-3-(4-fluorothiazol-2-oxy)-2-propanol;
1-(N-morpholino)-3-(5-fluorothiazol-2-oxy)-2-propanol;
1-(N-morpholino)-3-(4-chlorothiazol-2-oxy)-2-propanol;
1-(N-morpholino)-3-(5-chlorothiazol-2-oxy)-2-propanol;
1-(N-morpholino)-3-(5-bromothiazol-2-oxy)-2-propanol;
1-(N-morpholino)-3-(5-iodothiazol-2-oxy)-2-propanol;
1-(N-morpholino)-3-(4-iodothiazol-2-oxy)-2-propanol;
1-(N-morpholino)-3-(4-trifluoromethylthiazol-2-oxy)-2-propanol;
1-(N-morpholino)-3-(4-acetamidothiazol-2-oxy)-2-propanol;
1-(N-morpholino)-3-(5-acetamidothiazol-2-oxy)-2-propanol;
1-(N-morpholino)-3-(4-ethylamidothiazol-2-oxy)-2-propanol;
1-(N-morpholino)-3-(5-ethylamidothiazol-2-oxy)-2-propanol;
1-(N-morpholino)-3-(4-phenylamidothiazol-2-oxy)-2-propanol;
1-(N-morpholino)-3-(5-phenylamidothiazol-2-oxy)-2-propanol;
1-(N-morpholino)-3-(4-formylamidothiazol-2-oxy)-2-propanol;
1-(N-morpholino)-3-(5-formylamidothiazol-2-oxy)-2-propanol;
1-(N-morpholino)-3-(4-nitrothiazol-2-oxy)-2-propanol;
1-(N-morpholino)-3-(5-nitrothiazol-2-oxy)-2-propanol;
1-(N-morpholino)-3-(4-p-chlorophenylthiazol-2-oxy)-2-propanol;
1-(N-morpholino)-3-(5-p-chlorophenylthiazol-2-oxy)-2-propanol;
1-(N-morpholino)-3-(4-p-hydroxyphenylthiazol-2-oxy-2-propanol;
1-(N-morpholino)-3-(5-p-hydroxyphenylthiazol-2-oxy)-2-propanol;
1-(N-morpholino)-3-(4-p-methoxyphenylthiazol-2-oxy)-2-propanol;
1-(N-morpholino)-3-(5-p-methoxyphenylthiazol-2-oxy)-2-propanol;
1-(N-morpholino)-3-((4-p-acetoxyphenylthiazol-2-oxy)-2-propanol;
1-(N-morpholino)-3-(5-p-acetoxyphenylthiazol-2-oxy)-2-propanol;
1-(N-morpholino)-3-(4-ureidothiazol-2-oxy)-2-propanol;
1-(N-morpholino)-3-(5-ureidothiazol-2-oxy)-2-propanol;
1-(N-morpholino)-3-(5-methoxycarbonylaminothiazol-2-oxy)-2-propanol;
1-(N-morpholino)-3-(4-methoxycarbonylaminothiazol-2-oxy)-2-propanol;
1-(N-morpholino)-3-(5-isopropoxycarbonylaminothiazol-2-oxy)-2-propanol;
1-(N-morpholino)-3-(4-isopropoxycarbonylthiazol-2-oxy)-2-propanol;
1-(N-morpholino)-3-(5-phenoxycarbonylaminothiazol-2-oxy)-2-propanol;
1-(N-morpholino)-3-(4-phenoxycarbonylaminothiazol-2-oxy)-2-propanol;
1-(N-morpholino)-3-(5-benzyloxycarbonylaminothiazol-2-oxy)-2-propanol;
1-(N-morpholino)-3-(4-benzyloxycarbonylaminothiazol-2-oxy)-2-propanol;
1-(N-morpholino)-3-(5-butylsulfonylthiazol-2-oxy)-2-propanol;
1-(N-morpholino)-3-(4-butylsulfonylthiazol-2-oxy)-2-propanol;
1-(N-morpholino)-3-(5-butylsulfinylthiazol-2-oxy)-2-propanol;
1-(N-morpholino)-3-(4-butylsulfinylthiazol-2-oxy)-2-propanol;
1-(N-morpholino)-3-(5-trifluoromethylthiazol-2-oxy)-2-propanol;
1-(N-morpholino)-3-(5-carboxythiazol-2-oxy)-2-propanol;
1-(N-morpholino)-3-(4-carboxythiazol-2-oxy)-2-propanol;
1-(N-morpholino)-3-(5-methoxycarbonylthiazol-2-oxy)-2-propanol;
1-(N-morpholino)-3-(4-methoxycarbonylthiazol-2-oxy)-2-propanol;
1-(N-morpholino)-3-(5-ethoxycarbonylthiazol-2-oxy)-2-propanol;
1-(N-morpholino)-3-(4-ethoxycarbonylthiazol-2-oxy)-2-propanol;
1-(N-morpholino)-3-(5-propoxycarbonylthiazol-2-oxy)-2-propanol;
1-(N-morpholino)-3-(5-cyclopentoxycarbonylthiazol-2-oxy)-2-propanol;
1-(N-morpholino)-3-(4-cyclopentoxycarbonylthiazol-2-oxy)-2-propanol;
1-(N-morpholino)-3-(5-phenoxycarbonylthiazol-2-oxy)-2-propanol;
1-(N-morpholino)-3-(4-phenoxycarbonylthiazol-2-oxy)-2-propanol;
1-(N-morpholino)-3-(5-benzyloxycarbonylthiazol-2-oxy)-2-propanol;
1-(N-morpholino)-3-(4-benzyloxycarbonylthiazol-2-oxy)-2-propanol;
1-(N-morpholino)-3-(4-formylthiazol-2-oxy)-2-propanol;
1-(N-morpholino)-3-(5-formylthiazol-2-oxy)-2-propanol;
1-(N-morpholino)-3-(5-acetylthiazol-2-oxy)-2-propanol;
1-(N-morpholino)-3-(4-acetylthiazol-2-oxy)-2-propanol;
1-(N-morpholino)-3-(5-propionylthiazol-2-oxy)-2-propanol;
1-(N-morpholino)-3-(4-propionylthiazol-2-oxy)-2-propanol;

1-(N-morpholino)-3-(5-t-butyrylthiazol-2-oxy)-2-propanol;
1-(N-morpholino)-3-(4-t-butyrylthiazol-2-oxy)-2-propanol;
1-(N-morpholino)-3-(5-cyanothiazol-2-oxy)-2-propanol;
1-(N-morpholino)-3-(4-cyanothiazol-2-oxy)-2-propanol;
1-(N-morpholino)-3-(5-butoxycarbonylaminothiazol-2-oxy)-2-propanol;
1-(N-morpholino)-3-(5-[N'-methylureido]-thiazol-2-oxy)-2-propanol;
1-(N-morpholino)-3-(4-[N'-methylureido]-thiazol-2-oxy)-2-propanol;
1-(N-morpholino)-3-(5-[N'-ethylureido]-thiazol-2-oxy)-2-propanol;
1-(N-morpholino)-3-(4-[N'-ethylureido]-thiazol-2-oxy)-2-propanol;
1-(N-morpholino)-3-(5-[N'-isopropylureido]-thiazol-2-oxy)-2-propanol;
1-(N-morpholino)-3-(4-[N'-isopropylureido]-thiazol-2-oxy)-2-propanol;
1-(N-morpholino)-3-(5-[N'-t-butylureido]-thiazol-2-oxy)-2-propanol;
1-(N-morpholino)-3-(4-[N'-t-butylureido]-thiazol-2-oxy)-2-propanol;
1-(N-morpholino)-3-(5-ethylaminothiazol-2-oxy)-2-propanol;
1-(N-morpholino)-3-(4-ethylaminothiazol-2-oxy)-2-propanol;
1-(N-morpholino)-3-(5-methylaminothiazol-2-oxy)-2-propanol;
1-(N-morpholino)-3-(4-methylaminothiazol-2-oxy)-2-propanol;
1-(N-morpholino)-3-(5-propylaminothiazol-2-oxy)-2-propanol;
1-(N-morpholino)-3-(4-propylaminothiazol-2-oxy)-2-propanol;
1-(N-morpholino)-3-(5-[N-methylformamido]-thiazol-2-oxy)-2-propanol;
1-(N-morpholino)-3-(4-[N-methylformamido]-thiazol-2-oxy)-2-propanol;
1-(N-morpholino)-3-(5-[N-ethylformamido]-thiazol-2-oxy)-2-propanol;
1-(N-morpholino)-3-(4-[N-ethylformamido]-thiazol-2-oxy)-2-propanol;
1-(N-morpholino)-3-(5-[N-isopropylformamido]-thiazol-2-oxy)-2-propanol;
1-(N-morpholino)-3-(4-[N-isopropylformamido]-thiazol-2-oxy)-2-propanol;
1-(N-morpholino)-3-(5-[N-t-butylformamido]-thiazol-2-oxy)-2-propanol;
1-(N-morpholino)-3-(4-[N-t-butylformamido]-thiazol-2-oxy)-2-propanol;
1-(N-morpholino)-3-(5-hydroxymethylthiazol-2-oxy)-2-propanol;
1-(N-morpholino)-3-(4-hydroxymethylthiazol)-2-oxy)-2-propanol;
1-(N-morpholino)-3-(5-thioethylthiazol-2-oxy)-2-propanol;
1-(N-morpholino)-3-(4-thioethylthiazol-2-oxy)-2-propanol;
1-(N-morpholino)-3-(5-thiomethylthiazol-2-oxy)-2-propanol;
1-(N-morpholino)-3-(4-thiomethylthiazol-2-oxy)-2-propanol;
1-(N-morpholino)-3-(5-thioisopropylthiazol-2-oxy)-2-propanol;
1-(N-morpholino)-3-(4-thiomethylthiazol-2-oxy)-2-propanol;
1-(N-morpholino)-3-(5-thioisopropylthiazol-2-oxy)-2-propanol;
1-(N-morpholino)-3-(4-thioisopropylthiazol-2-oxy)-2-propanol;
1-(N-morpholino)-3-(5-thio-t-butylthiazol-2-oxy)-2-propanol;
1-(N-morpholino)-3-(4-thio-t-butylthiazol-2-oxy)-2-propanol;
1-(N-morpholino)-3-(5-thiophenylthiazol-2-oxy)-2-propanol;
1-(N-morpholino)-3-(4-thiophenylthiazol-2-oxy)-2-propanol;
1-(N-morpholino)-3-(5-thiobenzylthiazol-2-oxy)-2-propanol;
1-(N-morpholino)-3-(4-thiobenzylthiazol-2-oxy)-2-propanol;
1-(N-morpholino)-3-(5-ethylsulfonylthiazol-2-oxy)-2-propanol;
1-(N-morpholino)-3-(4-ethylsulfonylthiazol-2-oxy)-2-propanol;
1-(N-morpholino)-3-(5-methylsulfonylthiazol-2-oxy)-2-propanol;
1-(N-morpholino)-3-(4-methylsulfonylthiazol-2-oxy)-2-propanol;
1-(N-morpholino)-3-(5-isopropylsulfonylthiazol)-2-oxy)-propanol;
1-(N-morpolino)-3-(4-isopropylsulfonylthiazol-2-oxy)-2-propanol;
1-(N-morpholino)-3-(5-phenylsulfonylthiazol-2-oxy)-2-propanol;
1-(N-morpholino)-3-(4-phenylsulfonylthiazol-2-oxy)-2-propanol;
1-(N-morpholino)-3-(5-benzylsulfonylthiazol-2-oxy)-2-propanol;
1-(N-morpholino)-3-(4-benzylsulfonylthiazol-2-oxy)-2-propanol;
1-(N-morpholino)-3-(5-ethylsulfinylthiazol-2-oxy)-2-propanol;
1-(N-morpholino)-3-(4-ethylsulfinylthiazol-2-oxy)-2-propanol;
1-(N-morpholino)-3-(5-methylsulfinylthiazol-2-oxy)-2-propanol;
1-(N-morpholino)-3-(4-methylsulfinylthiazol-2-oxy)-2-propanol;
1-(N-morpholino)-3-(5-isopropylsulfinylthiazol)-2-oxy)-2-propanol;
1-(N-morpholino)-3-(4-isopropylsulfinylthiazol-2-oxy)-2-propanol;
1-(N-morpholino)-3-(5-phenylsulfinylthiazol-2-oxy)-2-propanol;
1-(N-morpholino)-3-(4-phenylsulfinylthiazol-2-oxy)-2-propanol;
1-(N-morpholino)-3-(5-benzylsulfinylthiazol-2-oxy)-2-propanol;
1-(N-morpholino)-3-(4-benzylsulfinylthiazol-2-oxy)-2-propanol;
1-(N-morpholino)-3-(5-sulfamoylthiazol-2-oxy)-2-propanol;
1-(N-morpholino)-3-(4-sulfamoylthiazol)-2-oxy)-2-propanol;
1-(N-morpholino)-3-(5-[N-ethylsulfamoyl]-thiazol-2-oxy)-2-propanol;
1-(N-morpholino)-3-(4-[N-ethylsulfamoyl]-thiazol-2-oxy)-2-propanol;
1-(N-morpholino)-3-(5-[N-methylsulfamoyl]-thiazol-2-oxy)-2-propanol;
1-(N-morpholino)-3-(4-[N-methylsulfamoyl]-thiazol-2-oxy)-2-propanol;
1-(N-morpholino)-3-(5-[N,N-dimethylsulfamoyl]-thiazol-2-oxy)-2-propanol;
1-(N-morpholino)-3-(4-[N,N-dimethylsulfamoyl]-thiazol-2-oxy)-2-propanol;
1-(N-morpholino)-3-(5-[N-isopropylsulfamoyl]-thiazol-2-oxy)-2-propanol; and
1-(N-morpholino)-3-(4-[N-isopropylsulfamoyl]-thiazol-2-oxy)-2-propanol.

The corresponding hydrochloride addition salts of each of the above products are respectively prepared by respectively treating the corresponding 1-(N-morpholino) derivatives, enumerated above, with hydrogen chloride as described in Example 5.

Similarly by following the same procedure but respectively using pyrrolidine and piperidine in place of morpholine, the 1-(N-pyrrolidinyl) and 1-(N-piperindinyl) derivatives of the above 1-(N-morpholino) products and their hydrochloride addition salts are respectively prepared.

EXAMPLE 7

This example illustrates further methods according to the invention of preparing the compounds of formula I of the invention. In this example 0.6 g. of ethanolamine is added to a solution of 0.3 g. of 1,2-epoxy-3-(thiazol-2-oxy)-propane in 20 ml. of anhydrous absolute ethanol at 20° C. The resulting mixture is monitored by thin-layer chromatographic analysis and allowed to stand until conversion of 1,2-epoxy-3-(thiazol-2-oxy)-propane is essentially complete. The mixture is then evaporated to dryness yielding a crude residue of 1 - (β-hydroxyethylamino)-3-(thiazol-2-oxy)-2-propanol which is then further purified by thin-layer chromatography.

Similarily by following the above procedure but respectively using the compounds enumerated in Column E as starting material, the corresponding compounds enumerated herein below in Column I are respectively prepared.

Column I 1-(β-hydroxyethylamino)-3-(4-methylthiazol-2-oxy)-2-propanol;
1-(β-hydroxyethylamino)-3-(5-methylthiazol-2-oxy)-2-propanol;
1-(β-hydroxyethylamino)-3-(4-isopropylthiazol-2-oxy)-2-propanol;
1-(β-hydroxyethylamino)-3-(5-isopropylthiazol-2-oxy)-2-propanol;
1-(β-hydroxyethylamino)-3-(4-t-butylthiazol-2-oxy)-2-propanol;
1-(β-hydroxyethylamino)-3-(5-t-butylthiazol-2-oxy)-2-propanol;
1-(β-hydroxyethylamino)-3-(4-cyclopropylthiazol-2-oxy)-2-propanol;
1-(β-hydroxyethylamino)-3-(5-cyclopropylthiazol-2-oxy)-2-propanol;
1-(β-hydroxyethylamino)-3-(4-cyclopentylthiazol-2-oxy)-2-propanol;
1-(β-hydroxyethylamino)-3-(5-cyclopentylthiazol-2-oxy)-2-propanol;
1-(β-hydroxyethylamino)-3-(4-phenylthiazol-2-oxy)-2-propanol;
1-(β-hydroxyethylamino)-3-(5-phenylthiazol-2-oxy)-2-propanol;
1-(β-hydroxyethylamino)-3-(4-tolylthiazolyl-2-oxy)-2-propanol;
1-(β-hydroxyethylamino)-3-(5-tolylthiazol-2-oxy)-2-propanol;
1-(β-hydroxyethylamino)-3-(4-cyanothiazol-2-oxy)-2-propanol;
1-(β-hydroxyethylamino)-3-(5-cyanothiazol-2-oxy)-2-propanol;
1-(β-hydroxyethylamino)-3-(4-fluorothiazol-2-oxy)-2-propanol;
1-(β-hydroxyethylamino)-3-(5-fluorothiazol-2-oxy)-2-propanol;
1-(β-hydroxyethylamino)-3-(4-chlorothiazol-2-oxy)-2-propanol;
1-(β-hydroxyethylamino)-3-(5-chlorothiazol-2-oxy)-2-propanol;
1-(β-hydroxyethylamino)-3-(5-bromothiazol-2-oxy)-2-propanol;
1-(β-hydroxyethylamino)-3-(5-oidothiazol-2-oxy)-2-propanol;
1-(β-hydroxyethylamino)-3-(4-iodothiazol-2-oxy)-2-propanol;
1-(β-hydroxyethylamino)-3-(4-trifluoromethylthiazol-2-oxy)-2-propanol;
1-(β-hydroxyethylamino)-3-(4-acetamidothiazol-2-oxy)-2-propanol;
1-(β-hydroxyethylamino)-3-(5-acetamidothiazol-2-oxy)-2-propanol;
1-(β-hydroxyethylamino)-3-(4-ethylamidothiazol-2-oxy)-2-propanol;
1-(β-hydroxyethylamino)-3-(5-ethylamidothiazol-2-oxy)-2-propanol;
1-(β-hydroxyethylamino)-3-(4-phenylamidothiazol-3-oxy)-2-propanol;
1-(β-hydroxyethylamino)-3-(5-phenylamidothiazol-2-oxy)-2-propanol;
1-(β-hydroxyethylamino)-3-(4-formylamidothiazol-2-oxy)-2-propanol;
1-(β-hydroxyethylamino)-3-(5-formylamidothiazol-2-oxy)-2-propanol;
1-(β-hydroxyethylamino)-3-(4-nitrothiazol-2-oxy)-2-propanol;
1-(β-hydroxyethylamino)-3-(5-nitrothiazol-2-oxy)-2-propanol;
1-(β-hydroxyethylamino)-3-(4-p-chlorophenylthiazol-2-oxy)-2-propanol;
1-(β-hydroxyethylamino)-3-(5-p-chlorophenylthiazol-2-oxy)-2-propanol;
1-(β-hydroxyethylamino)-3-(4-p-hydroxyphenylthiazol-2-oxy)-2-propanol;
1-(β-hydroxyethylamino)-3-(5-p-hydroxyphenylthiazol-2-oxy)-2-propanol;
1-(β-hydroxyethylamino)-3-(4-p-methoxyphenylthiazol-2-oxy)-2-propanol;
1-(β-hydroxyethylamino)-3-(5-p-methoxyphenylthiazol-2-oxy)-2-propanol;
1-(β-hydroxyethylamino)-3-(4-p-acetoxyphenylthiazol-2-oxy)-2-propanol;
1-(β-hydroxyethylamino)-3-(5-p-acetoxyphenylthiazol-2-oxy)-2-propanol;
1-(β-hydroxyethylamino)-3-(4-ureidothiazol-2-oxy)-2-propanol;
1-(β-hydroxyethylamino)-3-(5-ureidothiazol-2-oxy)-2-propanol;
1-(β-hydroxyethylamino)-3-(5-methoxycarbonylaminothiazol-2-oxy)-2-propanol;
1-(β-hydroxyethylamino)-3-(4-methoxycarbonylaminothiazol-2-oxy)-2-propanol;
1-(β-hydroxyethylamino)-3-(5-isopropoxycarbonylaminothiazol-2-oxy)-2-propanol;
1-(β-hydroxyethylamino)-3-(4-isopropoxycarbonylaminothiazol-2-oxy)-2-propanol;
1-(β-hydroxyethylamino)-3-(5-phenoxycarbonylaminothiazol-2-oxy)-2-propanol;
1-(β-hydroxyethylamino)-3-(4-phenoxycarbonylaminothiazol-2-oxy)-2-propanol;
1-(β-hydroxyethylamino)-3-(5-benzyloxycarbonylaminothiazol-2-oxy)-2-propanol;
1-(β-hydroxyethylamino)-3-(4-benzyloxycarbonylaminothiazol-2-oxy)-2-propanol;
1-(β-hydroxyethylamino)-3-(5-butylsulfonylthiazol-2-oxy)-2-propanol;
1-(β-hydroxyethylamino)-3-(4-butylsulfonylthiazol-2-oxy)-2-propanol;
1-(β-hydroxyethylamino)-3-(5-butylsulfinylthiazol-2-oxy)-2-propanol;
1-(β-hydroxyethylamino)-3-(4-butylsulfinylthiazol-2-oxy)-2-propanol;
1-(β-hydroxyethylamino)-3-(5-trifluoromethylthiazol-2-oxy)-2-propanol;
1-(β-hydroxyethylamino)-3-(5-carboxythiazol-2-oxy)-2-propanol;
1-(β-hydroxyethylamino)-3-(4-carboxythiazol-2-oxy)-2-propanol;
1-(β-hydroxyethylamino)-3-(5-methoxycarbonylthiazol-2-oxy)-2-propanol;
1-(β-hydroxyethylamino)-3-(4-methoxycarbonylthiazol-2-oxy)-2-propanol;
1-(β-hydroxyethylamino)-3-(5-ethoxycarbonylthiazol-2-oxy)-2-propanol;
1-(β-hydroxyethylamino)-3-(4-ethoxycarbonylthiazol-2-oxy)-2-propanol;
1-(β-hydroxyethylamino)-3-(5-propoxycarbonylthiazol-2-oxy)-2-propanol;

1-(β-hydroxyethylamino)-3-(5-cyclopentoxycarbonyl-thiazol-2-oxy)-2-propanol;
1-(β-hydroxyethylamino)-3-(4-cyclopentoxycarbonyl-thiazol-2-oxy)-2-propanol;
1-(β-hydroxyethylamino)-3-(5-phenoxycarbonylthiazol-2-oxy)-2-propanol;
1-(β-hydroxyethylamino)-3-(4-phenoxycarbonylthiazol-2-oxy)-2-propanol;
1-(β-hydroxyethylamino)-3-(5-benzyloxycarbonylthiazol-2-oxy)-2-propanol;
1-(β-hydroxyethylamino)-3-(4-benxyloxycarbonylthiazol-2-oxy)-2-propanol;
1-(β-hydroxyethylamino)-3-(5-formylthiazol-2-oxy)-2-propanol;
1-(β-hydroxyethylamino)-3-(4-formylthiazol-2-oxy)-2-propanol;
1-(β-hydroxyethylamino-3-(5-acetylthiazol-2-oxy)-2-propanol;
1-(β-hydroxyethylamino)-3-(4-acetylthiazol-2-oxy)-2-propanol;
1-(β-hydroxyethylamino)-3-(5-propionylthiazol-2-oxy)-2-propanol;
1-(β-hydroxyethylamino)-3-(4-propionylthiazol-2-oxy)-2-propanol;
1-(β-hydroxyethylamino)-3-(5-t-butyrylthiazol-2-oxy)-2-propanol;
1-(β-hydroxyethylamino)-3-(4-t-butyrylthiazol-2-oxy)-2-propanol;
1-(β-hydroxyethylamino)-3-(5-cyanothiazol-2-oxy)-2-propanol;
1-(β-hydroxyethylamino)-3-(4-cyanothiazol-2-oxy)-2-propanol;
1-(β-hydroxyethylamino)-3-(5-butoxycarbonylamino-thiazol-2-oxy)-2-propanol;
1-(β-hydroxyethylamino)-3-(5-[N'-methylureido]-thiazol-2-oxy)-2-propanol;
1-(β-hydroxyethylamino)-3-(4-[N'-methylureido]-thiazol-2-oxy)-2-propanol;
1-(β-hydroxyethylamino)-3-(5-[N'-ethylureido]-thiazol-2-oxy)-2-propanol;
1-(β-hydroxyethylamino)-3-(4-[N'-ethylureido]-thiazol-2-oxy)-2-propanol;
1-(β-hydroxyethylamino)-3-(5-[N'-isopropylureido]-thiazol-2-oxy)-2-propanol;
1-(β-hydroxyethylamino)-3-(4-[N'-isopropylureido]-thiazol-2-oxy)-2-propanol;
1-(β-hydroxyethylamino)-3-(5[N'-t-butylureido]-thiazol-2-oxy)-2-propanol;
1-(β-hydroxyethylamino)-3-(4[N'-t-butylureido]-thiazol-2-oxy)-2-propanol;
1-(β-hydroxyethylamino)-3-(5-ethylaminothiazol-2-oxy)-2-propanol;
1-(β-hydroxyethylamino)-3-(4-ethylaminothiazol-2-oxy)-2-propanol;
1-(β-hydroxyethylamino)-3-(5-methylaminothiazol-2-oxy)-2-propanol;
1-(β-hydroxyethylamino)-3-(4-methylaminothiazol-2-oxy)-2-propanol;
1-(β-hydroxyethylamino)-3-(4-propylaminothiazol-2-oxy)-2-propanol;
1-(β-hydroxyethylamino)-3-(5-propylaminothiazol-2-oxy)-2-propanol;
1-(β-hydroxyethylamino)-3-(5-[N-methylformamido]-thiazol-2-oxyl)-2-propanol;
1-(β-hydroxyethylamino)-3-(4-[N-methylformamido]-thiazol-2-oxy)-2-propanol;
1-(β-hydroxyethylamino)-3-(5-[N-ethylformamido]-thiazol-2-oxy)-2-propanol;
1-(β-hydroxyethylamino)-3-(4-[N-ethylformamido]-thiazol-2-oxy)-2-propanol;
1-(β-hydroxyethylamino)-3-(5-[N-isopropylformamido]-thiazol-2-oxy)-2-propanol;
1-(β-hydroxyethylamino)-3-(4-[N-isopropylformamido]-thiazol-2-oxy)-2-propanol;
1-(β-hydroxyethylamino)-3-(5-(N-t-butylformamido]-thiazol-2-oxy)-2-propanol;
1-(β-hydroxyethylamino)-3-(4-[N-t-butylformamido]-thiazol-2-oxy)-2-propanol;
1-(β-hydroxyethylamino)-3-(5-hydroxymethylthiazol-2-oxy)-2-propanol;
1-(β-hydroxyethylamino)-3-(4-hydroxymethylthiazol-2-oxy)-2-propanol;
1-(β-hydroxyethylamino)-3-(5-thioethylthiazol-2-oxy)-2-propanol;
1-(β-hydroxyethylamino)-3-(4-thioethylthiazol-2-oxy)-2-propanol;
1-(β-hydroxyethylamino)-3-(5-thiomethylthiazol-2-oxy)-2-propanol;
1-(β-hydroxyethylamino)-3-(4-triomethylthiazol-2-oxy)-2-propanol;
1-(β-hydroxyethylamino)-3-(5-thioisopropylthiazol-2-oxy)-2-propanol;
1-(β-hydroxyethylamino)-3-(4-thioisopropylthiazol-2-oxy)-2-propanol;
1-(β-hydroxyethylamino)-3-(5-thio-t-butylthiazol-2-oxy)-2-propanol;
1-(β-hydroxyethylamino)-3-(4-thio-t-butylthiazol-2-oxy)-2-propanol;
1-(β-hydroxyethylamino)-3-(5-thiophenylthiazol-2-oxy)-2-propanol;
1-(β-hydroxyethylamino)-3-(4-thiophenylthiazol-2-oxy)-2-propanol;
1-(β-hydroxyethylamino)-3-(5-thiobenzylthiazol-2-oxy)-2-propanol;
1-(β-hydroxyethylamino)-3-(4-thiobenzylthiazol-2-oxy)-2-propanol;
1-(β-hydroxyethylamino)-3-(5-ethylsulfonylthiazol-2-oxy)-2-propanol;
1-(β-hydroxyethylamino)-3-(4-ethylsulfonylthiazol-2-oxy)-2-propanol;
1-(β-hydroxyethylamino)-3-(5-methylsulfonylthiazol-2-oxy)-2-propanol;
1-(β-hydroxyethylamino)-3-(4-methylsulfonylthiazol-2-oxy)-2-propanol;
1-(β-hydroxyethylamino)-3-(5-isopropylsulfonylthiazol-2-oxy)-2-propanol;
1-(β-hydroxyethylamino)-3-(4-isopropylsulfonylthiazol-2-oxy)-2-propanol;
1-(β-hydroxyethylamino)-3-(5-phenylsulfonylthiazol-2-oxy)-2-propanol;
1-(β-hydroxyethylamino)-3-(4-phenylsulfonylthiazol-2-oxy)-2-propanol;
1-(β-hydroxyethylamino)-3-(5-benzylsulfonylthiazol-2-oxy)-2-propanol;
1-(β-hydroxyethylamino)-3-(4-benzylsulfonylthiazol-2-oxy)-2-propanol;
1-(β-hydroxyethylamino)-3-(5-ethylsulfinylthiazol-2-oxy)-2-propanol;
1-(β-hydroxyethylamino)-3-(4-ethylsulfinylthiazol-2-oxy)-2-propanol;
1-(β-hydroxyethylamino)-3-(5-methylsulfinylthiazol-2-oxy)-2-propanol;
1-(β-hydroxyethylamino)-3-(4-methylsulfinylthiazol-2-oxy)-2-propanol;
1-(β-hydroxyethylamino)-3-(5-isopropylsulfinylthiazol-2-oxy)-2-propanol;
1-(β-hydroxyethylamino)-3-(4-isopropylsulfonylthiazol-2-oxy)-2-propanol;
1-(β-hydroxyethylamino)-3-(5-phenylsulfinylthiazol-2-oxy)-2-propanol;
1-(β-hydroxyethylamino)-3-(4-phenylsulfinylthiazol-2-oxy)-2-propanol;
1-(β-hydroxyethylamino)-3-(5-benzylsulfinylthiazol-2-oxy)-2-propanol;
1-(β-hydroxyethylamino)-3-(4-benzylsulfinylthiazol-2-oxy)-2-propanol;
1-(β-hydroxyethylamino)-3-(5-sulfamoylthiazol-2-oxy)-2-propanol;

1-(β-hydroxyethylamino)-3-(4-sulfamoylthiazol-2-oxy)-
 2-propanol;
1-(β-hydroxyethylamino)-3-(5[N-ethylsulfamoyl]-thia-
 zol-2-oxy)-2-propanol;
1-(β-hydroxyethylamino)-3-(4-[N-ethylsulfamoyl]-
 thiazol-2-oxy)-2-propanol;
1-(β-hydroxyethylamino)-3-(5-[N-methylsulfamoyl]-
 thiazol-2-oxy)-2-propanol;
1-(β-hydroxyethylamino)-3-(4-[N-methylsulfamoyl]-
 thiazol-2-oxy)-2-propanol;
1-(β-hydroxyethylamino)-3-(5-[N,N-dimethylsulfamoyl]-
 thiazol-2-oxy)-2-propanol;
1-(β-hydroxyethylamino)-3-(4-[N,N-dimethylsulfamoyl]-
 thiazol-2-oxy)-2-propanol;
1-(β-hydroxyethylamino)-3-(5-[N-isopropylsulfamoyl]-
 thiazol-2-oxy)-2-propanol; and
1-(β-hydroxyethylamino)-3-(4-[N-isopropylsulfamoyl]-
 thiazol-2-oxy)-2-propanol.

The corresponding hydrochloride addition salts of each of the above products are respectively prepared by respectively treating the corresponding 1-(β-hydroxyethylamino) derivatives, enumerated above, with hydrogen chloride as described in Example 5.

Similarly by following the same procedure but respectively using 1-amino-1-phenylethane; β-(p-hydroxyphenyl) - ethylamine; α - methyl - β-(p-hydroxyphenyl)-ethylamine; γ-(p-hydroxyphenyl)-propylamine; and α-methyl-γ-(p-hydroxyphenyl)-propylamine in place of ethanolamine, the corresponding 1 - (N-[α-phenylethyl]amine; 1-(β-[p-hydroxyphenyl]-ethylamino); 1 - (α-methyl-β-[p-hydroxyphenyl] - ethylamino); 1 - (γ-[p-hydroxyphenyl]-propylamino); and 1-(α-methyl-γ-[p-hydroxyphenyl]-propylamino) derivatives of the above enumerated products and their hydrochloride addition salts are respectively prepared.

EXAMPLE 8

This example illustrates methods according to the invention of preparing the compounds of formula I of the invention. In this example the procedure of Example 5 is followed but respectively treating 1,2-epoxy-3-(thiazol-2-oxy)-propane with each of the compounds listed in Column J, yielding the corresponding compounds listed in Column K. Also where pure optical isomer products are indicated in Column K, the corresponding optical isomer of 1,2-epoxy-3-(5-thiazol-2-oxy)-2-propane is used as starting material.

Column J ethylamine;
isopropylamine;
α-methylpropylamine (i.e. sec-butylamine);
t-butylamine;
cyclopropylamine;
cyclopentylamine;
allylamine;
ethanolamine;
diethanolamine;
α-methyl-β-hydroxyethylamine;
β-methoxyethylamine;
γ-dimethylaminopropylamine;
benzylamine;
α-phenylethylamine;
α-methyl-β-phenylethylamine;
γ-phenylpropylamine;
α-methyl-β-(p-methoxyphenyl)-ethylamine;
β-(3,4-dimethoxyphenyl)-ethylamine;
morpholine;
γ-(N-piperidino)-propylamine; and
N-(N-β-hydroxyethyl)-piperazine.

Column K 1-ethylamino-3-(thiazol-2-oxy)-2-propanol;
1-isopropylamino-3-(thiazol-2-oxy)-2-propanol;
(+)-1-isopropylamino-3-(thiazol-2-oxy)-2-propanol;
(−)-1-isopropylamino-3-(thiazol-2-oxy)-2-propanol;
1-α-methylpropylamino-3-(thiazol-2-oxy)-2-propanol;
1-t-butylamino-3-(thiazol-2-oxy)-2-propanol;
1-cyclopropylamino-3-(thiazol-2-oxy)-2-propanol;
1-cyclopentylamino-3-(thiazol-2-oxy)-2-propanol;
1-allylamino-3-(thiazol-2-oxy)-2-propanol;
1-β-hydroxyethylamino-3-(thiazol-2-oxy)-2-propanol;
1-di(β-hydroxyethyl)amino-3-(thiazol-2-oxy)-2-propanol;
1-(α-methyl-β-hydroxyethylamino)-3-(thiazol-2-oxy)-2-
 propanol;
1-β-methoxyethylamino-3-(thiazol-2-oxy)-2-propanol;
1-γ-dimethylaminopropylamino-3-(thiazol-2-oxy)-2-
 propanol;
1-benzylamino-3-(thiazol-2-oxy)-2-propanol;
(+)-1-benzylamino-3-(thiazol-2-oxy)-2-propanol;
(−)-1-benzylamino-3-(thiazol-2-oxy)-2-propanol;
1-α-phenylethylamino-3-(thiazol-2-oxy)-2-propanol;
(+)-1-α-phenylethylamino-3-(thiazol-2-oxy)-2-propanol;
(−)-1-α-phenylethylamino-3-(thiazol-2-oxy)-2-propanol;
1-(α-methyl-β-phenylethylamino)-3-(thiazol-2-oxy)-2-
 propanol;
(+)-1-(α-methyl-β-phenylethylamino)-3-(thiazol-2-oxy)-
 2-propanol;
(−)-1-(α-methyl-β-phenylethylamino)-3-(thiazol-2-
 oxy)-2-propanol;
1-γ-phenylpropylamino-3-(thiazol-2-oxy)-2-propanol;
1-[α-methyl-β-(p-methoxyphenyl)-ethylamino]-3-(thi-
 azol-2-oxy)-2-propanol;
1-[β-(3,4-dimethoxyphenyl)-ethylamino]-3-(thiazol-2-
 oxy)-2-propanol;
1-(N-morpholino)-3-(thiazol-2-oxy)-2-propanol;
1-[γ-(N-piperidino)-propylamino]-3-(thiazol-2-oxy)-2-
 propanol; and
1-[N-(4-hydroxyethyl)-piperazinyl]-3-(thiazol-2-oxy)-2-
 propanol.

By following the salt preparation procedures of Examples 19 and 20, using the corresponding compounds of Column K as starting materials, the following salts are respectively prepared:

1-ethylamino-3-(thiazol-2-oxy)-2-propanol hydro-
 chloride;
1-isopropylamino-3-(thiazol-2-oxy)-2-propanol hydro-
 chloride;
(+)-1-isopropylamino-3-(thiazol-2-oxy)-2-propanol
 hydrochloride;
(−)-1-isopropylamino-3-(thiazol-2-oxy)-2-propanol
 hydrochloride;
1-α-methylpropylamino-3-(thiazol-2-oxy)-2-propanol
 maleate salt;
1-t-butylamino-3-(thiazol-2-oxy)-2-propanol maleate
 salt;
1-cyclopropylamino-3-(thiazol-2-oxy)-2-propanol
 maleate salt;
1-cyclopentylamino-3-(thiazol-2-oxy)-2-propanol
 maleate salt;
1-allylamino-3-(thiazol-2-oxy)-2-propanol maleate salt;
1-β-hydroxyethylamino-3-(thiazol-2-oxy)-2-propanol
 hydrochloride;
1-(α-methyl-β-hydroxyethylamino)-3-(thiazol-2-oxy)-2-
 propanol maleate salt;
1-β-methoxyethylamino-3-(thiazol-2-oxy)-2-propanol
 maleate salt;
1-γ-dimethylaminopropylamino-3-(thiazol-2-oxy)-2-
 propanol bis-maleate salt;
1-benzylamino-3-(thiazoyl-2-oxy)-2-propanol bis-
 maleate salt;
(+)-1-benzylamino-3-(thiazol-2-oxy)-2-propanol bis-
 maleate salt;
(−)-1-benzylamino-3-(thiazol-2-oxy)-2-propanol bis-
 maleate salt;
1-α-phenylethylamino-3-(thiazol-2-oxy)-2-propanol
 maleate salt;
(+)-1-α-phenylethylamino-3-(thiazol-2-oxy)-2-propanol
 maleate salt;

(—)-1-α-phenylethylamino-3-(thiazol-2-oxy)-2-propanol maleate salt;
1-(α-methyl-β-phenylethylamino)-3-(thiazol-2-oxy)-2-propanol maleate salt;
(+)-1-(α-methyl-β-phenylethylamino)-3-(thiazol-2-oxy)-2-propanol maleate salt;
(—)-1-(α-methyl-β-phenylethylamino)-3-(thiazol-2-oxy)-2-propanol maleate salt;
1-[α-methyl-β-(p-methoxyphenyl)-ethylamino]-3-(thiazol-2-oxy)-2-propanol maleate salt;
1-[N-(4-hydroxyethyl)-piperazinyl]-3-(thiazol-2-oxy)-2-propanol bis-maleate salt;
(+)-1-benzylamino-3-(thiazol-2-oxy)-2-propanol maleate salt; and
(—)-1-benzylamino-3-(thiazol-2-oxy)-2-propanol maleate salt.

Similarly by following the same procedures but treating the numbered compounds in Column L with the correspondingly numbered compound of Column M, followed in the case of salt products by the salt preparation treatments cited above, the correspondingly numbered compounds of Column N are prepared:

Column L (1) 1,2-epoxy-3-(4-chlorothiazol-2-oxy)-propane;
(2) 1,2-epoxy-3-(5-chlorothiazol-2-oxy)-propane;
(3) 1,2-epoxy-3-(4-methylthiazol-2-oxy)-propane;
(4) 1,2-epoxy-3-(5-methylthiazol-2-oxy)-propane;
(5) 1,2-epoxy-3-(4-acetamidothiazol-2-oxy)-propane.

Column M (1) isopropylamine;
(2) isopropylamine;
(3) isopropylamine;
(4) isopropylamine;
(5) t-butylamine.

Column N (1) 1-isopropylamino-3-(4-chlorothiazol-2-oxy)-2-propanol hydrochloride;
(2) 1-isopropylamino-3-(5-chlorothiazol-2-oxy)-2-propanol maleate salt;
(3) 1-isopropylamino-3-(4-methylthiazol-2-oxy)-2-propanol maleate salt;
(4) 1-isopropylamino-3-(5-methylthiazol-2-oxy)-2-propanol maleate salt;
(5) 1-t-butylamino-3-(4-acetamidothiazol-2-oxy)-2-propanol maleate salt.

EXAMPLE 9

This example illustrates methods according to the invention of preparing compounds of formula I, of the invention, wherein $R^3$ is alkoxide. In this example a sodium methoxide solution is prepared by the addition of 20 mg. of elemental sodium to 3 ml. of anhydrous methanol at room temperature. After dissolution of the sodium, 250 mg. of 1-amino-3-(5-bromothiazol-2-oxy)-2-propanol is added. The resulting mixture is heated at 50° C. for 30 minutes, then cooled and evaporated to remove excess methanol. The residue is diluted with water and then extracted with ethyl acetate. The ethyl acetate extracts are evaporated to dryness affording 1-amino-3-(5-methoxythiazol-2-oxy)-2-propanol. Similarily 1-amino-3-(4-methoxythiazol-2-oxy)-2-propanol is prepared by following the same procedure but using 1-amino-3-(4-bromothiazol-2-oxy)-2-propanol as the starting material.

By following the above procedures but respectively using the 5'- and 4'-bromothiazol-2'-oxy-2-propanol products prepared according to Examples 4, 5, 6, and 7 as starting materials, the following compounds are respectively prepared:

1-methylamino-3-(5-methoxythiazol-2-oxy)-2-propanol;
1-methylamino-3-(4-methoxythiazol-2-oxy)-2-propanol;
1-dimethylamino-3-(5-methoxythiazol-2-oxy)-2-propanol;
1-dimethylamino-3-(4-methoxythiazol-2-oxy)-2-propanol;
1-ethylamino-3-(5-methoxythiazol-2-oxy)-2-propanol;
1-ethylamino-3-(4-methoxythiazol-2-oxy)-2-propanol;
1-isopropylamino-3-(5-methoxythiazol-2-oxy)-2-propanol;
1-isopropylamino-3-(4-methoxythiazol-2-oxy)-2-propanol;
1-t-butylamino-3-(5-methoxythiazol-2-oxy)-2-propanol;
1-t-butylamino-3-(4-methoxythiazol-2-oxy)-2-propanol;
1-(N-morpholino)-3-(5-methoxythiazol-2-oxy)-2-propanol;
1-(N-morpholino)-3-(4-methoxythiazol-2-oxy)-2-propanol;
1-(N-pyrrolidinyl)-3-(5-methoxythiazol-2-oxy)-2-propanol;
1-(N-pyrrolidinyl)-3-(4-methoxythiazol-2-oxy)-2-propanol;
1-(N-piperidinyl)-3-(5-methoxythiazol-2-oxy)-2-propanol;
1-(N-piperidinyl)-3-(4-methoxythiazol-2-oxy)-2-propanol;
1-(β-hydroxyethylamino)-3-(5-methoxythiazol-2-oxy)-2-propanol;
1-(β-hydroxyethylamino)-3-(4-methoxythiazol-2-oxy)-2-propanol;
1-(N-[α-ethylphenyl]amino)-3-(5-methoxythiazol-2-oxy)-2-propanol;
1-(N-[α-ethylphenyl]amino)-3-(4-methoxythiazol-2-oxy)-2-propanol.

Similarly by following the same procedure as above, but respectively using ethanol, isopropanol and t-butanol in place of methanol, the ethoxy; isopropoxy; and t-butoxy 4- and 5-thiazole ring substituted compounds are corresponding to each of the above enumerated 4- and 5-methoxythiazole ring substituted products are respectively prepared.

EXAMPLE 10

This example illustrates an alternative procedure, according to the invention, of preparing the compounds of formula I of the invention wherein $R^3$ is alkoxide. In this example 1 mmole of dicyclohexyl-18-crown-6 and 1 mmole of potassium (in the form of 85% aqueous potassium hydroxide solution) are added to 75 ml. of methanol. The resulting solution is evaporated to dryness, under vacuum, and the resulting residue dissolved in 50 ml. of benzene and then re-evaporated to dryness. This residue is then dissolved in 25 ml. of benzene at room temperature and 0.3 mmoles of 3-(5-bromothiazol-2-oxy)-1-isopropylamino-2-propanol is added. The mixture is heated under reflux until the reaction is completed as determined by periodic thin-layer chromatographic analysis of the mixture. The mixture is cooled to room tempertaure and then reduced to a volume of 10 ml. by evaporation under vacuum. The resulting concentrate is diluted with water and then extracted with ethyl acetate. The ethyl acetate extract is washed with water to neutrality, dried over sodium sulfate, and evaporated to dryness yielding 1-isopropylamino-3-(5-methoxythiazol-2-oxy)-2-propanol. Similarly 1-isopropylamino-3-(4-methoxythiazol-2-oxy)-2-propanol is prepared from the corresponding 4-bromothiazole compound of formula I.

Similarly the products prepared in Example 9 are prepared by the above procedure by using the corresponding 4- or 5-bromothiazole compounds of formula I as starting materials. The corresponding $R^3$-ethoxy, isopropoxy and t-butoxy compounds are prepared by respectively using ethanol, isopropanol and t-butanol in place of methanol.

EXAMPLE 11

This example illustrates steps (1′) and (2′) of the alternative process of the invention. In this example 25 ml. of racemic glycidol and 50 ml. of t-butylamine are mixed together at room temperature. After about 30 minutes the mixture boils spontaneously and is then allowed to stand at room temperature for an additional 20 hours. The reaction mixture is then concentrated via evaporation to a viscous oil which is then dissolved in a solution containing 250 ml. of ethanol and 50 ml. of 37% (wt.) aqueous formaldehyde. The resulting mixture is refluxed for 18 hours and then evaporated, under vacuum, affording 5-hydroxymethyl-N-butyloxazolidine which is then further purified by distillation. Similarly, by following the same procedure but replacing t-butylamine with anhydrous ammonia, methylamine, isopropylamine, benzylamine, and α-methyl-β-phenylethylamine, respectively, the following compounds are respectively prepared:

5-hydroxymethyloxazolidine;
5-hydroxymethyl-N-methyloxazolidine;
5-hydroxymethyl-N-isopropyloxazolidine;
5-hydroxymethyl-N-benzyloxazolidine; and
5-hydroxymethyl-N-(α-[α-methyl-β-phenylethyl])-oxazolidine.

Also in the case of the volatile reagents (i.e., ammonia and methylamine), the procedure is conducted in a closed system by first bubbling the requisite amount of ammonia or methylamine through the glycidol and then sealing the reaction vessel.

EXAMPLE 12

This example illustrates methods, according to the invention, of preparing the compounds of formula III, of the invention. In this example, 1.7 g. of 5-hydroxymethyl-N-t-butyloxazolidine in 5 ml. of anhydrous dimethylformamide is added to a suspension of 0.53 g. of sodium hydride in 5 ml. of dimethylformamide, under a nitrogen atmosphere. The resulting mixture is heated at 80° C. for 15 minutes and then cooled to room temperature and 1.66 g. of 2-bromothiazole in 10 ml. of anhydrous dimethylformamide added. The mixture is heated at 80° C. for 2 hours, then cooled to room temperature and evaporated under high vacuum affording a residue of thiazol-2-oxymethylene-5′-N-t-butyloxazolidine. Similarly, by replacing the 2-bromothiazole starting materials with the thiazole compounds listed in Column A of Example 1, the following compounds are respectively prepared:

4-methylthiazol-2-oxy-5-methylene-N-t-butyloxazolidine;
5-methylthiazol-2-oxy-5-methylene-N-t-butyloxazolidine;
4-isopropylthiazol-2-oxy-5-methylene-N-t-butyloxazolidine;
5-isopropylthiazol-2-oxy-5-methylene-N-t-butyloxazolidine;
4-t-butylthiazol-2-oxy-5-methylene-N-t-butyloxazolidine;
5-t-butylthiazol-2-oxy-5-methylene-N-t-butyloxazolidine;
4-cyclopropylthiazol-2-oxy-5-methylene-N-t-butyloxazolidine;
5-cyclopropylthiazol-2-oxy-5-methylene-N-t-butyloxazolidine;
4-cyclopenthylthiazol-2-oxy-5-methylene-N-t-butyloxazolidine;
5-cyclopentylthiazol-2-oxy-5-methylene-N-t-butyloxazolidine;
4-phenylthiazol-2-oxy-5-methylene-N-t-butyloxazolidine;
5-phenylthiazol-2-oxy-5-methylene-N-t-butyloxazolidine;
4-p-tolylthiazol-2-oxy-5-methylene-N-t-butyloxazolidine;
5-p-tolylthiazol-2-oxy-5-methylene-N-t-butyloxazolidine;
4-cyanothiazol-2-oxy-5-methylene-N-t-butyloxazolidine;
5-cyanothiazol-2-oxy-5-methylene-N-t-butyloxazolidine;
4-fluorothiazol-2-oxy-5-methylene-N-t-butyloxazolidine;
5-fluorothiazol-2-oxy-5-methylene-N-t-butyloxazolidine;
2,4-dichlorothiazol-2-oxy-5-methylene-N-t-butyloxazolidine;
5-chlorothiazol-2-oxy-5-methylene-N-t-butyloxazolidine;
2,5-dibromothiazol-2-oxy-5-methylene-N-t-butyloxazolidine;
5-iodothiazol-2-oxy-5-methylene-N-t-butyloxazolidine;
4-iodothiazol-2-oxy-5-methylene-N-t-butyloxazolidine;
4-trifluoromethylthiazol-2-oxy-5-methylene-N-t-butyloxazolidine;
4-acetamidothiazol-2-oxy-5-methylene-N-t-butyloxazolidine;
5-acetamidothiazol-2-oxy-5-methylene-N-t-butyloxazolidine;
4-ethylamidothiazol-2-oxy-5-methylene-N-t-butyloxazolidine;
5-ethylamidothiazol-2-oxy-5-methylene-N-t-butyloxazolidine;
4-phenylamidothiazol-2-oxy-5-methylene-N-t-butyloxazolidine;
5-phenylamidothiazol-2-oxy-5-methylene-N-t-butyloxazolidine;
4-formylamidothiazol-2-oxy-5-methylene-N-t-butyloxazolidine;
5-formylamidothiazol-2-oxy-5-methylene-N-t-butyloxazolidine;
4-nitrothiazol-2-oxy-5-methylene-N-t-butyloxazolidine;
5-nitrothiazol-2-oxy-5-methylene-N-t-butyloxazolidine;
4-p-chlorophenylthiazol-2-oxy-5-methylene-N-t-butyloxazolidine;
5-p-chlorophenylthiazol-2-oxy-5-methylene-N-t-butyloxazolidine;
4-p-hydroxyphenylthiazol-2-oxy-5-methylene-N-t-butyloxazolidine;
5-p-hydroxyphenylthiazol-2-oxy-5-methylene-N-t-butyloxazolidine;
4-p-methoxyphenylthiazol-2-oxy-5-methylene-N-t-butyloxazolidine;
5-p-methoxyphenylthiazol-2-oxy-5-methylene-N-t-butyloxazolidine;
4-p-acetoxyphenylthiazol-2-oxy-5-methyl-N-t-butyloxazolidine;
5-p-acetoxyphenylthiazol-2-oxy-5-methylene-N-t-butyloxazolidine;
4-ureidothiazol-2-oxy-5-methylene-N-t-butyloxazolidine;
5-ureidothiazol-2-oxy-5-methylene-N-t-butyloxazolidine;
5-methoxycarbonylaminothiazol-2-oxy-5-methylene-N-t-butyloxazolidine;
4-methoxycarbonylaminothiazol-2-oxy-5-methylene-N-t-butyloxazolidine;
5-isopropoxycarbonylaminothiazol-2-oxy-5-methylene-N-t-butyloxazolidine;
4-isopropoxycarbonylaminothiazol-2-oxy-5-methylene-N-t-butyloxazolidine;
5-phenoxycarbonyaminothiazol-2-oxy-5-methylene-N-t-butyloxazolidine;
4-phenoxycarbonylaminothiazol-2-oxy-5-methylene-N-t-butyloxazolidine;
5-benzyloxycarbonylaminothiazol-2-oxy-5-methylene-N-t-butyloxazolidine;
4-benzyloxycarbonylaminothiazol-2-oxy-5-methylene-N-t-butyloxazolidine;
5-butylsulfonylthiazol-2-oxy-5-methylene-N-t-butyloxazolidine;
4-butylsulfonylthiazol-2-oxy-5-methylene-N-t-butyloxazolidine;
5-butylsulfinylthiazol-2-oxy-5-methylene-N-t-butyloxazolidine;
4-butylsulfinylthiazol-2-oxy-5-methylene-N-t-butyl-oxazolidine;
4-bromothiazol-2-oxy-5-methylene-N-t-butyloxazolidine;
5-bromothiazol-2-oxy-5-methylene-N-t-butyloxazolidine; and
2,4-dibromothiazol-2-oxy-5-methylene-N-t-butyloxazolidine.

Similarly by following the same procedure the N-methyloxazolidine; N-isopropyloxazolidine; N-benzyloxazolidine and N-(α-[α-methyl - β - phenylethyl])-oxazolidine derivatives of each of the above compounds is respectively prepared by using the corresponding 5-hydroxymethyl-N-methyloxazolidine;
5-hydroxymethyl-N-isopropyloxazolidine;
5-hydroxymethyl-N-benzyloxazolidine; and
5-hydroxymethyl-N-(α-[α-methyl - β - phenylethyl]) derivatives as starting materials.

EXAMPLE 13

This example illustrates methods according to the invention of preparing compounds of formula III, of the invention, wherein $R^3$ is alkoxide. In this example a sodium methoxide solution is prepared by the addition of 20 mg. of elemental sodium to 3 ml. of anhydrous methanol at room temperature. After dissolution of the sodium, 250 mg. of 4'-bromothiazol - 2' - oxy - 5 - methylene-N-isopropyloxazolidine is added to the solution. The resulting mixture is heated at 50° C. for ½ hour and then evaporated to remove excess methanol. The residue is diluted with ethyl acetate and then filtered through silica gel. The filtrate is then evaporated to dryness affording 4'-methoxythiazol-2'-oxy - 5 - methylene-N-t-butyloxazolidine. Similarly 5'-methoxythiazol - 2' - oxy-5-methylene-N-isopropyloxazolidine is prepared by following the same procedure but using 4'-bromothiazol-2'-oxy-4-methylene-N-isopropyloxazolidine as the starting materials.

By following the above procedures but respectively using the 4'- and 5'-bromothiazol - 2' - oxy - 5 - methylene-N-t-butyloxazolidine according to Example 12 as starting materials, the following compounds are respectively prepared:

4'-methoxythiazol-2'-oxy-5-methylene-N-methyloxazolidine;
5'-methoxythiazol-2'-oxy-5-methylene-N-methyloxazolidine;
4'-methoxythiazol-2'-oxy-5-methylene-N-isopropyloxazolidine;
5'-methoxythiazol-2'-oxy-5-methylene-N-isopropyloxazolidine;
4'-methoxythiazol-2'-oxy-5-methylene-N-benzyloxazolidine;
5'-methoxythiazol-2'-oxy-5-methylene-N-benzyloxazolidine;
4'-methoxythiazol-2'-oxy-5-methylene-N-(α-[α-methyl-β-phenylethyl]-oxazolidine;
5'-methoxythiazol-2'-oxy-5-methylene-N-(α-[α-methyl-β-phenylethyl]-oxazolidine;

Similarly by following the same procedure as above, but respectively using ethanol, isopropanol and t-butanol in place of methanol, the ethoxy; isopropoxy; and t-butoxy-4'- and 5'-thiazole ring substituted compounds corresponding to each of the above enumerated 4'- and 5'-methoxythiazole ring substituted oxazolidine products are respectively prepared.

EXAMPLE 14

This example illustrates an alternative procedure, according to the invention, of preparing the compounds of formula III of the invention wherein $R^3$ is alkoxide. In this example 1 mmole of dicyclohexyl-18-crown-6 and 1 mmole of potassium (in the form of 85% aqueous potassium hydroxide solution) are added to 75 ml. of methanol. The resulting solution is evaporated to dryness, under vacuum, and the resulting residue is dissolved in 50 ml. of benzene and then re-evaporated to dryness. This residue is then dissolved in 25 ml. of benzene at room temperature and 1.0 mmoles of 5'-bromothiazol-2'-oxy-5-methylene-N-isopropyloxazolidine is added. The mixture is heated under reflux until the reaction is completed as determined by periodic thin-layer chromatographic analysis of the mixture. The mixture is cooled to room temperature and then reduced to a volume of 10 ml. by evaporation under vacuum. The resulting concentrate is diluted with water and then extracted with ethyl acetate. The ethyl acetate extract is washed with water to neutrality, dried over sodium sulfate, and evaporated to dryness yielding 5'-methoxythiazol-2'-oxy - 5 - methylene-N-isopropyloxazolidine. Similarly 4'-methoxythiazol-2'-oxy-5-methylene-N-isopropyloxazolidine is prepared from the corresponding 4'-bromothiazole compound of formula III.

Similarly the products prepared in Example 13 are prepared by the above procedure by using the corresponding 4- or 5-bromothiazole compounds of formula III as starting materials. The corresponding $R^3$-ethoxy, isopropoxy and t-butoxy compounds are prepared by respectively using ethanol, isopropanol and t-butanol in place of methanol.

EXAMPLE 15

This example illustrates methods of converting the compounds of formula III into the compounds of formula I of the invention. In this example 1 g. of thiazol-2'-oxy-methylene-N-t-butyloxazolidine is dissolved in 50 ml. of ethyl acetate and this solution is washed three times with aqueous 5% sodium hydroxide (20 ml.) at 20° C. The mixture is allowed to stand for 0.5 hours, washed with water, dried over magnesium sulfate and then evaporated to dryness affording 3-[thiazol-2-oxy]-1-t-butylamino-2-propanol, which is then further purified by chromatography on silica gel plates.

Similarly by following the same procedure, the compounds of formula III, enumerated in Examples 12 and 13, are respectively hydrolyzed to the corresponding compounds of formula I.

EXAMPLE 16

This example illustrates an alternate method for converting compounds of formula III to compounds of formula I. In this example 1 g. of thiazol-2'-oxy-methylene-N-t-butyloxazolidine is dissolved in 20 ml. of methanol containing 4 cc. of 5% aqueous hydrochloric acid at 20° C. After 15 minutes, the mixture is neutralized with dilute aqueous sodium carbonate solution, poured into water and extracted with ethyl acetate. The ethyl acetate extract is evaporated to dryness yielding 1-t-butylamino-3-(thiazol-2-oxy)-2-propanol.

Similarly by following the same procedure, the compounds of formula III, enumerated in Examples 12 and 13, are respectively hydrolyzed to the corresponding compounds of formula I.

EXAMPLE 17

This example illustrates methods, according to the invention, of converting compounds of formula I into compounds of formula III of the invention. In this example 1 g. of 1-isopropylamino-3-(thiazol-2-oxy)-2-propanol is dissolved in 25 ml. of acetone at 20° C., and 2 g. of aluminum isopropoxide is then added. The solution is stirred for 4 days at 20° C. and then 50 ml. of hexane and 5 ml. of water are added and the resulting mixture is allowed to stand for 15 minutes. The resulting hexane phase is separated and then evaporated to dryness yielding thiazol-2' - oxy - 5 - methylene-N-isopropyl-2,2-dimethyloxazolidine.

Similarly by following the same procedure, the compounds of formula I, enumerated in Examples 4 and 5, are respectively converted into the corresponding compounds of formula III.

Similarly the corresponding thiazol- and 4- or 5-substituted thiazol-2'-oxy - 5 - methylene-N-isopropyl-2-spirocyclohexyloxazolidine compounds of formula III are prepared according to the same procedure but using cyclohexanone in place of acetone.

EXAMPLE 18

This example illustrates further methods, according to the invention, of converting the compounds of formula I into the corresponding compounds of formula III. In this example 380 mg. of 1-isopropylamino-3-(thiazol-2-oxy)-2-propanol and a molar equivalent amount of cyclohexanone are dissolved in 15 ml. of ethyl ether at 20° C. and 0.3 g. of anhydrous potassium carbonate is then added. The mixture is stirred for 18 hours at room temperature and then filtered. The filtrate is evaporated to dryness yielding thiazol-2'-oxy-5-methylene-N-isopropyl-2-spiro-cyclohexyloxazolidine.

Similarly by following the same procedure, the compounds of formula I, enumerated in Examples 4 and 5, are respectively converted into the corresponding 2-spiro-cyclohexyloxazolidine compounds of formula III.

EXAMPLE 19

This example illustrates methods of preparing hydrochloride addition salts of the invention. In this example 1 g. of 1 - isopropylamino-3-(thiazol-2-oxy)-2-propanol is dissolved in 10 ml. of ethyl ether at 20° C. A stream of gaseous anhydrous hydrogen chloride is passed over the surface of the solution until the supernatant liquid becomes colorless. The resulting precipitate is collected by filtration, washed with ethyl ether and then crystallized from methanol, containing 1% water and 1% acetone, affording crystalline 1-isopropylamino-3-(thiazol-2-oxy)-2-propanol hydrochloride.

Similarly by following the same procedure using each of the compounds of formula I, enumerated in Examples 4, 5, 6, 7, 8 and 9 and the compounds of formula III enumerated in Examples 12, 13 and 15 as starting materials. the corresponding hydrochloride addition salts of each of these compounds is respectively prepared.

EXAMPLE 20

This example illustrates methods of preparing the maleate addition salts of compounds of formulas I and III. In this example 1 gram of 1-isopropylamino-3-(thiazol-2-oxy)-2-propanol is dissolved in a solution of 5 ml. of ethyl ether and 5 ml. of ethanol at 20° C. To this solution is added 10 ml. of a saturated solution maleic acid in ethyl ether. The mixture is allowed to stand for 1 hour at room temperature. The resulting precipitate is recovered by filtration, washed three times with ethyl ether and then crystallized from a 1:1, by vol., solution of ethyl ether and ethanol affording crystalline 1-isopropylamino-3-(thiazol-2-oxy)-2-propanol maleate salt.

Similarly by following the same procedure using each of the compounds of formula I, enumerated in Examples 4, 5, 6, 7, 8 and 9 and the compounds of formula III enumerated in Examples 12, 13 and 15 as starting materials, the corresponding maleate addition salts of each of these compounds is respectively prepared.

EXAMPLE 21

This example illustrates the preparation, according to the invention, of the pure (+) optical isomers of the compounds of formulas I, II and III. In this example, the procedures of Examples 1–20 are repeated but in this instance, in place of racemic glycerol acetonide, the pure (+) optical isomer of glycerol acetonide is used as starting material in Example 1, and in the case of Example 11, the pure (+) optical isomer of glycerol is used in place of racemic glycerol.

EXAMPLE 22

This example illustrates the preparation, according to the invention, of the pure (—) optical isomers of the compounds of formulas I, II and III. In this example, the procedures of Examples 1–20 are repeated but in this instance, in place of racemic glycerol acetonide, the pure (—) optical isomer of glycerol acetonide is used as starting material in Example 1, and in the case of Example 11, the pure (—) optical isomer of glycerol is used in place of racemic glycerol.

Obviously many modifications and variations of the invention described herein above and below in the claims can be made without departing from the essence and scope thereof.

What is claimed is:

1. A compound selected from the group having the formula:

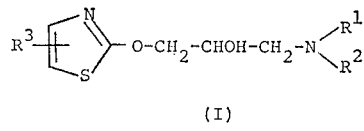

wherein $R^1$ and $R^2$ are independently selected from the group of hydrogen, lower alkyl, cycloalkyl having from 3 through 7 ring atoms, lower alkenyl, phenyl, phenylalkyl having up to 12 carbon atoms and alkylphenyl having up to 10 carbon atoms, hydroxy lower alkyl, (lower alkoxy) lower alkyl, and the groups having the formulas

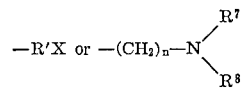

wherein $R'$ is lower alkyl, X is morpholine, piperidine or pyrrolidine; $R^7$ and $R^8$ are independently hydrogen or lower alkyl and $n$ is a whole integer of from 1 through 4; or $R^1$ and $R^2$ together with the nitrogen atom to which they are joined form a nitrogen heterocycle selected from the group morpholine, piperidine, or pyrrolidine;

$R^3$ is a substituent on the thiazole ring at either the 4- or 5-position selected from the group of hydrogen, lower alkyl, lower cycloalkyl, lower alkoxy, hydroxy (lower alkyl), acyloxy (lower alkyl) wherein said acyloxy is free of aliphatic unsaturation and has from one through 12 carbon atoms, halo, trifluoromethyl, acyl having from one through 12 carbon atoms and free of aliphatic unsaturation, carboxy, cyano, amine, lower alkylamino, lower dialkyl amino, and groups having the formulas:

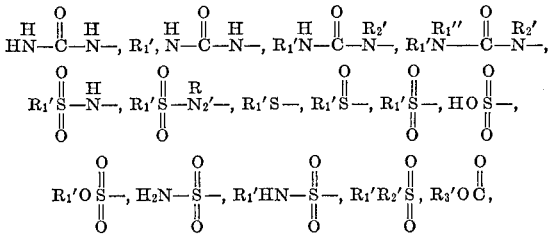

and

wherein $R_1'$, $R_1''$ and $R_2'$ are independently selected from the group of lower alkyl, phenyl and phenylalkyl having up to 12 carbon atoms; $R_3'$ is alkyl having from 1 through 11 carbon atoms, cycloalkyl having from 5 through 7 carbon atoms, phenyl or phenylalkyl having up to 12 carbon atoms; $R_4'$ and $R_5'$ are independently selected from the group of hydrogen, lower alkyl, hydroxy (lower alkyl) and halo;

and pharmaceutically acceptable salts thereof.

2. The compound of Claim 1 wherein said compound is a hydrochloride addition salt.

3. The compound of Claim 1 wherein said compound is a maleate addition salt.

4. The compound of Claim 1 wherein $R^3$ is selected from the group consisting of hydrogen, chloro, phenyl, and cyano.

5. The compound of Claim 4 wherein $R^3$ is hydrogen.

6. The compound of Claim 4 wherein $R^3$ is at the 5-position of the thiazole ring.

7. The compound of Claim 1 wherein one of $R^1$ and $R^2$ is hydrogen and the other is selected from the group consisting of isopropyl; sec-butyl; cyclopropyl; cyclopentyl; α-phenylethyl; γ-phenylpropyl; β-(3,4-dimethoxyphenyl)-ethyl; β-(p-hydroxyphenyl) - ethyl; α - methyl-β-(p-hydroxyphenyl)-ethyl: γ - (p-hydroxyphenyl)-propyl and α-methyl-γ-(p-hydroxyphenyl)-propyl.

8. The compound of claim 1 wherein one of $R^1$ and $R^2$ is hydrogen and the other is isopropyl.

9. The compound of Claim 7 wherein $R^3$ is selected from the group of hydrogen, chloro, phenyl, and cyano.

10. The compound of claim 9 wherein one of $R^1$ and $R^2$ is hydrogen and the other is isopropyl.

11. The compound of Claim 9 wherein $R^3$ is hydrogen.

12. The compound of claim 9 wherein said compound is 1-isopropylamino - 3 - (thiazol - 2 - oxy) - 2 - propanol or pharmaceutically acceptable salts thereof.

13. The pharmaceutically acceptable salt of Claim 12 wherein said salt is 1-isopropylamino-3-(thiazol-2-oxy)-2-propanol hydrochloride.

14. The compound of Claim 9 wherein said compound is 1-[β-(3,4-dimethoxyphenyl)-ethylamino] - 3 - (thiazol-2-oxy)-2-propanol or pharmaceutically acceptable salts thereof.

15. The compound of Claim 9 wherein said compound is 1-sec-butylamino-3-(thiazol-2-oxy) - 2 - propanol and pharmaceutically acceptable salts thereof.

16. The compound of Claim 9 wherein said compound is 1-cyclopropylamino-3-(thiazol - 2 - oxy) - 2 - propanol and pharmaceutically acceptable salts thereof.

17. The compound of Claim 9 wherein said compound is 1-cyclopentylamino-3-(thiazol - 2 - oxy) - 2 - propanol and pharmaceutically acceptable salts thereof.

18. The compound of Claim 9 wherein said compound is (+)-1-α-phenylethylamino-3 - (thiazol - 2 - oxy) - 2-propanol and pharmaceutically acceptable salts thereof.

19. The compound of Claim 9 wherein said compound is 1-γ-phenylpropylamino-3-(thiazol-2-oxy) - 2 - propanol and pharmaceutically acceptable salts thereof.

20. The compound of Claim 9 wherein said compound is 1-[β-(p-hydroxyphenyl)-ethylamino] - 3 - (thiazol - 2-oxy)-2-propanol and pharmaceutically acceptable salts thereof.

21. The compound of Claim 9 wherein said compound is 1-[α-methyl-β-(p - hydroxyphenyl) - ethylamino] - 3-(thiazol-2-oxy)-2-propanol and pharmaceutically acceptable salts thereof.

22. The compound of Claim 9 wherein said compound is 1-[γ-(p-hydroxyphenyl)-propylamino] - 3 - (thiazol-2-oxy)-2-propanol and pharmaceutically acceptable salts thereof.

23. The compound of Claim 9 wherein said compound is 1-[α-methyl-γ-(p - hydroxyphenyl) - propylamino - 3-(thiazol-2-oxy)-2-propanol and pharmaceutically acceptable salts thereof.

24. The compound of Claim 1 wherein $R^3$ is hydrogen and wherein one of $R^1$ or $R^2$ is hydrogen and the other is a substituent having a methine hydrogen atom on the carbon atom attached to the amino nitrogen atom.

25. The compound of Claim 8 wherein $R^3$ is selected from the group of hydroxymethyl, methoxycarbonyl, phenyl, ureido, sulfamoyl, methylsulfonylamino, methylsulfonyl, methylsulfinyl, methylsulfonamido and cyano.

26. The compound of Claim 25 wherein said compound is 1 - isopropylamino - 3 - (5 - ureidothiazol - 2-oxy) - 2 - propanol and pharmaceutically acceptable salts thereof.

27. The compound of Claim 25 wherein said compound is 1 - isopropylamino - 3 - (5 - methylsulfonylaminothiazol - 2 - oxy) - 2 - propanol or pharmaceutically acceptable salts thereof.

28. The compound of Claim 25 wherein said compound is 1 - isopropylamino - 3 - (5 - methylsulfinylthiazol - 2 - oxy) - 2 - propanol or pharmaceutically acceptable salts thereof.

29. The compound of Claim 25 wherein said compound is 1 - isopropylamino - 3 - (5 - methylsulfonylthiazol - 2 - oxy) - 2 - propanol or pharmaceutically acceptable salts thereof.

30. The compound of Claim 25 wherein said compound is 1 - isopropylamino - 3 - (5 - sulfamoylthiazol-2 - oxy) - 2 - propanol or pharmaceutically acceptable salts thereof.

31. The compound of Claim 25 wherein said compound is 1 - isopropylamino - 3 - (5 - methoxycarbonylthiazol - 2 - oxy) - 2 - propanol or pharmaceutically acceptable salts thereof.

32. The compound of Claim 25 wherein said compound is 3 - (5 - hydroxymethylthiazol - 2 - oxy) - 1-isopropylamino - 2 - propanol or pharmaceutically acceptable salts thereof.

33. The compound of Claim 25 wherein said compound is 3 - (4 - cyanothiazol - 2 - oxy) - 1 - isopropylamino - 2 - propanol or pharmaceutically acceptable salts thereof.

34. The compound of Claim 25 wherein said compound is 1 - isopropylamino - 3 - (4 - ureidothiazol - 2-oxy) - 2 - propanol and pharmaceutically acceptable salts thereof.

35. The compound of Claim 25 wherein said compound is 1 - isopropylamino - 3 - (4 - methylsulfonylaminothiazol - 2 - oxy) - 2 - propanol and pharmaceutically acceptable salts thereof.

36. The compound of Claim 25 wherein said compound is 1 - isopropylamino - 3 - (4 - methylsulfinylthiazol - 2 - oxy) - 2 - propanol and pharmaceutically acceptable salts thereof.

37. The compound of Claim 25 wherein said compound is 1 - isopropylamino - 3 - (4 - methylsulfonylthiazol - 2 - oxy) - 2 - propanol and pharmaceutically acceptable salts thereof.

38. The compound of Claim 25 wherein said compound is 1 - isopropylamino - 3 - (4 - sulfamoylthiazol-2 - oxy) - 2 - propanol and pharmaceutically acceptable salts thereof.

39. The compound of Claim 25 wherein said compound is 1 - isopropylamino - 3 - (4 - methoxycarbonylthiazol - 2 - oxy) - 2 - propanol and pharmaceutically acceptable salts thereof.

40. The compound of Claim 25 wherein said compound is 3 - (4 - hydroxymethylthiazol - 2 - oxy) - 1-isopropylamino - 2 - propanol and pharmaceutically acceptable salts thereof.

References Cited
UNITED STATES PATENTS

| | | |
|---|---|---|
| 3,328,417 | 6/1967 | McLoughlin et al. _ 260—302 R |
| 3,631,055 | 12/1971 | Posselt et al. _____ 260—302 R |
| 3,729,469 | 4/1973 | Wasson _____ 260—293.68 |

RICHARD J. GALLAGHER, Primary Examiner

U.S. Cl. X.R.

260—242, 247.1, 270, 293.68, 294.8D, 299, 306.8R, 307 F, 570.6, 584 B, 999

UNITED STATES PATENT OFFICE
CERTIFICATE OF CORRECTION

Patent No. 3,850,945  Dated November 26, 1974

Inventor(s) JOHN A. EDWARDS

It is certified that error appears in the above-identified patent and that said Letters Patent are hereby corrected as shown below:

Column 14, lines 56 and 57, "1/2 hour to 2 hours" should read -- 1/2 hour to 8 hours, and preferably about from 1/2 hour to 2 hours --.

Column 76, Claim 1, line 34, "group morpholine" should read -- group of morpholine --.

Column 76, Claim 1, line 44, "amine," should read -- amino, --.

Column 76, Claim 1, line 50,

"$R_1'\overset{O}{\underset{O}{S}}-N_2'\overset{R}{\phantom{.}}-$" should read -- $R_1'\overset{O}{\underset{O}{S}}-N^2-\overset{R_2'}{\phantom{.}}$ --.

Signed and sealed this 1st day of April 1975.

(SEAL)
Attest:

RUTH C. MASON
Attesting Officer

C. MARSHALL DANN
Commissioner of Patents
and Trademarks